United States Patent
Kawamura et al.

(10) Patent No.: US 9,464,230 B2
(45) Date of Patent: Oct. 11, 2016

(54) LIQUID CRYSTAL COMPOSITION AND LIQUID CRYSTAL DISPLAY ELEMENT USING SAME

(71) Applicant: DIC CORPORATION, Tokyo (JP)

(72) Inventors: Joji Kawamura, Kita-adachi-gun (JP); Masahiro Niwa, Kita-adachi-gun (JP); Makoto Negishi, Kita-adachi-gun (JP); Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/428,767

(22) PCT Filed: Mar. 22, 2013

(86) PCT No.: PCT/JP2013/058298
§ 371 (c)(1),
(2) Date: Mar. 17, 2015

(87) PCT Pub. No.: WO2014/147820
PCT Pub. Date: Sep. 25, 2014

(65) Prior Publication Data
US 2015/0307780 A1   Oct. 29, 2015

(51) Int. Cl.
G02F 1/1333 (2006.01)
C09K 19/30 (2006.01)
C09K 19/44 (2006.01)
C09K 19/02 (2006.01)
C09K 19/20 (2006.01)
C09K 19/04 (2006.01)
C09K 19/12 (2006.01)
C09K 19/34 (2006.01)

(52) U.S. Cl.
CPC ....... *C09K 19/3066* (2013.01); *C09K 19/0216* (2013.01); *C09K 19/0403* (2013.01); *C09K 19/20* (2013.01); *C09K 19/44* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3006* (2013.01); *C09K 2019/3016* (2013.01); *C09K 2019/3019* (2013.01); *C09K 2019/3021* (2013.01); *C09K 2019/3025* (2013.01); *C09K 2019/3071* (2013.01); *C09K 2019/3077* (2013.01); *C09K 2019/3078* (2013.01); *C09K 2019/3422* (2013.01)

(58) Field of Classification Search
CPC ............. C09K 19/3066; C09K 19/44; C09K 19/0216; C09K 19/0403; C09K 19/20; C09K 2019/0448; C09K 2019/0446; C09K 2019/122–2019/124; C09K 2019/3004; C09K 2019/3006; C09K 2019/301; C09K 2019/3016; C09K 2019/3019; C09K 2019/3021; C09K 2019/3025; C09K 2019/3071; C09K 2019/3077–2019/08; C09K 2019/3422

USPC ............. 252/299.01, 299.6, 299.63; 428/1.1
See application file for complete search history.

(56) References Cited

U.S. PATENT DOCUMENTS

| | | | |
|---|---|---|---|
| 8,574,456 B2 * | 11/2013 | Wittek | C09K 19/3402 252/299.01 |
| 8,585,922 B2 * | 11/2013 | Wittek | C09K 19/3402 252/299.01 |
| 2008/0029736 A1 | 2/2008 | Saito | |
| 2008/0029737 A1 | 2/2008 | Saito | |
| 2008/0199635 A1 | 8/2008 | Hirschmann et al. | |
| 2009/0194739 A1 | 8/2009 | Wittek et al. | |
| 2010/0026953 A1 | 2/2010 | Hirschmann et al. | |
| 2010/0302498 A1 | 12/2010 | Saito | |
| 2010/0320420 A1 | 12/2010 | Hirschmann et al. | |
| 2011/0001089 A1 | 1/2011 | Wittek et al. | |
| 2011/0001090 A1 | 1/2011 | Wittek et al. | |
| 2011/0019119 A1 | 1/2011 | Shu et al. | |
| 2011/0051023 A1 | 3/2011 | Fujita et al. | |
| 2012/0256124 A1 | 10/2012 | Ohgiri et al. | |
| 2013/0248762 A1 | 9/2013 | Hirschmann et al. | |

FOREIGN PATENT DOCUMENTS

DE 10 2009 018 149 A1  11/2009
DE 10 2008 046 250 A1   3/2010

(Continued)

OTHER PUBLICATIONS

International Search Report dated Apr. 23, 2013 issued in corresponding application No. PCT/JP2013/058298.

*Primary Examiner* — Geraldina Visconti
(74) *Attorney, Agent, or Firm* — Westerman, Hattori, Daniels & Adrian, LLP

(57) ABSTRACT

This liquid crystal composition includes at least one compound represented by general formula (i), and at least one compound represented by general formula (ii) (in the formulae: $R^{i1}$, $R^{i2}$, and $R^{ii1}$ each independently represent a C1-8 alkyl group; one or at least two non-adjacent-$CH_2$— groups in these alkyl groups may each independently be substituted with —CH=CH—, —C≡C—, —O—, —CO—, —COO—, or —OCO—; the hydrogen in these alkyl groups may be substituted with fluorine or chlorine; $X^{i1}$, $X^{i2}$, $X^{i3}$, $X^{i4}$, $X^{i11}$, and $X^{ii2}$ each independently represent hydrogen or fluorine; and $A^{ii1}$, $A^{ii2}$, and $A^{ii3}$ each independently represent a trans-1,4-cyclohexylene group, or a 1,4-phenylene group which may have the hydrogen therein substituted with fluorine or chlorine).

7 Claims, 1 Drawing Sheet

(56) References Cited

FOREIGN PATENT DOCUMENTS

| | | |
|---|---|---|
| JP | 2008-37918 A | 2/2008 |
| JP | 2008-38018 A | 2/2008 |
| JP | 2008-189927 A | 8/2008 |
| JP | 2009-185285 A | 8/2009 |
| JP | 2010-501688 A | 1/2010 |
| JP | 2010-275390 A | 12/2010 |
| JP | 2011-52120 A | 3/2011 |
| JP | 2011-506707 A | 3/2011 |
| JP | 2011-514410 A | 5/2011 |
| JP | 2011-516628 A | 5/2011 |
| JP | 2012-219270 A | 11/2012 |
| WO | 2011/137956 A1 | 11/2011 |
| WO | 2012/069151 A1 | 5/2012 |

* cited by examiner

LIQUID CRYSTAL COMPOSITION AND LIQUID CRYSTAL DISPLAY ELEMENT USING SAME

TECHNICAL FIELD

The present invention relates to a nematic liquid crystal composition that is useful as a liquid crystal display material and has a positive dielectric anisotropy (Δ∈) and to a liquid crystal display element using the same.

BACKGROUND ART

Liquid crystal display elements are being used in watches, calculators, various measurement instruments, automobile panels, word processors, electronic organizers, printers, computers, televisions, clocks, advertising boards, etc. Typical examples of the liquid crystal display mode include TN (twisted nematic) mode, STN (super twisted nematic mode) mode, and vertical alignment mode or an IPS (in-plane-switching) mode that uses TFTs (thin film transistors). Liquid crystal compositions used in these liquid crystal display elements are required to be stable against external stimuli such as moisture, air, heat, and light, stay in a liquid crystal phase in a temperature range as wide as possible around room temperature, exhibit low viscosity, and operate at a low drive voltage. A liquid crystal composition is constituted by several to dozens of compounds in order to optimize dielectric anisotropy (Δ∈) and/or refractive index anisotropy (Δn), etc., for individual display elements.

In a vertical alignment (VA) display, a liquid crystal composition having a negative Δ∈ is used and, in an horizontal alignment display such as TN mode, STN mode, or IPS (in-plane-switching) mode, a liquid crystal composition having a positive Δ∈ is used. There has been a report of a driving mode with which a liquid crystal composition having a positive Δ∈ is made to align vertically in the absence of applied voltage and a horizontal electric field is applied to perform display. There is an increasing need for a liquid crystal composition with a positive Δ∈. Meanwhile, low voltage driving, high speed response, and a wide operation temperature range are highly desirable in all driving modes. In other words, a positive Δ∈ with a large absolute value, low viscosity (η), and a high nematic phase-isotropic liquid phase transition temperature (Tni) are desirable. Due to setting of Δn×d, which is the product of Δn and a cell gap (d), the Δn of the liquid crystal composition needs to be adjusted to be within an appropriate range in accordance with the cell gap. Since high-speed response is important in order to use a liquid crystal display element in a television or the like, a liquid crystal composition having a low rotational viscosity ($\gamma_1$) is desirable.

Examples of the configurations of a liquid crystal composition directed to high-speed response include a liquid crystal composition that contains a combination of a compound represented by formula (A-1) or formula (A-2) below which is a liquid crystal compounds having a positive Δ∈ and a compound represented by formula (B) below which is a liquid crystal compound having a neutral Δ∈. The features of such liquid crystal compositions are that the liquid crystal compound having a positive Δ∈ has a —$CF_2O$— structure and that the liquid crystal compound having a neutral Δ∈ has an alkenyl group. These features are widely known in the field of liquid crystal compositions (refer to PTL 1 to PTL 4).

[Chem. 1]

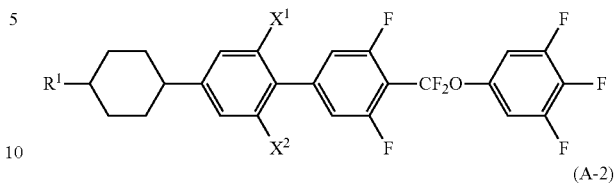
(A-1)

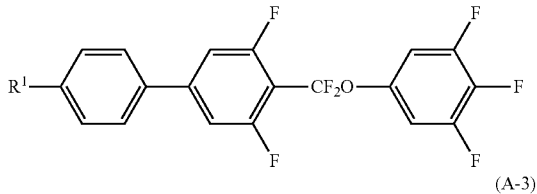
(A-2)

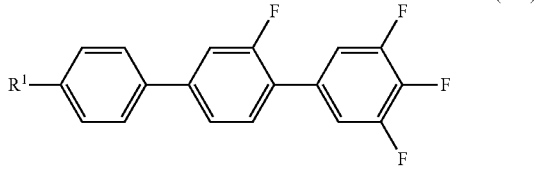
(A-3)

(B)

Meanwhile, with the expansion of applications of liquid crystal display elements, the operation method and the production method for liquid crystal display elements have undergone significant changes. In order to follow up these changes, optimization of properties other than the basic physical properties that have been known in related art is required. That is, liquid crystal display elements that use liquid crystal compositions and have come to be widely used are of a VA mode, IPS mode, or the like, and display elements with super large screen size of 50 or larger have been put to practice and are now being widely used. As the substrate size increases, a one drop fill (ODF) method has become the mainstream method for injecting a liquid crystal composition into a substrate, thereby replacing a conventional vacuum injection method. However, degradation of display quality caused by drop marks that occur when the liquid crystal composition is dropped onto a substrate has become a problem. In a liquid crystal display element production process based on the ODF method, optimum amounts of liquid crystals need be injected by dropping according to the size of a liquid crystal display element. If the injection amount significantly deviates from the optimum value, the balance among the pre-designed refractive index and drive electric field of the liquid crystal display element will be adversely affected and display failures such as nonuniformity and poor contrast will result. In particular, for a small-size liquid crystal display element frequently used in smart phones that have become prevalent in recent years, it is difficult to control the deviation from the optimum value within a particular range since the optimum amount of the liquid crystals to be injected is small. Accordingly, in order to produce liquid crystal display elements while maintaining high yield, for example, a liquid crystal composition needs to be less affected by impacts and rapid changes in pressure inside a dropping machine during injection of liquid crystals by dropping and allow stable continuous dropping over an extended period of time.

As such, a liquid crystal composition used in an active matrix driving liquid crystal display element driven by TFTs and the like is required to maintain properties and performance, such as high-speed response, desirable for a liquid crystal display element, to exhibit high resistivity and high voltage holding ratio and be stable against external stimuli such as light and heat as have been emphasized in the past, and to be developed by taking into account the liquid crystal display element production method.

CITATION LIST

Patent Literature

[PTL 1] Japanese Unexamined Patent Application Publication No. 2008-037918
[PTL 2] Japanese Unexamined Patent Application Publication No. 2008-038018
[PTL 3] Japanese Unexamined Patent Application Publication No. 2010-275390
[PTL 4] Japanese Unexamined Patent Application Publication No. 2011-052120

SUMMARY OF INVENTION

Technical Problem

An object of the present invention is to provide a liquid crystal composition having a positive $\Delta\epsilon$, low viscosity, good low-temperature solubility, high resistivity and voltage holding ratio, and stability for heat and light, showing a liquid crystal phase over a wide temperature range, being capable of suppressing display failures such as ghosting and drop marks, and enabling high-yield production of liquid crystal display elements having high display quality, and to provide a liquid crystal display element that uses this liquid crystal composition.

Solution to Problem

The inventor of the present invention has investigated various liquid crystal compounds and various chemical substances and found that the object described above can be achieved by combining particular liquid crystal compounds. Thus, the present invention has been made. In other words, a first embodiment of the present invention is a liquid crystal composition described below and a second embodiment of the present invention is a liquid crystal element described below.

[1] A liquid crystal composition comprising one or more compounds represented by general formula (i) below and one or more compounds represented by general formula (ii) below:

[Chem. 2]

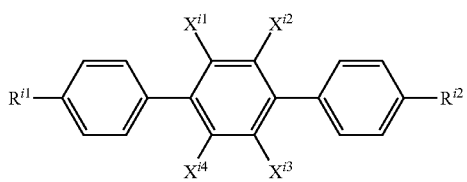

-continued

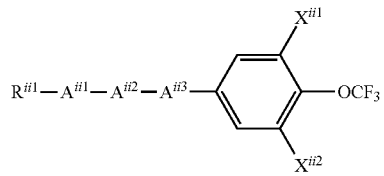

(In the formulae, $R^{i1}$, $R^{i2}$, and $R^{ii1}$ each independently represent an alkyl group having 1 to 8 carbon atoms where one —CH$_2$— or two or more nonadjacent —CH$_2$— in the alkyl group may each be independently substituted with —CH=CH—, —C≡C—, —O—, —CO—, —COO—, or —OCO— and a hydrogen atom in the alkyl group may be substituted with a fluorine atom or a chlorine atom; $X^{i1}$, $X^{i2}$, $X^{i3}$, $X^{i4}$, $X^{ii1}$, and $X^{ii2}$ each independently represent a hydrogen atom or a fluorine atom; $A^{ii1}$, $A^{ii2}$, and $A^{ii3}$ each independently represent a trans-1,4-cyclohexylene group or a 1,4-phenylene group which may have a hydrogen atom substituted with a fluorine atom or a chlorine atom.)

[2] The liquid crystal composition according to [1], wherein $X^{i2}$ in general formula (i) represents a fluorine atom.

[3] The liquid crystal composition according to [1] or [2], wherein $A^{ii1}$ in general formula (ii) represents a trans-1,4-cyclohexylene group.

[4] The liquid crystal composition according to any of [1] to [3], wherein $A^{ii2}$ and $A^{ii3}$ in general formula (ii) each represent a 1,4-phenylene group which may have a hydrogen atom substituted with a fluorine atom.

[5] The liquid crystal composition according to any one of [1] to [4], wherein $X^{ii1}$ in general formula (ii) represents a fluorine atom.

[6] The liquid crystal composition according to any one of [1] to [5], comprising a compound represented by general formula (L) below:

[Chem. 3]

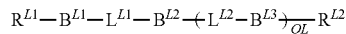

(In the formula, $R^{L1}$ and $R^{L2}$ each independently represent an alkyl group having 1 to 8 carbon atoms where one —CH$_2$— or two or more nonadjacent —CH$_2$— in the alkyl group may each be independently substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of (a) a 1,4-cyclohexylene group (where one —CH$_2$— or two or more nonadjacent —CH$_2$— present in this group may be substituted with —O—) and (b) a 1,4-phenylene group (where one —CH= or two or more nonadjacent —CH= present in this group may be substituted with —N=), wherein one or more hydrogen atoms in the group (a) or (b) described above may each independently be substituted with a cyano group, a fluorine atom, or a chlorine atom, $L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, and when OL represents 2 or 3 and two or more $L^{L2}$ are present, they may be the same or different and when OL represents 2 or 3 and two or more $B^{L3}$ are present, they may be the same or different.)

[7] The liquid crystal composition according to any one of [1] to [6], comprising a compound represented by general formula (M) below:

[Chem. 4]

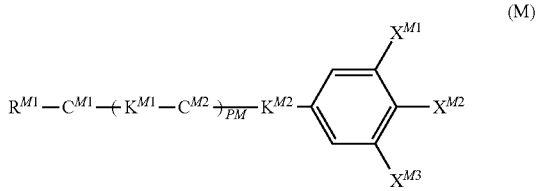

(In the formula, $R^{M1}$ represents an alkyl group having 1 to 8 carbon atoms where one —$CH_2$— or two or more nonadjacent —$CH_2$— in the alkyl group may each be independently substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (where one —$CH_2$— or two or more nonadjacent —$CH_2$— present in this group may be substituted with —O— or —S—) and (e) a 1,4-phenylene group (where one —CH= or two or more nonadjacent —CH= present in this group may be substituted with —N=), wherein one or more hydrogen atoms in the group (d) or (e) described above may each independently be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when PM represents 2, 3, or 4 and two or more $K^{M1}$ are present, they may be the same or different and when PM represents 2, 3, or 4 and two or more $C^{M2}$ are present, they may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. Compounds represented by general formula (i) and general formula (ii) are excluded.)

[8] A liquid crystal display element using the composition according to any one of [1] to [7].

[9] A liquid crystal display element of an IPS mode, OCB mode, ECB mode, VA mode, VA-IPS mode, or a FFS mode, using the liquid crystal composition according to any one of [1] to [7].

[10] A liquid crystal display using the liquid crystal display element according to [8] or [9].

Advantageous Effects of Invention

The liquid crystal composition having a positive dielectric anisotropy according to the present invention has a viscosity lower than in related art, exhibits good low-temperature solubility, and has resistivity and voltage holding ratio that undergo significantly small changes in response to heat and light. Accordingly, the liquid crystal composition of the present invention can be easily applied to liquid crystal products (applicability) and a liquid crystal display element of an IPS mode, FFS mode, or the like that uses the liquid crystal composition can achieve high response speed. Even after the liquid crystal composition of the present invention has undergone the liquid crystal display element production process, the liquid crystal composition can stably perform. Thus, display failures caused by the production process are suppressed, liquid crystal display elements can be produced in high yield, and the liquid crystal composition is therefore significantly useful.

DESCRIPTION OF EMBODIMENTS

Figure 1:
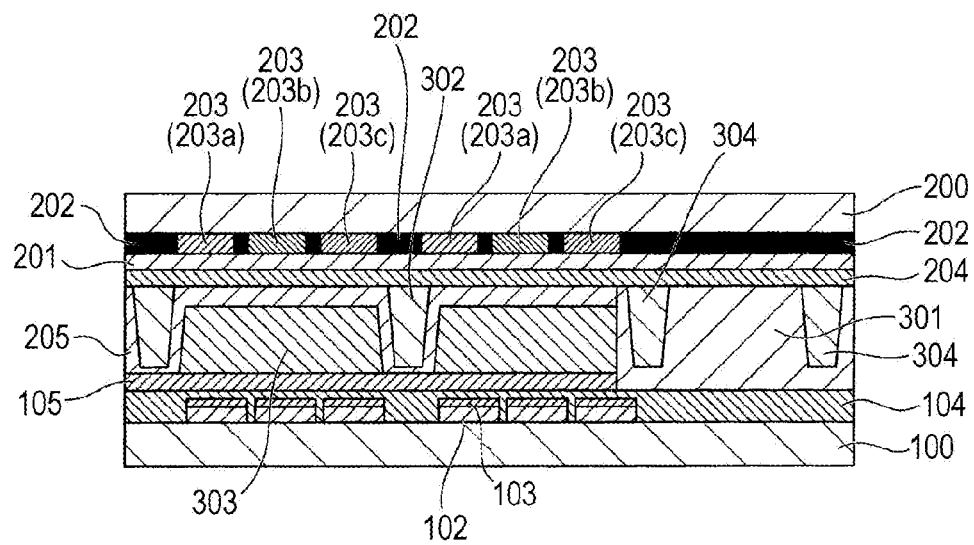
FIG. 1 is a cross-sectional view of a liquid crystal display element according to the present invention in which a substrate equipped with 100 to 105 is referred to as a "backplane" and a substrate equipped with 200 to 205 is referred to as a "frontplane".

For the compositions described below, "%" means % by mass unless otherwise noted.

A liquid crystal composition according to the invention of the subject application contains one or more compounds represented by general formula (i) below and one or more compounds represented by general formula (ii) below.

[Chem. 5]

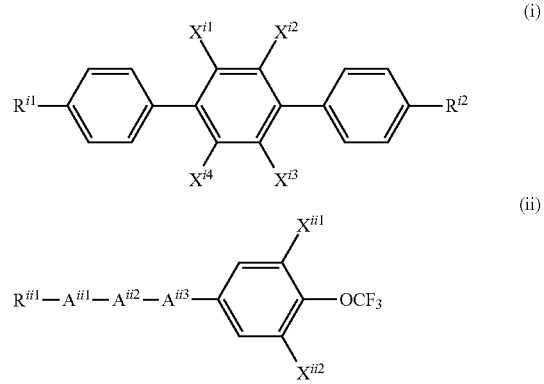

(In the formulae, $R^{i1}$, $R^{i2}$, and $R^{ii1}$ each independently represent an alkyl group having 1 to 8 carbon atoms where one —$CH_2$— or two or more nonadjacent —$CH_2$— in the alkyl group may each be independently substituted with —CH=CH—, —C≡C—, —O—, —CO—, —COO—, or —OCO— and a hydrogen atom in the alkyl group may be substituted with a fluorine atom or a chlorine atom; $X^{i1}$, $X^{i2}$, $X^{i3}$, $X^{i4}$, $X^{ii1}$, and $X^{ii2}$ each independently represent a hydrogen atom or a fluorine atom; $A^{ii1}$, $A^{ii2}$, and $A^{ii3}$ each independently represent a trans-1,4-cyclohexylene group or a 1,4-phenylene group which may have a hydrogen atom substituted with a fluorine atom or a chlorine atom.)

<Compounds Represented by General Formula (i)>

In general formula (i) described above, $X^{i2}$ preferably represents a fluorine atom and $X^{i1}$, $X^{i3}$, and $X^{i4}$ preferably each represent a hydrogen atom.

In general formula (i) described above, $R^{i1}$ and $R^{i2}$ each preferably represent a linear alkyl group having 1 to 8 carbon atoms or a linear alkenyl group having 2 to 8 carbon atoms, preferably represent a linear alkyl group having 2 to 5 carbon atoms or a linear alkenyl group having 2 to 5 carbon atoms, preferably represent a methyl group, an ethyl group, a propyl group, a butyl group, a pentyl group, or a structure described below, and particularly preferably represent an ethyl group, a propyl group, a butyl group, or a pentyl group:

[Chem. 6]

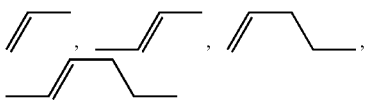

(In the Formulae, the Right End of Each Structure Bonds with the Ring Structure.)

If improvement of response speed is important, an alkenyl group is preferred; if reliability such as voltage holding ratio and the like of the liquid crystal composition formed therefrom is important, an alkyl group is preferred.

The compounds represented by general formula (i) are preferably compounds represented by general formula (i-1).

[Chem. 7]

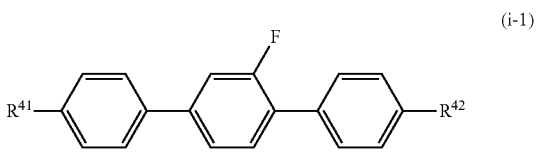

(i-1)

(In the formula, $R^{41}$ and $R^{42}$ each independently represent an alkyl group having 1 to 5 carbon atoms or an alkenyl group having 2 to 5 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention. Of these, an embodiment that contains two compounds is particularly preferable.

The compound represented by general formula (i-1) is preferably a compound selected from the group of compounds represented by general formula (i-1-1), for example.

[Chem. 8]

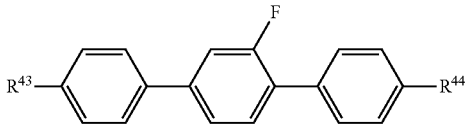

(i-1-1)

(In the formula, $R^{43}$ and $R^{44}$ each independently represent an alkyl group having 1 to 5 carbon atoms.)

The content of the compound represented by general formula (i-1-1) must be appropriately adjusted according to the desired performance such as low-temperature solubility, transition temperature, electrical reliability, birefringence, process compatibility, drop marks, ghosting, and dielectric anisotropy.

The content of the compound represented by general formula (i-1-1) relative to the total mass of the liquid crystal composition of the present invention is preferably 1 to 40% by mass, more preferably 2 to 30% by mass, yet more preferably 4 to 20% by mass, and most preferably 8 to 16% by mass.

The compound represented by general formula (i-1-1) is preferably any of compounds represented by formula (i-1-1.1) to formula (i-1-1.9), for example.

[Chem. 9]

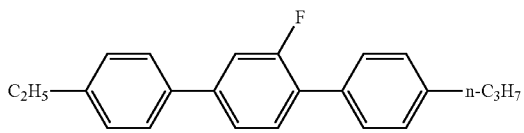

(i-1-1.1)

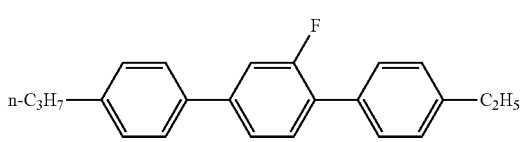

(i-1-1.2)

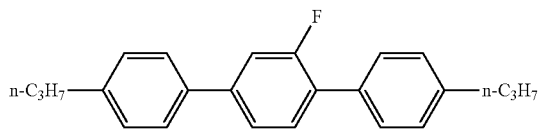

(i-1-1.3)

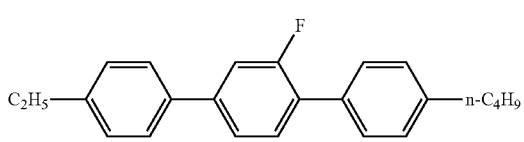

(i-1-1.4)

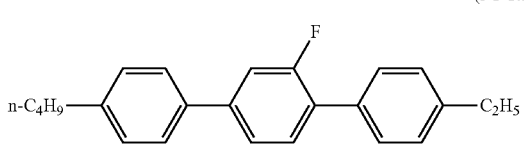

(i-1-1.5)

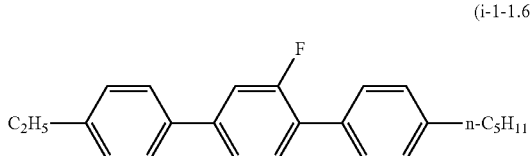

(i-1-1.6)

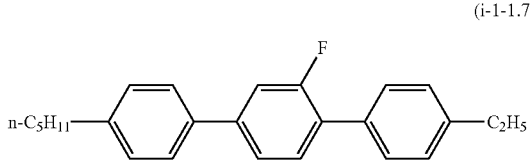

(i-1-1.7)

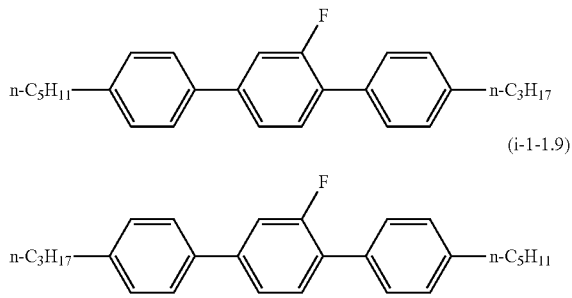

(i-1-1.8)

(i-1-1.9)

The number of compounds that can be used in combination is not particularly limited. Of these compounds, one to three compounds are preferably contained, one or two compounds are more preferably contained, and two compounds are most preferably contained. When the selected compound has a wide molecular weight distribution, solubility is effectively improved; thus, for example, one compound selected from compounds represented by formulae (i-1-1.1) and (i-1-1.2), one compound selected from compounds represented by formulae (i-1-1.4) and (i-1-1.5), one compound selected from compounds represented by formula (i-1-1.6) and formula (i-1-1.7), and one compound selected from compounds represented by formulae (i-1-1.8) and (i-1-1.9) may be appropriately used in combination.

In particular, a combination of (i-1-1.1) and (i-1-1.6), a combination of (i-1-1.4) and (i-1-1.6), a combination of (i-1-1.1) and (i-1-1.3), and a combination of (i-1-1.1) and (i-1-1.4) are preferable. A combination of (i-1-1.1) and (i-1-1.6), a combination of (i-1-1.1) and (i-1-1.3), and a combination of (i-1-1.1) and (i-1-1.4) are more preferable.

In one embodiment of the present invention, the content of the compound represented by formula (i-1-1.1) relative to the total mass of the liquid crystal composition of the present invention is preferably 1 to 40% by mass, more preferably 2 to 20% by mass, and most preferably 3 to 10% by mass.

In one embodiment of the present invention, the content of the compound represented by formula (i-1-1.3) relative to the total mass of the liquid crystal composition of the present invention is preferably 1 to 40% by mass, more preferably 2 to 20% by mass, yet more preferably 4 to 10% by mass, and most preferably 5 to 9% by mass.

In one embodiment of the present invention, the content of the compound represented by formula (i-1-1.4) relative to the total mass of the liquid crystal composition of the present invention is 1 to 40% by mass; in another embodiment, the content of the compound represented by formula (i-1-1.4) is 2 to 20% by mass; and in another embodiment, the content of the compound represented by formula (i-1-1.4) is 5 to 10% by mass.

In one embodiment of the present invention, the content of the compound represented by formula (i-1-1.6) relative to the total mass of the liquid crystal composition of the present invention is 1 to 40% by mass; in another embodiment, the content of the compound represented by formula (i-1-1.6) is 2 to 20% by mass; and in another embodiment, the content of the compound represented by formula (i-1-1.6) is 4 to 10% by mass.

<Compounds Represented by General Formula (ii)>

In general formula (ii) described above, $R^{ii1}$ preferably represents an alkyl group having 1 to 8 carbon atoms or a linear alkenyl group having 2 to 8 carbon atoms, preferably represents a linear alkyl group having 2 to 5 carbon atoms or a linear alkenyl group having 2 to 5 carbon atoms, preferably represents an ethyl group, a propyl group, a butyl group, a pentyl group, or any one of the following structures, and more preferably represents a propyl group:

[Chem. 10]

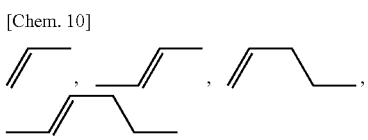

(In the formulae, the right end of each structure bonds with the ring structure.)

In general formula (ii) described above, $A^{ii1}$ preferably represents a trans-1,4-cyclohexylene group.

In the general formula (ii) described above, $A^{ii2}$ and $A^{ii3}$ preferably each represent a 1,4-phenylene group which may have a hydrogen atom substituted with a fluorine atom.

In general formula (ii) described above, $A^{ii2}$ preferably represents a 1,4-phenylene group.

In general formula (ii) described above, $A^{ii3}$ preferably represents a 1,4-phenylene group having a hydrogen atom substituted with a fluorine atom.

In general formula (ii) described above, $X^{ii1}$ preferably represents a fluorine atom.

The compound represented by general formula (ii) described above is preferably a compound represented by general formula (ii-1) below:

[Chem. 11]

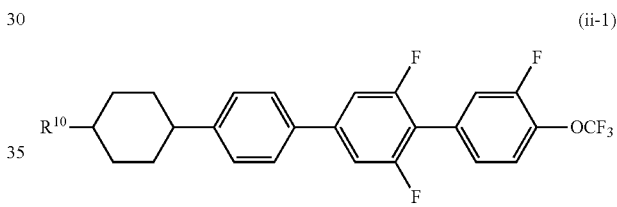

(ii-1)

(In the formula, $R^{10}$ represents an alkyl group having 1 to 5 carbon atoms, an alkenyl group having 2 to 5 carbon atoms, or an alkoxy group having 1 to 4 carbon atoms.)

The content of the compound represented by general formula (ii-1) relative to the total mass of the liquid crystal composition according to the present invention is preferably 1 to 20% by mass, more preferably 2 to 16% by mass, and yet more preferably 2 to 13 considering low-temperature solubility, transition temperature, electrical reliability, etc. In particular, considering the overcoming of precipitation at low temperature, the content is preferably 3 to 10% by mass, more preferably 4 to 8% by mass, and most preferably 5 to 7% by mass.

The compound represented by general formula (ii-1) used in the liquid crystal composition of the present invention is preferably any of compounds represented by formula (ii-1.1) to formula (ii-1.4) and, in particular, compounds represented by formula (ii-1.2) and formula (ii-1.4) are preferably contained.

[Chem. 12]

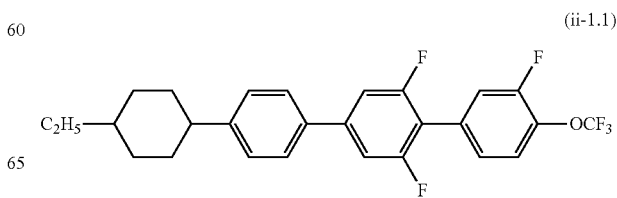

(ii-1.1)

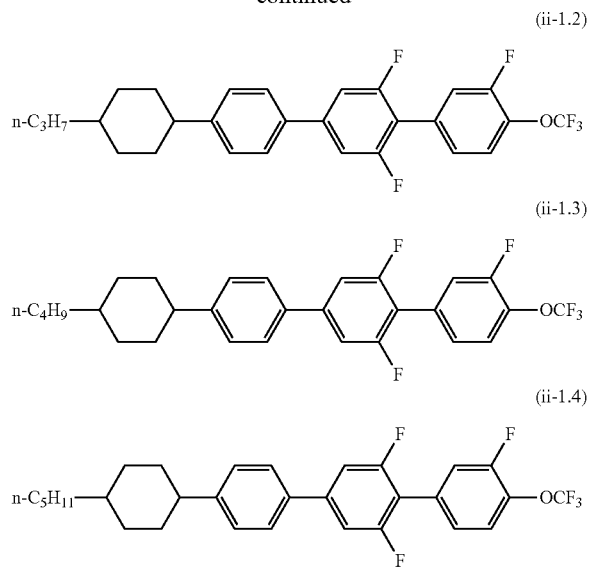

(ii-1.2)
(ii-1.3)
(ii-1.4)

In the liquid crystal composition of the present invention, the content of the compound represented by formula (ii-1.2) relative to the total mass of the liquid crystal composition of the present invention is preferably 1 to 35% by mass, more preferably 2 to 25% by mass, yet more preferably 2 to 15% by mass, still more preferably 2 to 10% by mass, and most preferably 4 to 8% by mass.

In the liquid crystal composition of the present invention, the content of the compound represented by formula (ii-1.4) relative to the total mass of the liquid crystal composition of the present invention is preferably 1 to 35% by mass, more preferably 2 to 25% by mass, yet more preferably 2 to 15% by mass, and most preferably 3 to 8% by mass.

The compounds represented by general formula (ii) are preferably compounds represented by general formula (ii-2) below.

[Chem. 13]

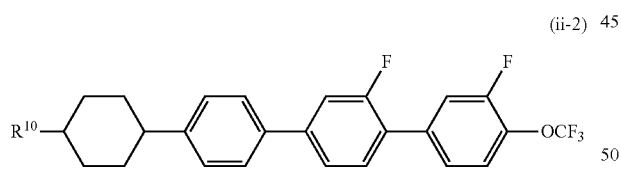

(ii-2)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering low-temperature solubility, transition temperature, electrical reliability, birefringence, etc., one or more compounds are preferably used in combination and more preferably one to three or more compounds are used in combination.

The content of the compound represented by general formula (ii-2) relative to the total mass of the liquid crystal composition of the present invention is preferably 1 to 10% by mass, more preferably 2 to 8% by mass, and most preferably 2 to 5% by mass considering low-temperature solubility, transition temperature, electrical reliability, etc.

The compound represented by general formula (ii-2) used in the liquid crystal composition of the present invention is specifically preferably any of compounds represented by formula (ii-2.1) to formula (ii-2.4) and, of these, a compound represented by formula (ii-2.2) is preferably contained.

[Chem. 14]

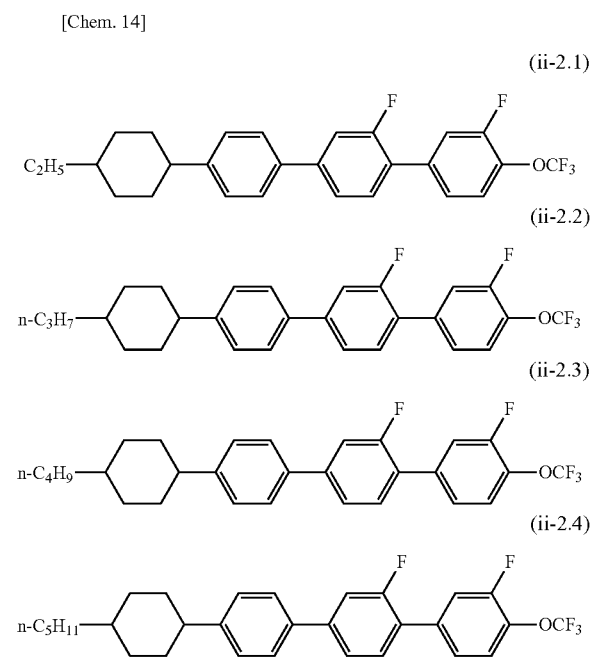

(ii-2.1)
(ii-2.2)
(ii-2.3)
(ii-2.4)

In the liquid crystal composition of the present invention, the content of the compound represented by formula (ii-2.2) relative to the total mass of the liquid crystal composition of the present invention is preferably 1 to 10% by mass, more preferably 2 to 8% by mass, and most preferably 2 to 5% by mass.

The compound represented by general formula (ii) described above is preferably a compound represented by general formula (ii-3) below.

[Chem. 15]

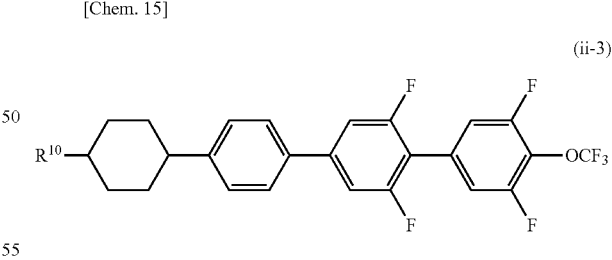

(ii-3)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering low-temperature solubility, transition temperature, electrical reliability, birefringence, etc., one or more compounds are preferably used in combination and more preferably one to three or more compounds are used in combination.

The content of the compound represented by general formula (ii-3) relative to the total mass of the liquid crystal composition of the present invention is preferably 1 to 20% by mass, more preferably 2 to 16% by mass, and most preferably 2 to 13% by mass considering low-temperature solubility, transition temperature, electrical reliability, etc.

The compound represented by general formula (ii-3) used in the liquid crystal composition of the present invention is preferably any of compounds represented by formula (ii-3.1) to formula (ii-3.4) and, of these, a compound represented by formula (ii-3.2) is preferably contained.

[Chem. 16]

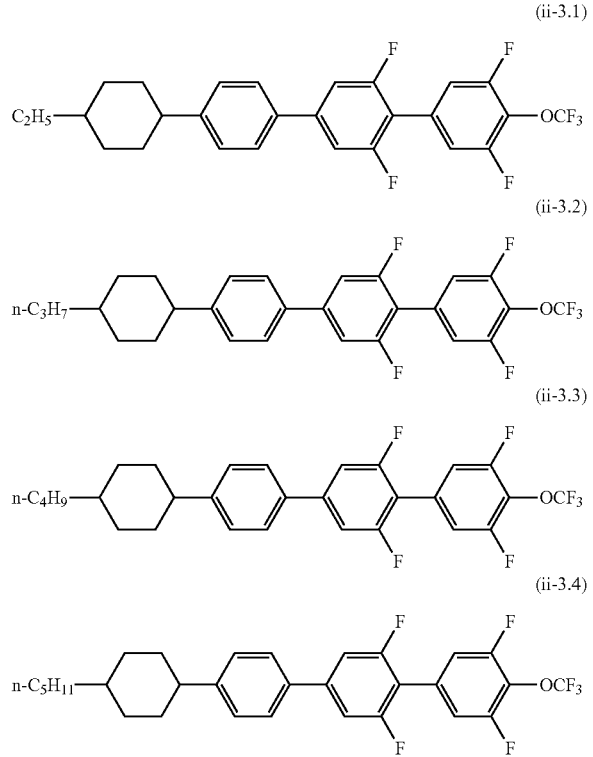

In the liquid crystal composition of the present invention, the content of the compound represented by formula (ii-3.2) relative to the total mass of the liquid crystal composition of the present invention is preferably 1 to 35% by mass, more preferably 2 to 25% by mass, yet more preferably 2 to 15% by mass, and most preferably 2 to 10% by mass.

The compound represented by general formula (ii) is preferably a compound represented by general formula (ii-4) below.

[Chem. 17]

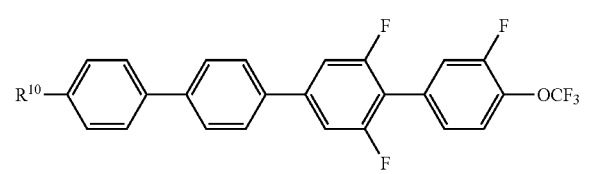

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering low-temperature solubility, transition temperature, electrical reliability, birefringence, etc., one or more compounds are preferably used in combination and more preferably one to three or more compounds are used in combination.

The content of the compound represented by general formula (ii-4) relative to the total mass of the liquid crystal composition of the present invention is preferably 3% by mass or more and 20% by mass or less, more preferably 6% by mass or more and 16% by mass or less, yet more preferably 9% by mass or more and 12% by mass or less, and most preferably 9% by mass or more and 10% by mass or less considering low-temperature solubility, transition temperature, electrical reliability, etc.

The compound represented by general formula (ii-4) used in the liquid crystal composition of the present invention is specifically preferably any of compounds represented by formula (ii-4.1) to formula (ii-4.4) and, of these, a compound represented by formula (ii-4.2) is preferably contained.

[Chem. 18]

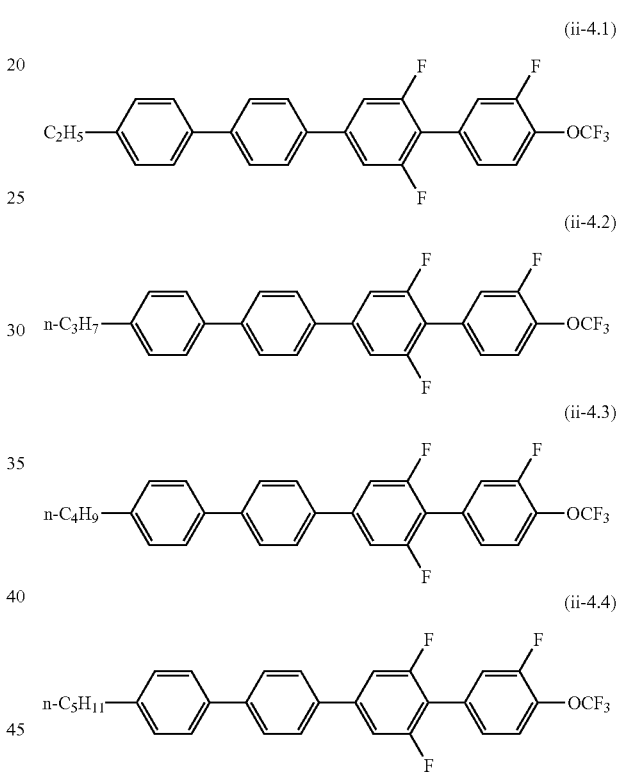

In the liquid crystal composition of the present invention, the content of the compound represented by formula (ii-4.2) relative to the total mass of the liquid crystal composition of the present invention is preferably 1 to 10% by mass, more preferably 2 to 8% by mass, and most preferably 2 to 5% by mass.

The compound represented by general formula (ii) described above is preferably a compound represented by general formula (ii-5) below.

[Chem. 19]

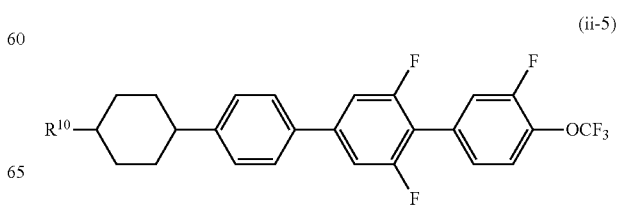

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering low-temperature solubility, transition temperature, electrical reliability, birefringence, etc., one or more compounds are preferably used in combination and more preferably one to three or more compounds are used in combination.

The content of the compound represented by general formula (ii-5) relative to the total mass of the liquid crystal composition of the present invention is preferably 3% by mass or more and 20% by mass or less, more preferably 6% by mass or more and 16% by mass or less, yet more preferably 9% by mass or more and 12% by mass or less, and most preferably 9% by mass or more and 10% by mass or less considering low-temperature solubility, transition temperature, electrical reliability, etc.

The compound represented by general formula (ii-5) used in the liquid crystal composition of the present invention is specifically preferably any of compounds represented by formula (ii-5.1) to formula (ii-5.4) and, of these, a compound represented by formula (ii-5.2) is preferably contained.

[Chem. 20]

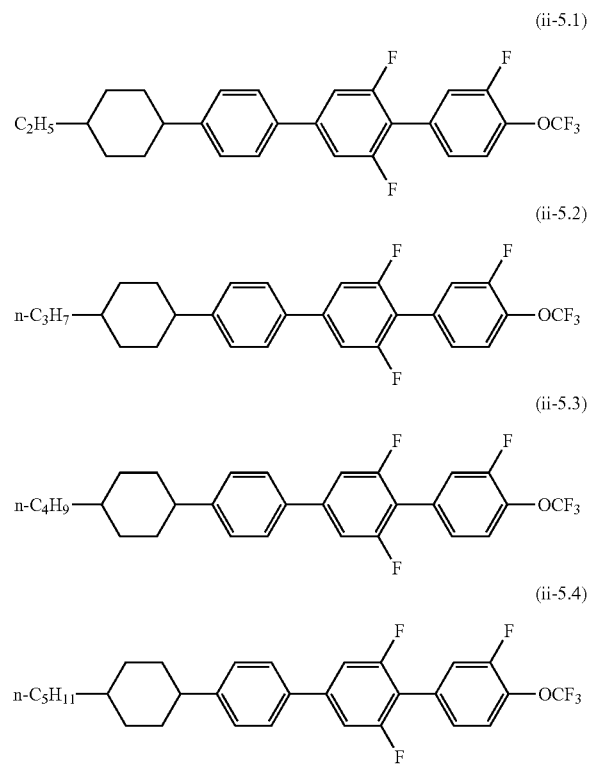

In the liquid crystal composition of the present invention, the content of the compound represented by formula (ii-5.2) relative to the total mass of the liquid crystal composition of the present invention is preferably 1% by mass or more and 35% by mass or less, more preferably 2% by mass and 25% by mass or less, more preferably 3% by mass or more and 20% by mass or less, yet more preferably 3% by mass or more and 15% by mass or less, still more preferably 3% by mass or more and 10% by mass or less, and most preferably 4% by mass or more and 10% by mass or less.

The compound represented by general formula (ii) used in the liquid crystal composition of the present invention is preferably a compound represented by general formula (ii-6).

[Chem. 21]

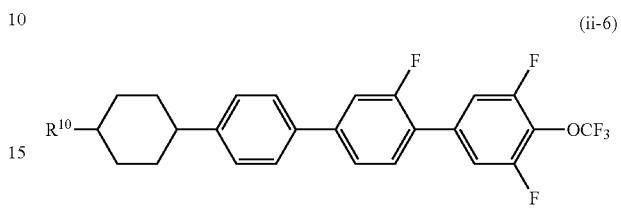

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering low-temperature solubility, transition temperature, electrical reliability, birefringence, etc., one or more compounds are preferably used in combination.

The content of the compound represented by general formula (ii-6) relative to the total mass of the liquid crystal composition of the present invention is preferably 3% by mass or more and 20% by mass or less, more preferably 6% by mass or more and 16% by mass or less, yet more preferably 9% by mass or more and 12% by mass or less, and most preferably 9% by mass or more and 10% by mass or less considering low-temperature solubility, transition temperature, electrical reliability, etc.

The compound represented by general formula (ii-6) used in the liquid crystal composition of the present invention is specifically preferably any of compounds represented by formula (ii-6.1) to formula (ii-6.4) and, of these, a compound represented by formula (ii-6.2) is preferably contained.

[Chem. 22]

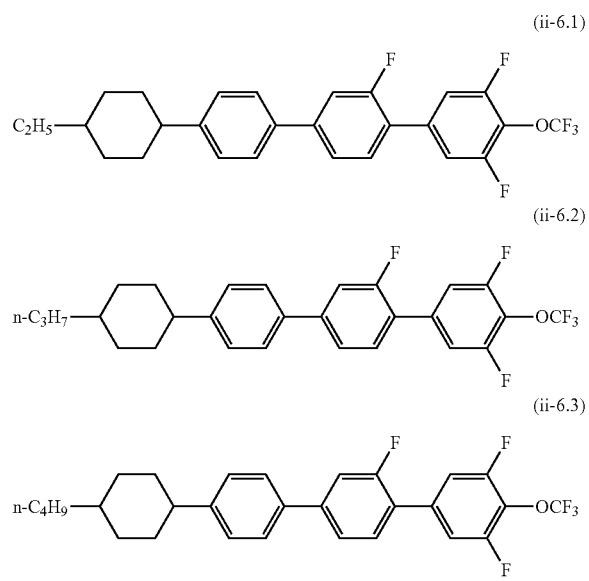

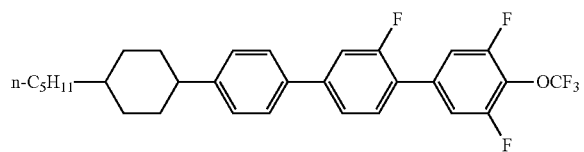

(ii-6.4)

The number of compounds that can be used in combination is not particularly limited. Of these compounds, one to three compounds are preferably contained and one or two compounds are more preferably contained.

Preferably, (ii-1.2) is used alone, (ii-2.2) is used alone, (ii-3.2) is used alone, (ii-4.2) is used alone, (ii-1.2) and (ii-1.4) are used in combination, (ii-1.2) and (ii-2.2) are used in combination, and (ii-1.2) and (ii-4.2) are used in combination.

The content of the compound represented by general formula (ii) relative to the total mass of the liquid crystal composition of the present invention is preferably 1 to 25% by mass, more preferably 2 to 20% by mass, and most preferably 4 to 16 considering low-temperature solubility, transition temperature, electrical reliability, etc.

The total content of the compounds represented by general formula (i) and general formula (ii) relative to the total mass of the liquid crystal composition of the present invention is preferably 10% by mass or more and 30% by mass or less, preferably 13% by mass or more and 28% by mass or less, preferably 16% by mass or more and 25% by mass or less, and preferably 17% by mass or more and 24% by mass or less.

A total of two to four, preferably three or four, and more preferably three compounds represented by general formula (i) and general formula (ii) are preferably used. In the case where a total of three compounds represented by general formula (i) and general formula (ii) are used, it is preferable to use two compounds represented by general formula (i) and one compound represented by general formula (ii). In such a case, a compound represented by formula (i-1-1.1) and a compound represented by formula (i-1-1.6), a compound represented by formula (i-1-1.1) and a compound represented by formula (i-1-1.3), or a compound represented by formula (i-1-1.1) and a compound represented by (i-1-1.4) are preferably used as the two compounds represented by general formula (i); and a compound represented by formula (ii-1.2) is preferably used as one compound represented by general formula (ii).

The liquid crystal composition of the present invention can contain one or more compounds represented by general formula (L).

[Chem. 23]

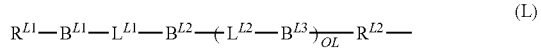
(L)

(In the formula, $R^{L1}$ and $R^{L2}$ each independently represent an alkyl group having 1 to 8 carbon atoms where one —$CH_2$— or two or more nonadjacent —$CH_2$— in the alkyl group may each independently be substituted with —CH=CH—, —C≡C—, —O—, —CO—, —COO—, or —OCO—, OL represents 0, 1, 2, or 3,
$B^{L1}$, $B^{L2}$, and $B^{L3}$ each independently represent a group selected from the group consisting of
(a) a 1,4-cyclohexylene group (where one —$CH_2$— or two or more nonadjacent —$CH_2$— present in this group may be substituted with —O—) and
(b) a 1,4-phenylene group (where one —CH= or two or more nonadjacent —CH= present in this group may be substituted with —N=),
wherein one or more hydrogen atoms in the group (a) or (b) described above may each independently be substituted with a cyano group, a fluorine atom, or a chlorine atom,
$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and
when OL represents 2 or 3 and two or more $L^{L2}$ are present, they may be the same or different and when OL represents 2 or 3 and two or more $B^{L3}$ are present, they may be the same or different. Compounds represented by general formula (i) are excluded.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, six in another embodiment of the present invention, seven in yet another embodiment of the present invention, eight in yet another embodiment of the present invention, nine in another embodiment of the present invention, and ten or more in another embodiment of the present invention.

In the liquid crystal composition of the present invention, the content of the compound represented by general formula (L) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 1 to 95% by mass according to one embodiment of the present invention. In another embodiment of the present invention, the content is 10 to 95% by mass. In another embodiment of the present invention, the content is 20 to 95% by mass. In another embodiment of the present invention, the content is 30 to 95% by mass. In another embodiment of the present invention, the content is 40 to 95% by mass. In another embodiment of the present invention, the content is 50 to 95% by mass. In another embodiment of the present invention, the content is 55 to 95% by mass. In another embodiment of the present invention, the content is 60 to 95% by mass. In another embodiment of the present invention, the content is 65 to 95% by mass. In another embodiment of the present invention, the content is 70 to 95% by mass. In another embodiment of the present invention, the content is 75 to 95% by mass. In another embodiment of the present invention, the content is 80 to 95% by mass.

The content of the aforementioned compound relative to the total mass of the liquid crystal composition of the present invention is, for example, 1 to 95% in one embodiment of the present invention. In another embodiment of the present invention, the content is 1 to 85%. In another embodiment of the present invention, the content is 1 to 75%. In another embodiment of the present invention, the content is 1 to 65%. In another embodiment of the present invention, the content is 1 to 55%. In another embodiment of the present invention, the content is 1 to 45%. In another embodiment of the present invention, the content is 1 to 35%. In another embodiment of the present invention, the content is 1 to 25%.

In order to keep viscosity of the liquid crystal composition of the present invention to a low level and response speed to a high level, the lower limit and the upper limit of the above-described content are preferably high. In order to keep Tni of the liquid crystal composition of the present invention to a high level and temperature stability to a high level, the lower limit and the upper limit of the above-described content are preferably high. In order to increase the dielectric anisotropy to keep the driving voltage low, the lower limit and the upper limit of the above-described content are preferably low.

In the case where the ring structures with which $R^{L1}$ and $R^{L2}$ bond are phenyl groups (aromatics), $R^{L1}$ and $R^{L2}$ preferably each represent a linear alkyl group having 1 to 5 carbon atoms, a linear alkoxy group having 1 to 4 (or more) carbon atoms, or an alkenyl group having 4 or 5 carbon atoms. In the case where the ring structures with which $R^{L1}$ and $R^{L2}$ bond are saturated ring structures such as cyclohexane, pyran, and dioxane, $R^{L1}$ and $R^{L2}$ preferably each represent a linear alkyl group having 1 to 5 carbon atoms, a linear alkoxy group having 1 to 4 (or more) carbon atoms, or a linear alkenyl group having 2 to 5 carbon atoms.

In the case where the liquid crystal composition needs to be chemically stable, the compound represented by general formula (L) preferably contains no chlorine atoms in the molecule.

The compound represented by general formula (L) is preferably a compound selected from the group of compounds represented by general formula (I), for example.

[Chem. 24]

$$R^{11}\text{-}A^{11}\text{-}A^{12}\text{-}R^{12} \qquad (I)$$

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms, and $A^{11}$ and $A^{12}$ each independently represent a 1,4-cyclohexylene group, a 1,4-phenylene group, a 2-fluoro-1,4-phenylene group, or a 3-fluoro-1,4-phenylene group.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention.

In the liquid crystal composition of the present invention, the content of the compound represented by general formula (I) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3 to 75% by mass according to one embodiment of the present invention. In another embodiment of the present invention, the content is 15 to 75% by mass. In another embodiment of the present invention, the content is 18 to 75% by mass. In another embodiment of the present invention, the content is 20 to 75% by mass. In another embodiment of the present invention, the content is 29 to 75% by mass. In another embodiment of the present invention, the content is 35 to 75% by mass. In another embodiment of the present invention, the content is 42 to 75% by mass. In another embodiment of the present invention, the content is 47 to 75% by mass. In another embodiment of the present invention, the content is 53 to 75% by mass. In another embodiment of the present invention, the content is 56 to 75% by mass. In another embodiment of the present invention, the content is 60 to 75% by mass. In another embodiment of the present invention, the content is 65 to 75% by mass.

The content relative to the total mass of the liquid crystal composition of the present invention is, for example 3 to 75% by mass in one embodiment of the present invention. In another embodiment of the present invention, the content is 3 to 65% by mass. In another embodiment of the present invention, the content is 3 to 55% by mass. In another embodiment of the present invention, the content is 3 to 50% by mass. In another embodiment of the present invention, the content is 3 to 45% by mass. In another embodiment of the present invention, the content is 3 to 40% by mass. In another embodiment of the present invention, the content is 3 to 35% by mass. In another embodiment of the present invention, the content is 3 to 30% by mass.

In order to keep viscosity of the liquid crystal composition of the present invention to a low level and response speed to a high level, the lower limit and the upper limit of the above-described content are preferably high. In order to keep Tni of the liquid crystal composition of the present invention to a high level and temperature stability to a high level, the lower limit and the upper limit of the above-described content are preferably medium. In order to increase the dielectric anisotropy to keep the driving voltage low, the lower limit and the upper limit of the above-described content are preferably low.

The compound represented by general formula (I) is preferably a compound selected from the group of compounds represented by general formula (I-1).

[Chem. 25]

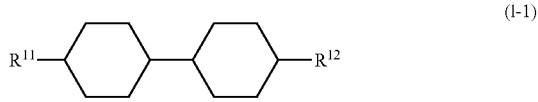

(I-1)

(In the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, and five or more in another embodiment of the present invention.

In the liquid crystal composition of the present invention, the content of the compound represented by general formula (I-1) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3 to 70% by mass according to one embodiment of the present invention. In another embodiment of the present invention, the content is 15 to 70% by mass. In another embodiment of the present invention, the content is 18 to 70% by mass. In another embodiment of the present invention, the content is 25 to 70% by mass. In another embodiment of the present invention, the content is 29 to 70% by mass. In another embodiment of the present invention, the content is 31 to 70% by mass. In another embodiment of the present invention, the content is 35 to 70% by mass. In another embodiment of the present invention, the content is 43 to 70% by mass. In another embodiment of the present invention, the content is 47 to 70% by mass. In another embodiment of the present invention, the content is 50 to 70% by mass. In another embodiment of the present invention, the content is 53 to 70% by mass. In another embodiment of the present invention, the content is 56 to 70% by mass.

The content of the aforementioned compound relative to the total mass of the liquid crystal composition of the present invention is, for example, 3 to 70% by mass according to one embodiment of the present invention. In another embodiment of the present invention, the content is 3 to 60% by mass. In another embodiment of the present invention, the content is 3 to 50% by mass. In another embodiment of the present invention, the content is 3 to 45% by mass. In another embodiment of the present invention, the content is 3 to 40% by mass. In another embodiment of the present invention, the content is 3 to 35% by mass. In another embodiment of the present invention, the content is 3 to 30% by mass. In another embodiment of the present invention, the content is 3 to 26% by mass.

In order to keep viscosity of the liquid crystal composition of the present invention to a low level and response speed to a high level, the lower limit and the upper limit of the above-described content are preferably high. In order to keep Tni of the liquid crystal composition of the present invention to a high level and temperature stability to a high level, the lower limit and the upper limit of the above-described content are preferably medium. In order to increase the dielectric anisotropy to keep the driving voltage low, the lower limit and the upper limit of the above-described content are preferably low.

The compound represented by general formula (I-1) is preferably a compound selected from the group of compounds represented by general formula (I-1-1).

[Chem. 26]

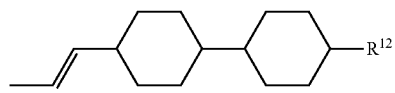

(I-1-1)

(In the formula, $R^{12}$ independently represents an alkyl group having 1 to 5 carbon atoms, an alkenyl group having 2 to 5 carbon atoms, or an alkoxy group having 1 to 5 carbon atoms.)

In the liquid crystal composition of the present invention, the content of the compound represented by general formula (I-1-1) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 2 to 60% by mass according to one embodiment of the present invention. In another embodiment of the present invention, the content is 4 to 60% by mass. In another embodiment of the present invention, the content is 7 to 60% by mass. In another embodiment of the present invention, the content is 11 to 60% by mass. In another embodiment of the present invention, the content is 13 to 60% by mass. In another embodiment of the present invention, the content is 15 to 60% by mass. In another embodiment of the present invention, the content is 17 to 60% by mass. In another embodiment of the present invention, the content is 20 to 60% by mass. In another embodiment of the present invention, the content is 25 to 60% by mass. In another embodiment of the present invention, the content is 30 to 60% by mass. In another embodiment of the present invention, the content is 32 to 60% by mass. In another embodiment of the present invention, the content is 35 to 60% by mass.

The content of the aforementioned compound relative to the total mass of the liquid crystal composition of the present invention is, for example, 2 to 60% by mass according to one embodiment of the present invention. In another embodiment of the present invention, the content is 2 to 50% by mass. In another embodiment of the present invention, the content is 2 to 40% by mass. In another embodiment of the present invention, the content is 2 to 35% by mass. In another embodiment of the present invention, the content is 2 to 30% by mass. In another embodiment of the present invention, the content is 2 to 25% by mass. In another embodiment of the present invention, the content is 2 to 20% by mass. In another embodiment of the present invention, the content is 2 to 15% by mass.

The compound represented by general formula (I-1-1) is preferably a compound selected from the group of compounds represented by formula (1.1) to formula (1.3), is preferably a compound represented by formula (1.2) or formula (1.3), and is more preferably a compound represented by formula (1.3).

[Chem. 27]

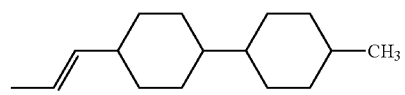

(I-1)

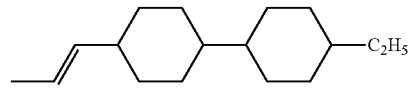

(I-2)

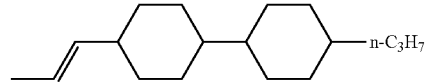

(I-3)

When a compound represented by formula (1.2) or formula (1.3) is used alone, the content of the compound represented by formula (1.2) is preferably relatively high to improve the response speed. The content of the compound represented by formula (1.3) is preferably in the range described below since a liquid crystal composition having high response speed and high electrical and optical reliability can be prepared.

The content of the compound represented by formula (1.3) relative to the total mass of the liquid crystal composition of the present invention is preferably 3 to 35% by mass, more preferably 4 to 25% by mass, and most preferably 4 to 20% by mass or less. The content of the aforementioned compound relative to the total mass of the liquid crystal composition of the present invention is, for example, 4 to 6% by mass according to one embodiment of the present invention. In another embodiment of the present invention, the content is 7 to 9% by mass. In another embodiment of the present invention, the content is 12 to 18% by mass.

The compound represented by general formula (I-1) is preferably a compound selected from the group of compounds represented by general formula (I-1-2).

[Chem. 28]

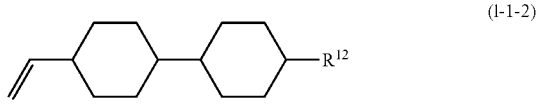

(I-1-2)

(In the formula, $R^{12}$ independently represents an alkyl group having 1 to 5 carbon atoms, an alkoxy group having 1 to 5 carbon atoms, or an alkenyl group having 2 to 5 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, and three in another embodiment of the present invention.

In the liquid crystal composition of the present invention, the content of the compound represented by general formula (I-1-2) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 7 to 60% by mass according to one embodiment of the present invention. In another embodiment of the present invention, the content is 15 to 60% by mass. In another embodiment of the present invention, the content is 18 to 60% by mass. In another embodiment of the present invention, the content is 21 to 60% by mass. In another embodiment of the present invention, the content is 24 to 60% by mass. In another embodiment of the present invention, the content is 27 to 60% by mass. In another embodiment of the present invention, the content is 30 to 60% by mass. In another embodiment of the present invention, the content is 34 to 60% by mass. In another embodiment of the present invention, the content is 37 to 60% by mass. In another embodiment of the present invention, the content is 41 to 60% by mass. In another embodiment of the present invention, the content is 47 to 60% by mass. In another embodiment of the present invention, the content is 50 to 60% by mass.

The content of the aforementioned compound relative to the total mass of the liquid crystal composition of the present invention is, for example, 7 to 60% by mass according to one embodiment of the present invention. In another embodiment of the present invention, the content is 7 to 55% by mass. In another embodiment of the present invention, the content is 7 to 45% by mass. In another embodiment of the present invention, the content is 7 to 40% by mass. In another embodiment of the present invention, the content is 7 to 35% by mass. In another embodiment of the present invention, the content is 7 to 30% by mass. In another embodiment of the present invention, the content is 7 to 25% by mass. In another embodiment of the present invention, the content is 7 to 20% by mass.

The compound represented by general formula (I-1-2) is preferably a compound selected from the group of compounds represented by formula (2.1) to formula (2.4) and is preferably any of compounds represented by formula (2.2) to formula (2.4). In particular, the compound represented by formula (2.2) is preferable since it particularly improves the response speed of the liquid crystal composition of the present invention. If high Tni is more desirable than response speed, the compound represented by formula (2.3) or formula (2.4) is preferably used. The content of the compounds represented by formula (2.3) and formula (2.4) is preferably less than 20% to improve low-temperature solubility.

[Chem. 29]

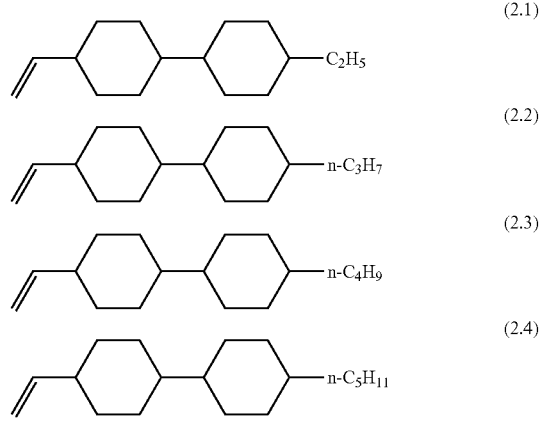

In the liquid crystal composition of the present invention, the content of the compound represented by formula (2.2) relative to the total mass of the liquid crystal composition of the present invention is preferably 5% by mass or more and 55% by mass or less. A more preferable example of this content is 7% by mass and 47% by mass or less.

In the liquid crystal composition of the present invention, the content of the compound represented by formula (2.2) relative to the total mass of the liquid crystal composition of the present invention is preferably 5% by mass or more and 55% by mass or less, more preferably 15 to 50% by mass, yet more preferably 25 to 48% by mass, still more preferably 35 to 48% by mass, and most preferably 40 to 48% by mass.

The liquid crystal composition of the invention of the subject application can further contain a compound represented by formula (2.5) having a structure similar to a compound represented by general formula (I-1-2).

[Chem. 30]

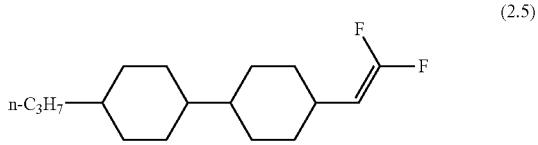

(2.5)

The content of the compound represented by formula (2.5) is preferably adjusted according to the desired performance such as low-temperature solubility, transition temperature, electrical reliability, and birefringence. The content of this compound relative to the total mass of the liquid crystal composition of the present invention is preferably 11% by mass or more, more preferably 15% by mass, more preferably 23% by mass, yet more preferably 26% by mass or more, and most preferably 28% by mass or more.

The compound represented by general formula (I) is preferably a compound selected from the group of compounds represented by general formula (I-2).

[Chem. 31]

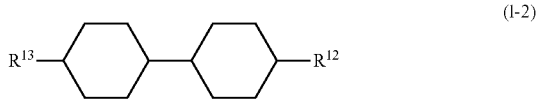

(I-2)

(In the formula, $R^{13}$ and $R^{14}$ each independently represent an alkyl group having 1 to 5 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, and three in another embodiment of the present invention.

In the liquid crystal composition of the present invention, the content of the compound represented by general formula (I-2) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3 to 60% by mass according to one embodiment of the present invention. In another embodiment of the present invention, the content is 4 to 60% by mass. In another embodiment of the present invention, the content is 15 to 60% by mass. In another embodiment of the present invention, the content is 25 to 60% by mass. In another embodiment of the present invention, the content is 30 to 60% by mass. In another embodiment of the present invention, the content is 35 to 60% by mass. In another embodiment of the present invention, the content is 38 to 60% by mass. In another embodiment of the present invention, the content is 40 to 60% by mass. In another embodiment of the present invention, the content is 42 to 60% by mass. In another embodiment of the present invention, the content is 45 to 60% by mass. In another embodiment of the present invention, the content is 47 to 60% by mass. In another embodiment of the present invention, the content is 50 to 60% by mass.

The content of the aforementioned compound relative to the total mass of the liquid crystal composition of the present invention is, for example, 3 to 60% by mass according to one embodiment of the present invention. In another embodiment of the present invention, the content is 3 to 55% by mass. In another embodiment of the present invention, the content is 3 to 45% by mass. In another embodiment of the present invention, the content is 3 to 40% by mass. In another embodiment of the present invention, the content is 3 to 30% by mass. In another embodiment of the present invention, the content is 3 to 20% by mass. In another embodiment of the present invention, the content is 3 to 15% by mass. In another embodiment of the present invention, the content is 3 to 5% by mass.

The compound represented by general formula (I-2) is preferably a compound selected from the group of compounds represented by formula (3.1) to formula (3.4) and is preferably a compound represented by formula (3.1), formula (3.3), or formula (3.4). In particular, the compound represented by formula (3.2) is particularly preferable for improving the response speed of the liquid crystal composition of the present invention. If high Tni is more desirable than response speed, a compound represented by formula (3.3) or formula (3.4) is preferably used. The content of the compounds represented by formula (3.3) and formula (3.4) is preferably less than 20% in order to improve low-temperature solubility.

The compound represented by general formula (I-2) is preferably a compound selected from the group of compounds represented by formula (3.1) to formula (3.4) and is preferably a compound represented by formula (3.1), formula (3.3), and/or formula (3.4).

[Chem. 32]

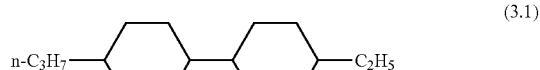

(3.1)

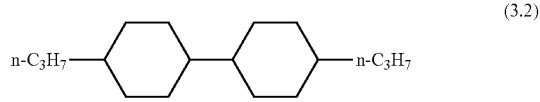

(3.2)

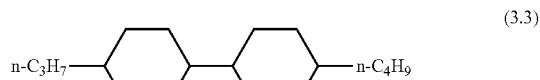

(3.3)

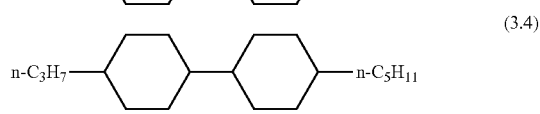

(3.4)

In the liquid crystal composition of the present invention, the content of the compound represented by formula (3.3) relative to the total mass of the liquid crystal composition of the present invention is preferably 2% by mass or more and 40% by mass or less. Examples of the content that are more preferable include 3% by mass or more and 40% by mass or less, 4% by mass or more and 40% by mass or less, or 3% by mass or more and 5% by mass or less, 3% by mass or more and 10% by mass or less, 3% by mass or more and 12% by mass or less, 3% by mass or more and 14% by mass or less, 3% by mass or more and 16% by mass or less, 3% by mass or more and 20% by mass or less, 3% by mass or more and 23% by mass or less, 3% by mass or more and 26% by mass or less, 3% by mass or more and 30% by mass or less, 3% by mass or more and 34% by mass or less, and 3% by mass or more and 37% by mass or less.

The compound represented by general formula (I) is preferably a compound selected from the group of compounds represented by general formula (I-3).

[Chem. 33]

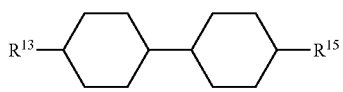

(I-3)

(In the formula, $R^{13}$ represents an alkyl group having 1 to 5 carbon atoms and $R^{15}$ represents an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, and three in another embodiment of the present invention.

In the liquid crystal composition of the present invention, the content of the compound represented by general formula (I-3) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3% by mass according to one embodiment of the present invention. In another embodiment of the present invention, the content is 4 to 60% by mass. In another embodiment of the present invention, the content is 15 to 60% by mass. In another embodiment of the present invention, the content is 25 to 60% by mass. In another embodiment of the present invention, the content is 30 to 60% by mass. In another embodiment of the present invention, the content is 35 to 60% by mass. In another embodiment of the present invention, the content is 38 to 60% by mass. In another embodiment of the present invention, the content is 40 to 60% by mass. In another embodiment of the present invention, the content is 42 to 60% by mass. In another embodiment of the present invention, the content is 45 to 60% by mass. In another embodiment of the present invention, the content is 47 to 60% by mass. In another embodiment of the present invention, the content is 50 to 60% by mass.

The content of the aforementioned compound relative to the total mass of the liquid crystal composition of the present invention is, for example, 3 to 60% by mass according to one embodiment of the present invention. In another embodiment of the present invention, the content is 3 to 55% by mass. In another embodiment of the present invention, the content is 3 to 45% by mass. In another embodiment of the present invention, the content is 3 to 40% by mass. In another embodiment of the present invention, the content is 3 to 30% by mass. In another embodiment of the present invention, the content is 3 to 20% by mass. In another embodiment of the present invention, the content is 3 to 15% by mass. In another embodiment of the present invention, the content is 3 to 5% by mass.

When low-temperature solubility is important, setting the content to a relatively high level is highly effective; in contrast, when response speed is important, setting the content to a relatively low level is highly effective. In order to improve drop marks and ghosting properties, the content range is preferably set to an intermediate level.

The compound represented by general formula (I-3) is preferably a compound selected from the group of compounds represented by formula (4.1) to formula (4.3) and is preferably a compound represented by formula (4.3).

[Chem. 34]

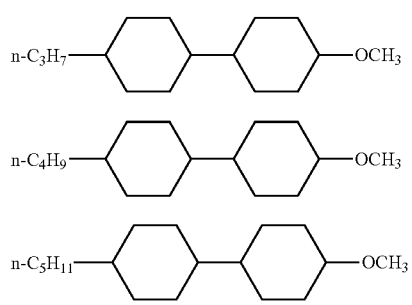

The content of the compound represented by formula (4.3) relative to the total mass of the liquid crystal composition of the present invention is preferably 2% by mass or more and 30% by mass or less, more preferably 4% by mass or more and 30% by mass or less, more preferably 6% by mass or more and 30% by mass or less, more preferably 8% by mass or more and 30% by mass or less, more preferably 10% by mass or more and 30% by mass or less, more preferably 12% by mass or more and 30% by mass or less, more preferably 14% by mass or more and 30% by mass or less, more preferably 16% by mass or more and 30% by mass or less, more preferably 18% by mass or more and 25% by mass or less, more preferably 20% by mass or more and 24% by mass or less, and particularly preferably 22% by mass or more and 23% by mass or less.

The compound represented by general formula (I) is preferably a compound selected from the group of compounds represented by general formula (I-4).

[Chem. 35]

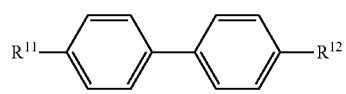

(I-4)

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention and two in another embodiment of the present invention.

In the liquid crystal composition of the present invention, the content of the compound represented by general formula (I-4) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3 to 50% by mass according to one embodiment of the present invention. In another embodiment of the present invention, the content is 5 to 50% by mass. In another embodiment of the present invention, the content 6 to 50% by mass. In another embodiment of the present invention, the content 8 to 50% by mass. In another embodiment of the present invention, the content 10 to 50% by mass. In another embodiment of the present invention, the content 12 to 50% by mass. In another embodiment of the present invention, the content 15 to 50% by mass. In another embodiment of the present invention, the content 20 to 50% by mass. In another embodiment of the present invention, the content 25 to 50% by mass. In another embodiment of the present invention, the content 30 to 50% by mass. In another embodiment of the present invention, the content 35 to 50% by mass. In another embodiment of the present invention, the content 40 to 50% by mass.

The content of the aforementioned compound relative to the total mass of the liquid crystal composition of the present invention is, for example, 3 to 50% by mass according to one embodiment of the present invention. In another embodiment of the present invention, the content is 3 to 40% by mass. In another embodiment of the present invention, the content is 3 to 35% by mass. In another embodiment of the present invention, the content is 3 to 30% by mass. In another embodiment of the present invention, the content is 3 to 20% by mass. In another embodiment of the present invention, the content is 3 to 15% by mass. In another embodiment of the present invention, the content is 3 to 10% by mass. In another embodiment of the present invention, the content is 3 to 5% by mass.

Setting the content to a relatively high level is highly effective for obtaining high birefringence. In contrast, setting the content to a relatively low level is highly effective when high Tni is important. In order to improve drop marks and ghosting properties, the content range is preferably set to an intermediate level.

The compound represented by general formula (I-4) is preferably a compound selected from the group of compounds represented by formula (5.1) to formula (5.4) and is preferably any of compounds represented by formula (5.2) to formula (5.4).

[Chem. 36]

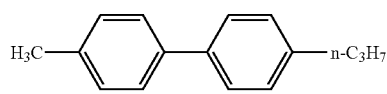

(5.1)

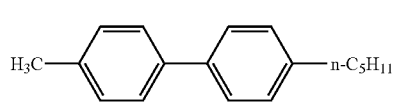

(5.2)

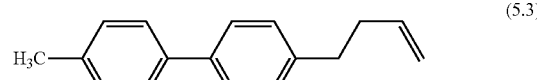

(5.3)

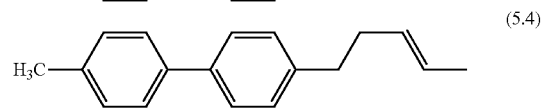

(5.4)

The content of the compound represented by formula (5.2) relative to the total mass of the liquid crystal composition of the present invention is preferably 2 to 30% by mass, more preferably 4 to 20% by mass, yet more preferably 6 to 15% by mass, and most preferably 8 to 12% by mass.

The content of the compound represented by formula (5.4) relative to the total mass of the liquid crystal composition of the present invention is preferably 2 to 30% by mass, more preferably 4 to 20% by mass, yet more preferably 6 to 15% by mass, and most preferably 8 to 12% by mass.

The compound represented by general formula (I) is preferably a compound selected from the group of compounds represented by general formula (I-5).

[Chem. 37]

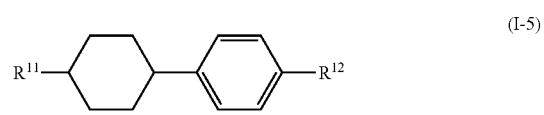

(I-5)

(In the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention and two in another embodiment of the present invention.

In the liquid crystal composition of the present invention, the content of the compound represented by general formula (I-5) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 1 to 50% by mass according to one embodiment of the present invention. In another embodiment of the present invention, the content is 5 to 50% by mass. In another embodiment of the present invention, the content is 8 to 50% by mass. In another embodiment of the present invention, the content is 11 to 50% by mass. In another embodiment of the present invention, the content is 13 to 50% by mass. In another embodiment of the present invention, the content is 15 to 50% by mass. In another embodiment of the present invention, the content is 17 to 50% by mass. In another embodiment of the present invention, the content is 20 to 50% by mass. In another embodiment of the present invention, the content is 25 to 50% by mass. In another embodiment of the present invention, the content is 30 to 50% by mass. In another embodiment of the present invention, the content is 35 to 50% by mass. In another embodiment of the present invention, the content is 40 to 50% by mass.

The content of the aforementioned compound relative to the total mass of the liquid crystal composition of the present invention is, for example, 1 to 50% by mass according to one embodiment of the present invention. In another embodiment of the present invention, the content is 1 to 40%. In another embodiment of the present invention, the content is 1 to 35%. In another embodiment of the present invention, the content is 1 to 30%. In another embodiment of the present invention, the content is 1 to 20%. In another embodiment of the present invention, the content is 1 to 15%. In another embodiment of the present invention, the content is 1 to 10%. In another embodiment of the present invention, the content is 1 to 5%.

When low-temperature solubility is important, setting the content to a relatively high level is highly effective; in contrast, when response speed is important, setting the content to a relatively low level is highly effective. In order to improve drop marks and ghosting properties, the content range is preferably set to an intermediate level.

The compound represented by general formula (I-5) is preferably a compound selected from the group of compounds represented by formula (6.1) to formula (6.6) and is preferably any of compounds represented by formula (6.3), formula (6.4), and formula (6.6).

[Chem. 38]

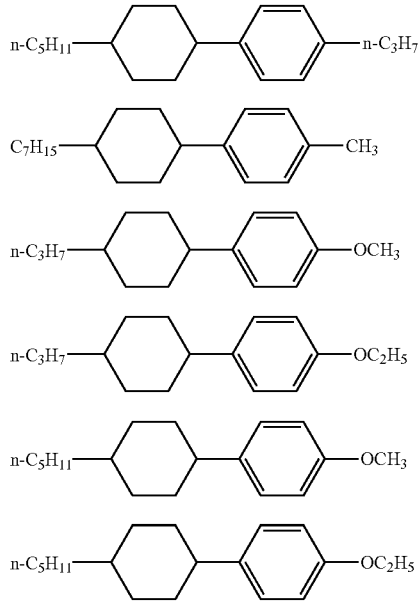

The content of the compound represented by formula (6.3) relative to the total mass of the liquid crystal composition of the present invention is, for example, preferably 2% by mass or more and 30% by mass or less, more preferably 4% by mass or more and 30% by mass or less, more preferably 5% by mass or more and 30% by mass or less, more preferably 6% by mass or more and 30% by mass or less, more preferably 9% by mass or more and 30% by mass or less, and more preferably 10% by mass or more and 30% by mass or less.

The liquid crystal composition of the invention of the subject application may further contain compounds represented by formula (6.7) and formula (6.8).

[Chem. 39]

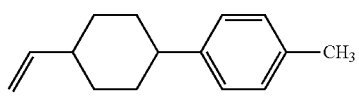

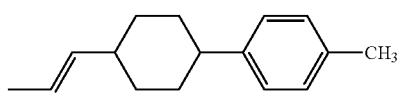

The content of the compounds represented by formula (6.7) and formula (6.8) is preferably adjusted in accordance with desired performance, such as low-temperature solubility, transition temperature, electrical reliability, and birefringence. The content of this compound relative to the total mass of the liquid crystal composition of the present invention is preferably 2% by mass or more, more preferably 3% by mass or more, yet more preferably 4% by mass or more, still preferably 5% by mass or more, and most preferably 7% by mass or more.

The compound represented by general formula (I) is preferably a compound selected from the group of compounds represented by general formula (I-6).

[Chem. 40]

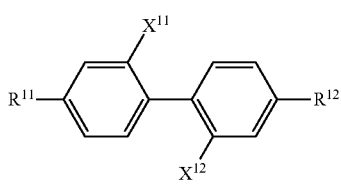

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms, $X^{11}$ and $X^{12}$ each independently represent a fluorine atom or a hydrogen atom, and one of $X^{11}$ and $X^{12}$ represents a fluorine atom.)

The content of the compound represented by general formula (I-6) relative to the total mass of the liquid crystal composition of the present invention is preferably 2% by mass or more and 30% by mass or less, more preferably 4% by mass or more and 30% by mass or less, more preferably 5% by mass or more and 30% by mass or less, more preferably 6% by mass or more and 30% by mass or less, more preferably 9% by mass or more and 30% by mass or less, more preferably 12% by mass or more and 30% by mass or less, more preferably 14% by mass or more and 30% by mass or less, more preferably 16% by mass or more and 30% by mass or less, more preferably 18% by mass or more and 25% by mass or less, more preferably 20% by mass or more and 24% by mass or less, and particularly preferably 22% by mass or more and 23% by mass or less.

The compound represented by general formula (I-6) is preferably a compound represented by formula (7.1).

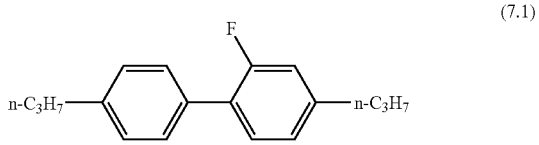
(7.1)

The compound represented by general formula (I) is preferably a compound selected from the group of compounds represented by general formula (I-7).

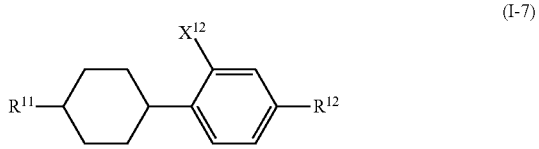
(I-7)

(In the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms and $X^{12}$ independently represents a fluorine atom or a chlorine atom.)

The content of the compound represented by general formula (I-7) relative to the total mass of the liquid crystal composition of the present invention is preferably 1% by mass or more and 30% by mass or less, more preferably 2% by mass or more and 30% by mass or less, more preferably 3% by mass or more and 30% by mass or less, more preferably 4% by mass or more and 30% by mass or less, more preferably 6% by mass or more and 30% by mass or less, more preferably 8% by mass or more and 30% by mass or less, more preferably 10% by mass or more and 30% by mass or less, more preferably 12% by mass or more and 30% by mass or less, more preferably 15% by mass or more and 25% by mass or less, more preferably 18% by mass or more and 24% by mass or less, and more preferably 21% by mass or more and 22% by mass or less.

The compound represented by general formula (I-7) is preferably a compound represented by formula (8.1).

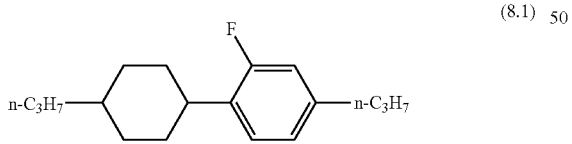
(8.1)

The compound represented by general formula (I) is preferably a compound selected from the group of compounds represented by general formula (I-8).

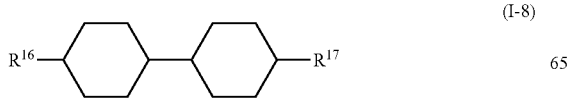
(I-8)

(In the formula, $R^{16}$ and $R^{17}$ each independently represent an alkenyl group having 2 to 5 carbon atoms.)

The number of compounds that can be used in combination is not particularly limited. One to three compounds are preferably used in combination in accordance with desired performance, such as low-temperature solubility, transition temperature, electrical reliability, and birefringence.

The content of the compound represented by general formula (I-8) relative to the total mass of the liquid crystal composition of the present invention is preferably 5% by mass or more and 65% by mass or less, more preferably 10% by mass or more and 65% by mass or less, more preferably 15% by mass or more and 65% by mass or less, more preferably 20% by mass or more and 65% by mass or less, more preferably 25% by mass or more and 65% by mass or less, more preferably 30% by mass or more and 65% by mass or less, more preferably 35% by mass or more and 65% by mass or less, more preferably 40% by mass or more and 65% by mass or less, more preferably 45% by mass or more and 60% by mass or less, more preferably 50% by mass or more and 58% by mass or less, and particularly preferably 55% by mass or more and 56% by mass or less according to the desired performance such as low-temperature solubility, transition temperature, electrical reliability, birefringence, process compatibility, drop marks, ghosting, and dielectric anisotropy.

The compound represented by general formula (I-8) is preferably a compound selected from the group of compounds represented by formula (9.1) to formula (9.10) and is preferably any of compounds represented by formula (9.2), formula (9.4), and formula (9.7).

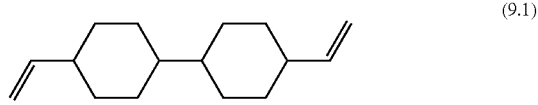
(9.1)

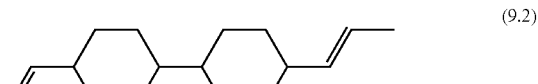
(9.2)

(9.3)

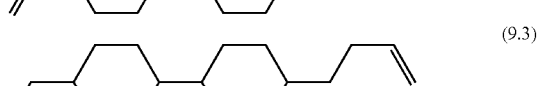
(9.4)

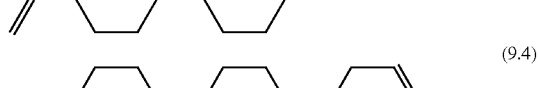
(9.5)

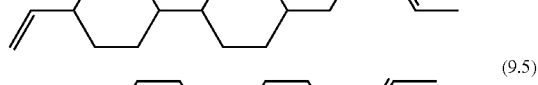
(9.6)

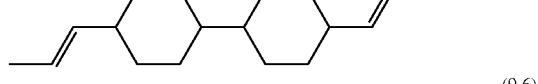
(9.7)

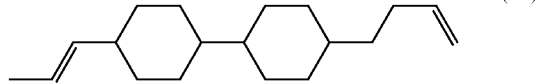

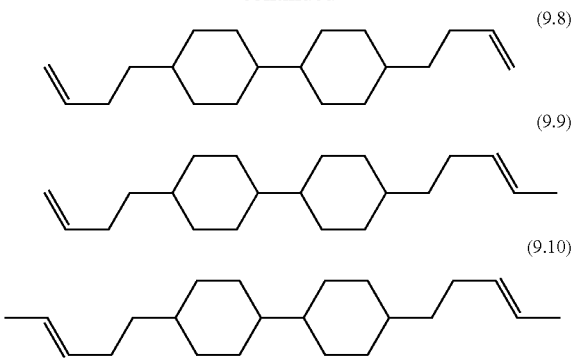

(9.8)

(9.9)

(9.10)

The compound represented by general formula (L) is preferably a compound selected from compounds represented by general formula (II), for example.

[Chem. 46]

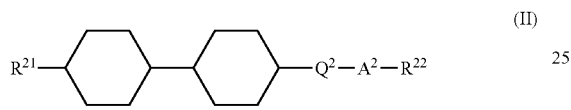

(II)

($R^{21}$ and $R^{22}$ each independently represent an alkenyl group having 2 to 5 carbon atoms, an alkyl group having 1 to 5 carbon atoms, or an alkoxy group having 1 to 4 carbon atoms, $A^2$ represents a 1,4-cyclohexylene group or a 1,4-phenylene group, and $Q^2$ represents a single bond, —COO—, —$CH_2$—$CH_2$—, or —$CF_2O$—.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, and four or more in another embodiment of the present invention.

In the liquid crystal composition of the present invention, the content of the compound represented by general formula (II) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3 to 50% by mass according to one embodiment of the present invention. In another embodiment of the present invention, the content is 5 to 50% by mass. In another embodiment of the present invention, the content is 7 to 50% by mass. In another embodiment of the present invention, the content is 10 to 50% by mass. In another embodiment of the present invention, the content is 14 to 50% by mass. In another embodiment of the present invention, the content is 16 to 50% by mass. In another embodiment of the present invention, the content is 20 to 50% by mass. In another embodiment of the present invention, the content is 23 to 50% by mass. In another embodiment of the present invention, the content is 26 to 50% by mass. In another embodiment of the present invention, the content is 30 to 50% by mass. In another embodiment of the present invention, the content is 35 to 50% by mass. In another embodiment of the present invention, the content is 40 to 50% by mass.

The content of the aforementioned compound relative to the total mass of the liquid crystal composition of the present invention is, for example, 3 to 50% in one embodiment of the present invention. In another embodiment of the present invention, the content is 3 to 40% by mass. In another embodiment of the present invention, the content is 3 to 35% by mass. In another embodiment of the present invention, the content is 3 to 30% by mass. In another embodiment of the present invention, the content is 3 to 20% by mass. In another embodiment of the present invention, the content is 3 to 15% by mass. In another embodiment of the present invention, the content is 3 to 10% by mass. In another embodiment of the present invention, the content is 3 to 5% by mass.

The compound represented by general formula (II) is preferably a compound selected from the group of compounds represented by general formula (II-1), for example.

[Chem. 47]

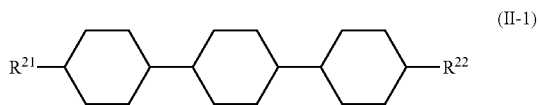

(II-1)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The content of the compound represented by general formula (II-1) is preferably adjusted in accordance with desired performance, such as low-temperature solubility, transition temperature, electrical reliability, and birefringence. The content is preferably 4% by mass or more and 24% by mass or less, more preferably 8% by mass or more and 18% by mass or less, and most preferably 12% by mass or more and 14% by mass or less.

The compound represented by general formula (II-1) is preferably any of compounds represented by formula (10.1) and formula (10.2) and more preferably a compound represented by formula (10.1), for example.

[Chem. 48]

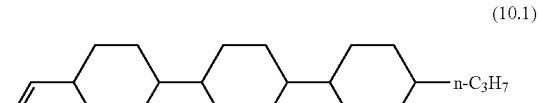

(10.1)

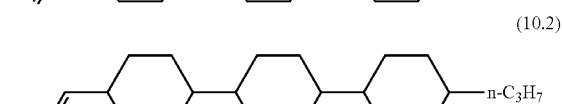

(10.2)

The content of the compound represented by formula (10.1) is preferably adjusted according to the desired performance such as low-temperature solubility, transition temperature, electrical reliability, and birefringence. The content is preferably 4 to 24% by mass, more preferably 8 to 18% by mass, and most preferably 8 to 14% by mass.

The compound represented by general formula (II) is preferably a compound selected from the group of compounds represented by general formula (II-2), for example.

[Chem. 49]

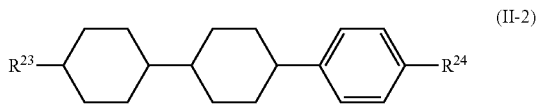
(II-2)

($R^{23}$ represents an alkenyl group having 2 to 5 carbon atoms and $R^{24}$ represents an alkyl group having 1 to 5 carbon atoms or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention and two or more in another embodiment of the present invention.

In the liquid crystal composition of the present invention, the content of the compound represented by general formula (II-2) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3 to 50% by mass according to one embodiment of the present invention. In another embodiment of the present invention, the content is 5 to 50% by mass. In another embodiment of the present invention, the content is 7 to 50% by mass. In another embodiment of the present invention, the content is 10 to 50% by mass. In another embodiment of the present invention, the content is 14 to 50% by mass. In another embodiment of the present invention, the content is 16 to 50% by mass. In another embodiment of the present invention, the content is 20 to 50% by mass. In another embodiment of the present invention, the content is 23 to 50% by mass. In another embodiment of the present invention, the content is 26 to 50% by mass. In another embodiment of the present invention, the content is 30 to 50% by mass. In another embodiment of the present invention, the content is 35 to 50% by mass. In another embodiment of the present invention, the content is 40 to 50% by mass.

The content of the aforementioned compound relative to the total mass of the liquid crystal composition of the present invention is, for example, 3 to 50% by mass according to one embodiment of the present invention. In another embodiment of the present invention, the content is 3 to 40% by mass. In another embodiment of the present invention, the content is 3 to 35% by mass. In another embodiment of the present invention, the content is 3 to 30% by mass. In another embodiment of the present invention, the content is 3 to 20% by mass. In another embodiment of the present invention, the content is 3 to 15% by mass. In another embodiment of the present invention, the content is 3 to 10% by mass. In another embodiment of the present invention, the content is 3 to 5% by mass.

The compound represented by general formula (II-2) is preferably any of compounds represented by formula (11.1) to formula (11.3) and is more preferably a compound represented by formula (11.1), for example.

[Chem. 50]

(11.1)

(11.2)

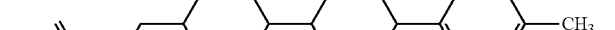
(11.3)

Depending on the desired performance such as low-temperature solubility, transition temperature, electrical reliability, and birefringence, one or a compound represented by formula (11.1) and a compound represented by formula (11.2) may be contained, or both compounds represented by formula (11.1) and formula (11.2) may be contained. Alternatively, all of the compounds represented by formula (11.1) to formula (11.3) may be contained. The content of the compound represented by formula (11.1) or formula (11.2) relative to the total mass of the liquid crystal composition of the present invention is preferably 3% by mass or more and 40% by mass or less, more preferably 5% by mass or more and 35% by mass or less, more preferably 5% by mass or more and 30% by mass or less, more preferably 5% by mass or more and 25% by mass or less, and most preferably 5% by mass or more and 20% by mass or less.

The content of the compound represented by formula (11.1) relative to the total mass of the liquid crystal composition of the present invention is preferably 3 to 40% by mass, more preferably 4 to 20% by mass, and most preferably 6 to 15% by mass.

The compound represented by general formula (II) is preferably a compound selected from the group of compounds represented by general formula (II-3), for example.

[Chem. 51]

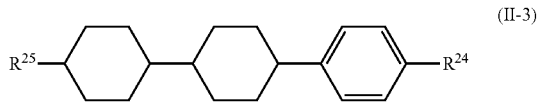
(II-3)

($R^{25}$ represents an alkyl group having 1 to 5 carbon atoms and $R^{24}$ represents an alkyl group having 1 to 5 carbon atoms or an alkoxy group having 1 to 4 carbon atoms.)

The number of compounds that can be used in combination is not particularly limited. One to three of these compounds are preferably contained in accordance with the desired performance, such as low-temperature solubility, transition temperature, electrical reliability, and birefringence.

The content of the compound represented by general formula (II-3) must be appropriately adjusted according to the desired performance such as low-temperature solubility, transition temperature, electrical reliability, birefringence, process compatibility, drop marks, ghosting, and dielectric anisotropy. An example of the preferable content of the aforementioned compound relative to the total mass of the liquid crystal composition of the present invention is 2 to 45% by mass. Examples of more preferable contents include 5 to 45% by mass, 8 to 45% by mass, 11 to 45% by mass, 14 to 45% by mass, 17 to 45% by mass, 20 to 45% by mass, 23 to 45% by mass, 26 to 45% by mass, 29 to 45% by mass, 2 to 45% by mass, 2 to 40% by mass, 2 to 35% by mass, 2 to 30% by mass, 2 to 25% by mass, 2 to 20% by mass, 2 to 15% by mass, and 2 to 10% by mass.

The compound represented by general formula (II-3) is preferably any of compounds represented by formula (12.1) to formula (12.3), for example.

[Chem. 52]

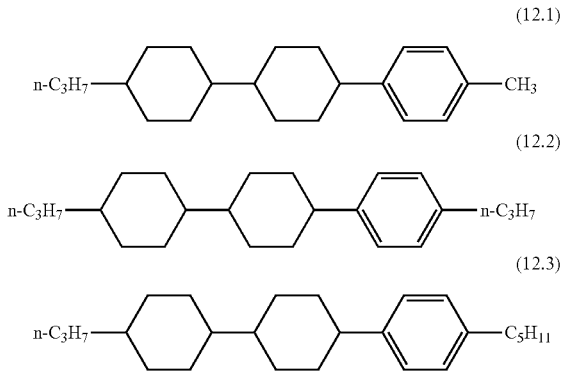

Depending on the desired performance such as low-temperature solubility, transition temperature, electrical reliability, and birefringence, one of a compound represented by formula (12.1) and a compound represented by formula (12.2) may be contained, or both compounds represented by formula (12.1) and formula (12.2) may be contained.

The content of the compound represented by formula (12.1) or formula (12.2) relative to the total mass of the liquid crystal composition of the present invention is preferably 3% by mass or more and 40% by mass or less, more preferably 5% by mass or more and 40% by mass or less, more preferably 7% by mass or more and 40% by mass or less, more preferably 9% by mass or more and 40% by mass or less, more preferably 11% by mass or more and 40% by mass or less, more preferably 12% by mass or more and 40% by mass or less, more preferably 13% by mass or more and 40% by mass or less, more preferably 18% by mass or more and 30% by mass or less, and most preferably 21% by mass or more and 25% by mass or less. The content of the compound represented by formula (12.2) relative to the total mass of the liquid crystal composition of the present invention is preferably 3% by mass or more and 40% by mass or less, more preferably 5% by mass or more and 40% by mass or less, more preferably 8% by mass or more and 40% by mass or less, more preferably 10% by mass or more and 40% by mass or less, more preferably 12% by mass or more and 40% by mass or less, more preferably 15% by mass or more and 40% by mass or less, more preferably 17% by mass or more and 30% by mass or less, and most preferably 19% by mass or more and 25% by mass or less. In the case where both the compound represented by formula (12.1) and the compound represented by formula (12.2) are contained, the total mass of the two compounds relative to the total mass of the liquid crystal composition of the present invention is preferably 15% by mass or more and 45% by mass or less, more preferably 19% by mass or more and 45% by mass or less, yet more preferably 24% by mass or more and 40% by mass or less, and most preferably 30% by mass or more and 35% by mass or less.

The content of the compound represented by formula (12.3) relative to the total mass of the liquid crystal composition of the present invention is preferably 0.05% by mass or more and 2% by mass or less, more preferably 0.1% by mass or more and 1% by mass or less, and most preferably 0.2% by mass or more and 0.5% by mass or less. The compound represented by formula (12.3) may be an optically active compound.

The compound represented by general formula (II-3) is preferably a compound selected from the group of compounds represented by general formula (II-3-1), for example.

[Chem. 53]

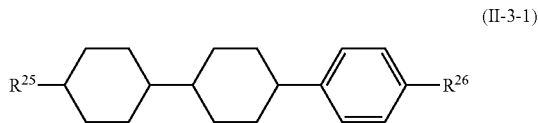

($R^{25}$ represents an alkyl group having 1 to 5 carbon atoms and $R^{26}$ represents an alkoxy group having 1 to 4 carbon atoms.)

The number of compounds that can be used in combination is not particularly limited. Of these compounds, one to three compounds are preferably contained in accordance with desired performance, such as low-temperature solubility, transition temperature, electrical reliability, and birefringence.

The content of the compound represented by general formula (II-3-1) is preferably adjusted according to the desired performance such as low-temperature solubility, transition temperature, electrical reliability, and birefringence. The content is preferably 1% by mass or more and 24% by mass or less, more preferably 4% by mass or more and 18% by mass or less, and most preferably 8% by mass or more and 14% by mass or less.

The compound represented by general formula (II-3-1) is preferably any of compounds represented by formula (13.1) to formula (13.4) and is more preferably a compound represented by formula (13.3), for example.

[Chem. 54]

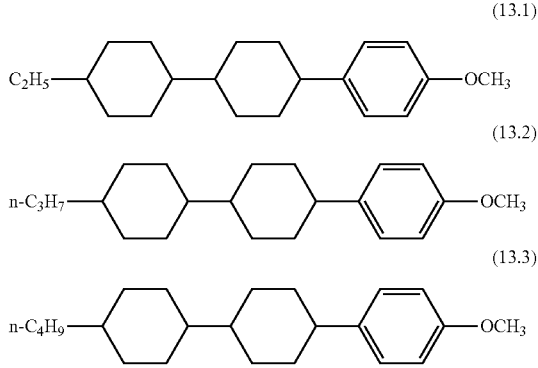

(13.4)

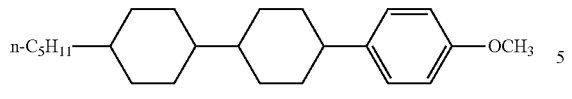

The compound represented by general formula (II) is preferably a compound selected from the group of compounds represented by general formula (II-4), for example.

[Chem. 55]

(II-4)

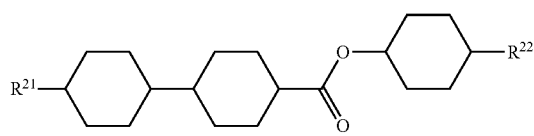

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

Only one of these compounds may be contained or two or more of these compounds may be contained. An appropriate combination of the compounds is preferably used in accordance to the desired performance. The number of compounds that can be used in combination is not particularly limited. Preferably one or two and more preferably one to three of these compounds are contained in accordance with the desired performance, such as low-temperature solubility, transition temperature, electrical reliability, and birefringence.

The content of the compound represented by general formula (II-4) relative to the total mass of the liquid crystal composition of the present invention is preferably 1% by mass or more and 15% by mass or less, more preferably 2% by mass or more and 15% by mass or less, yet more preferably 3% by mass or more and 15% by mass or less, yet more preferably 4% by mass or more and 12% by mass or less, and most preferably 5% by mass or more and 7% by mass or less.

The compound represented by general formula (II-4) is preferably any of compounds represented by formula (14.1) to formula (14.5) and more preferably a compound represented by formula (14.2) or formula (14.5), for example.

[Chem. 56]

(14.1)

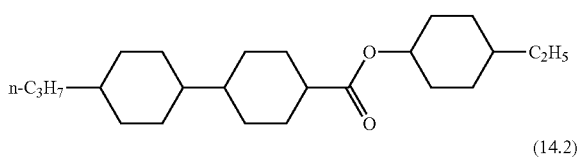

(14.2)

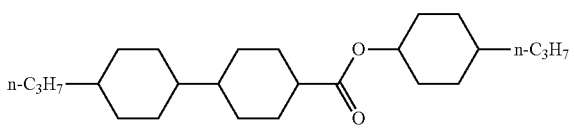

(14.3)

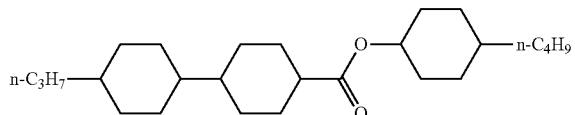

(14.4)

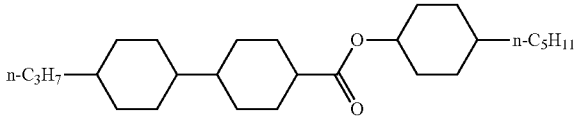

(14.5)

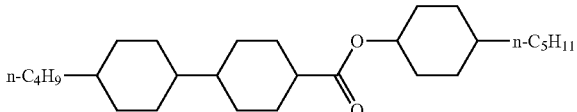

The compound represented by general formula (L) is preferably a compound selected from the group of compounds represented by general formula (III).

[Chem. 57]

(III)

($R^{31}$ and $R^{32}$ each independently represent an alkenyl group having 2 to 5 carbon atoms, an alkyl group having 1 to 5 carbon atoms, or an alkoxy group having 1 to 4 carbon atoms.)

The content of the compound represented by general formula (III) relative to the total mass of the liquid crystal composition of the present invention is preferably 3% by mass or more and 25% by mass or less, more preferably 6% by mass or more and 20% by mass or less, and most preferably 8% by mass or more and 15% by mass or less considering the desired solubility, birefringence, etc.

The compound represented by general formula (III) is preferably any of compounds represented by formula (15.1) to formula (15.3) and more preferably a compound represented by formula (15.1), for example.

[Chem. 58]

(15.1)

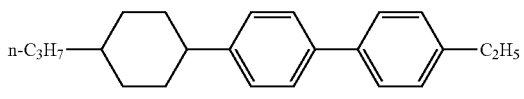

(15.2)

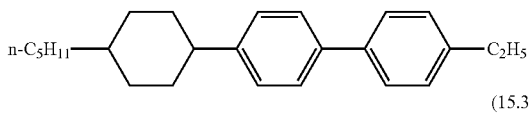

(15.3)

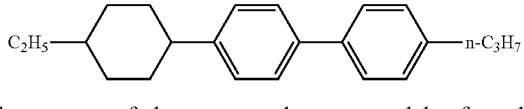

The content of the compound represented by formula (15.1) relative to the total mass of the liquid crystal composition of the present invention is preferably 1 to 25% by mass, more preferably 2 to 15% by mass, and yet more preferably 3 to 10% by mass, and most preferably 4 to 8% by mass considering the desired solubility, birefringence, etc.

The compound represented by general formula (III) is preferably a compound selected from the group of group of compounds represented by general formula (III-1).

[Chem. 59]

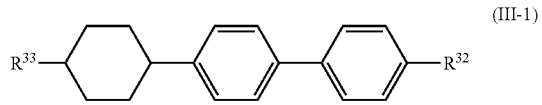

(III-1)

($R^{33}$ represents an alkenyl group having 2 to 5 carbon atoms and $R^{32}$ independently represents an alkyl group having 1 to 5 carbon atoms or an alkoxy group having 1 to 4 carbon atoms.)

The content of the compound represented by general formula (III-1) is preferably adjusted according to the desired performance such as low-temperature solubility, transition temperature, electrical reliability, and birefringence, and is preferably 4% by mass or more and 23% by mass or less, more preferably 6% by mass or more and 18% by mass or less, and most preferably 10% by mass or more and 13% by mass or less.

The compound represented by general formula (III-1) is preferably a compound represented by formula (16.1) or formula (16.2), for example.

[Chem. 60]

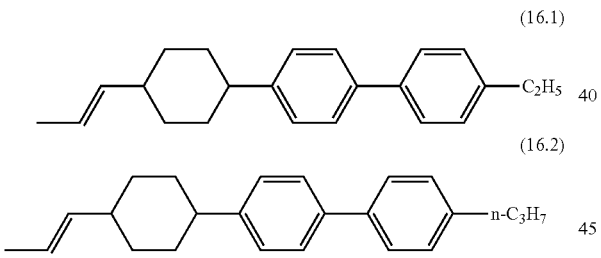

(16.1)

(16.2)

The compound represented by general formula (III) is preferably a compound selected from the group of compounds represented by general formula (III-2).

[Chem. 61]

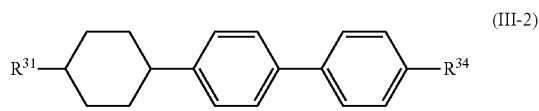

(III-2)

($R^{31}$ represents an alkyl group having 1 to 5 carbon atoms and $R^{34}$ represents an alkoxy group having 1 to 4 carbon atoms.)

The content of the compound represented by general formula (III-2) is preferably adjusted according to the desired performance such as low-temperature solubility, transition temperature, electrical reliability, and birefringence, and is preferably 4% by mass or more and 23% by mass or less, more preferably 6% by mass or more and 18% by mass or less, and most preferably 10% by mass or more and 13% by mass or less.

The compound represented by general formula (III-2) is preferably a compound selected from the group of compounds represented by formula (17.1) to formula (17.3), for example, and is more preferably a compound represented by formula (17.3).

[Chem. 62]

(17.1)

(17.2)

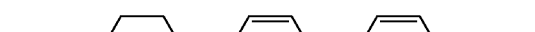

(17.3)

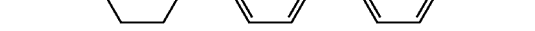

The compound represented by general formula (L) is preferably a compound selected from the group of compounds represented by general formula (V).

[Chem. 63]

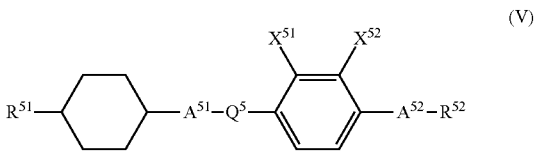

(V)

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms, $A^{51}$ and $A^{52}$ each independently represent a 1,4-cyclohexylene group or a 1,4-phenylene group, $Q^5$ represents a single bond or —COO—, and $X^{51}$ and $X^{52}$ each independently represent a fluorine atom or a hydrogen atom.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, and four in another embodiment of the present invention.

The content of the aforementioned compound relative to the total mass of the liquid crystal composition of the present invention is, for example, 2 to 40% by mass according to one embodiment of the present invention. In another embodiment of the present invention, the content is 4 to 40% by mass. In another embodiment of the present invention, the content is 7 to 40% by mass. In another embodiment of the present invention, the content is 10 to 40% by mass. In another embodiment of the present invention, the content is 12 to 40% by mass. In another embodiment of the present invention, the content is 15 to 40% by mass. In another embodiment of the present invention, the content is 17 to 40% by mass. In another embodiment of the present invention, the content is 18 to 40% by mass. In another embodiment of the present invention, the content is 20 to 40% by mass. In another embodiment of the present invention, the content is 22 to 40% by mass.

The content of the aforementioned compound relative to the total mass of the liquid crystal composition of the present invention is, for example, 2 to 40% by mass according to one embodiment of the present invention. In another embodiment of the present invention, the content is 2 to 30% by mass. In another embodiment of the present invention, the content is 2 to 25% by mass. In another embodiment of the present invention, the content is 2 to 20% by mass. In another embodiment of the present invention, the content is 2 to 15% by mass. In another embodiment of the present invention, the content is 2 to 10% by mass. In another embodiment of the present invention, the content is 2 to 5% by mass. In another embodiment of the present invention, the content is 2 to 4% by mass.

The compound represented by general formula (V) is preferably a compound represented by general formula (V-1).

[Chem. 64]

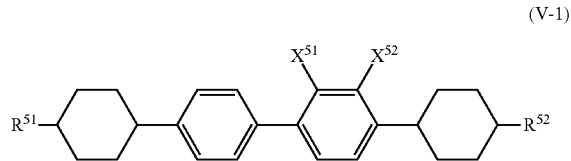

(V-1)

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms and $X^{51}$ and $X^{52}$ each independently represent a fluorine atom or a hydrogen atom.)

The compound represented by general formula (V-1) is preferably a compound represented by general formula (V-1-1).

[Chem. 65]

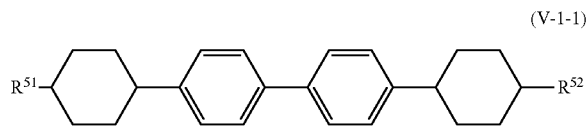

(V-1-1)

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms.)

The content of the compound represented by general formula (V-1-1) relative to the total mass of the liquid crystal composition of the present invention is preferably 1% by mass or more and 15% by mass or less, more preferably 2% by mass or more and 15% by mass or less, and most preferably 3% by mass or more and 10% by mass or less.

The compound represented by general formula (V-1-1) is preferably any of compounds represented by formula (20.1) to formula (20.4) and more preferably a compound represented by formula (20.2).

[Chem. 66]

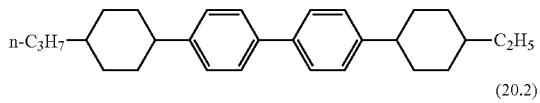

(20.1)

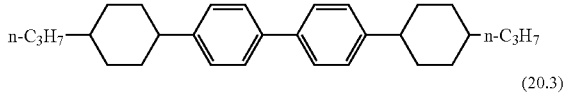

(20.2)

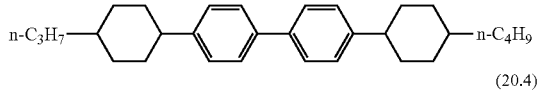

(20.3)

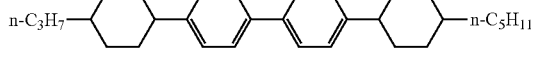

(20.4)

In the liquid crystal composition of the present invention, the content of the compound represented by formula (20.2) relative to the total mass of the liquid crystal composition of the present invention is preferably 1 to 20% by mass, more preferably 2 to 10% by mass, and most preferably 3 to 6% by mass considering low-temperature solubility, transition temperature, electrical reliability, etc.

The compound represented by general formula (V-1) is preferably a compound represented by general formula (V-1-2).

[Chem. 67]

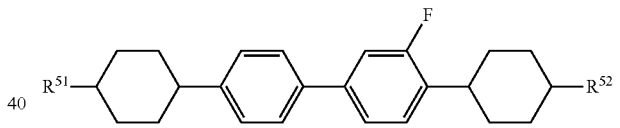

(V-1-2)

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms.)

The content of the compound represented by general formula (V-1-2) relative to the total mass of the liquid crystal composition of the present invention is preferably 1% by mass or more and 15% by mass or less, more preferably 2% by mass or more and 15% by mass or less, and most preferably 3% by mass or more and 10% by mass or less.

The compound represented by general formula (V-1-2) is preferably any of compounds represented by formula (21.1) to formula (21.3) and is preferably a compound represented by formula (21.1).

[Chem. 68]

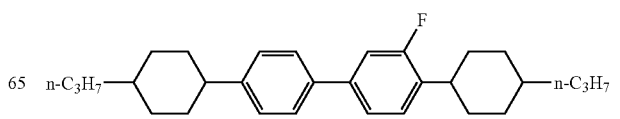

(21.1)

-continued (21.2)

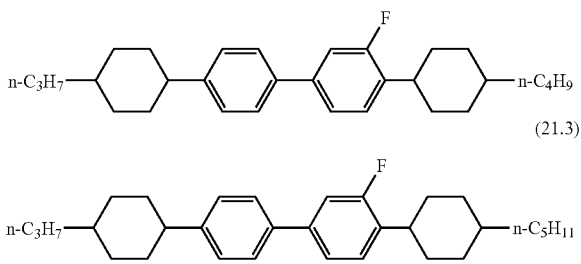

(21.3)

The compound represented by general formula (V-1) is preferably a compound represented by general formula (V-1-3).

[Chem. 69]

(V-1-3)

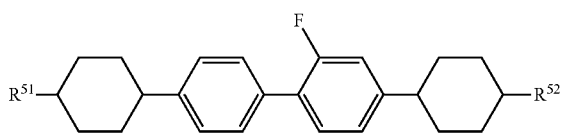

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms.)

The content of the compound represented by general formula (V-1-3) relative to the total mass of the liquid crystal composition of the present invention is 1% by mass or more, more preferably 2% by mass or more, more preferably 3% by mass or more, and most preferably 4% by mass or more. The highest possible content is preferably 15% by mass or less, more preferably 10% by mass or less, and most preferably 8% by mass or less.

The compound represented by general formula (V-1-3) is preferably any of compounds represented by formula (22.1) to formula (22.3) and is preferably a compound represented by formula (22.1).

[Chem. 70]

(22.1)

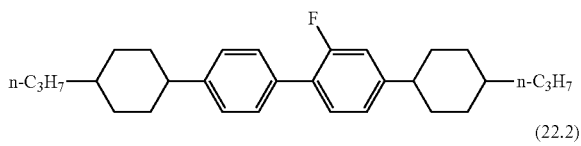

(22.2)

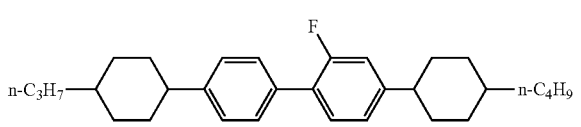

(22.3)

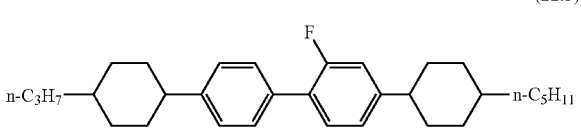

The compound represented by general formula (V) is preferably a compound represented by general formula (V-2).

[Chem. 71]

(V-2)

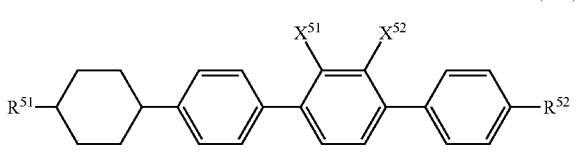

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms and $X^{51}$ and $X^{52}$ each independently represent a fluorine atom or a hydrogen atom.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention and two or more in another embodiment of the present invention.

The content of the aforementioned compound relative to the total mass of the liquid crystal composition of the present invention is, for example, 2 to 40% by mass according to one embodiment of the present invention. In another embodiment of the present invention, the content is 4 to 40% by mass. In another embodiment of the present invention, the content is 7 to 40% by mass. In another embodiment of the present invention, the content is 10 to 40% by mass. In another embodiment of the present invention, the content is 12 to 40% by mass. In another embodiment of the present invention, the content is 15 to 40% by mass. In another embodiment of the present invention, the content is 17 to 40% by mass. In another embodiment of the present invention, the content is 18 to 40% by mass. In another embodiment of the present invention, the content is 20 to 40% by mass. In another embodiment of the present invention, the content is 22 to 40% by mass.

The content of the aforementioned compound relative to the total mass of the liquid crystal composition of the present invention is, for example, 2 to 40% by mass according to one embodiment of the present invention. In another embodiment of the present invention, the content is 2 to 30% by mass. In another embodiment of the present invention, the content is 2 to 25% by mass. In another embodiment of the present invention, the content is 2 to 20% by mass. In another embodiment of the present invention, the content is 2 to 15% by mass. In another embodiment of the present invention, the content is 2 to 10% by mass. In another embodiment of the present invention, the content is 2 to 5% by mass. In another embodiment of the present invention, the content is 2 to 4% by mass.

If an embodiment in which the liquid crystal composition of the present invention has high Tni is desirable, the content of the compound represented by formula (V-2) is preferably relatively high. If an embodiment in which the viscosity is low is desirable, this content is preferably relatively low.

The compound represented by general formula (V-2) is preferably a compound represented by general formula (V-2-1).

[Chem. 72]

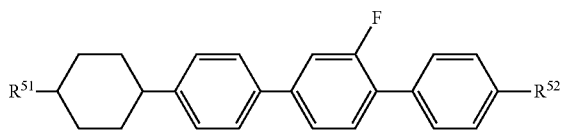

(V-2-1)

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms.)

The compound represented by general formula (V-2-1) is preferably any of compounds represented by formula (23.1) to formula (23.4) and is preferably a compound represented by formula (23.1) and/or formula (23.2).

[Chem. 73]

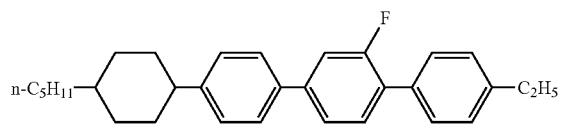

(23.1)

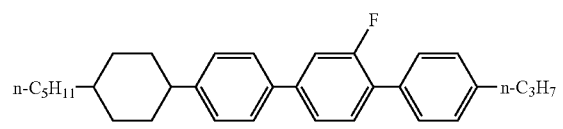

(23.2)

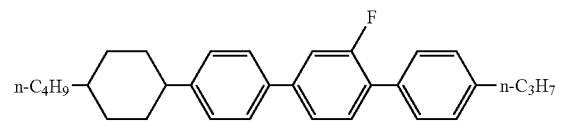

(23.3)

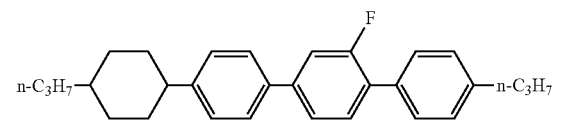

(23.4)

The compound represented by general formula (V-2) is preferably a compound represented by general formula (V-2-2).

[Chem. 74]

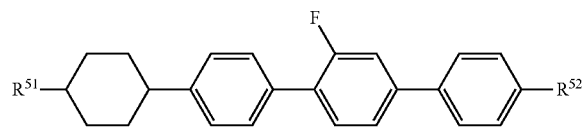

(V-2-2)

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms.)

The compound represented by general formula (V-2-2) is preferably any of compounds represented by formula (24.1) to formula (24.4) and is preferably a compound represented by formula (24.1) or formula (24.2).

[Chem. 75]

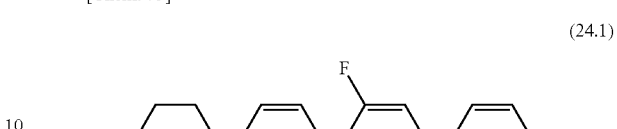

(24.1)

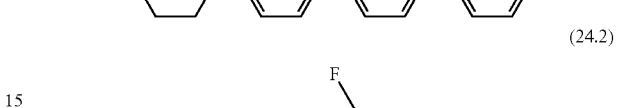

(24.2)

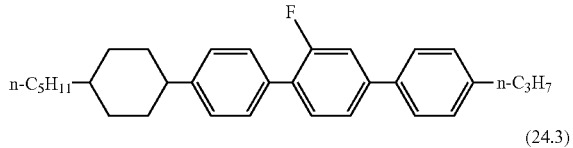

(24.3)

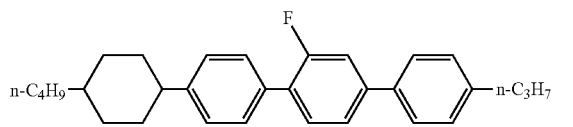

(24.4)

The compound represented by general formula (V) is preferably a compound represented by general formula (V-3).

[Chem. 76]

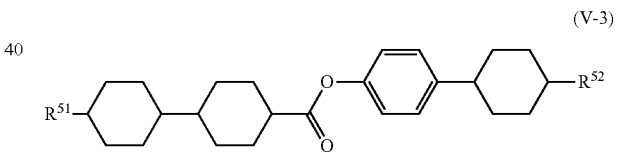

(V-3)

(In the formula, $R^{51}$ and $R^{52}$ each independently represent an alkyl group having 1 to 5 carbon atoms, alkenyl having 2 to 5 carbon atoms, or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, and three or more in another embodiment of the present invention.

The content of the compound represented by general formula (V-3) relative to the total mass of the liquid crystal composition of the present invention is preferably 2% by mass or more and 16% by mass or less, more preferably 4% by mass or more and 16% by mass or less, yet more preferably 7% by mass or more and 13% by mass or less, and most preferably 8% by mass or more and 11% by mass or less.

The compound represented by general formula (V-3) is preferably any of compounds represented by formula (25.1) to formula (25.3).

[Chem. 77]

(25.1)

(25.2)

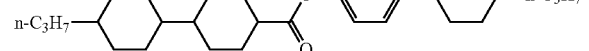
(25.3)

The liquid crystal composition of the present invention preferably further contains a compound represented by general formula (M).

[Chem. 78]

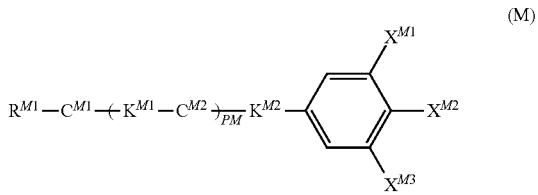
(M)

(In the formula, $R^{M1}$ represents an alkyl group having 1 to 8 carbon atoms where one —$CH_2$— or two or more non-adjacent —$CH_2$— in the alkyl group may each be independently substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (where one —$CH_2$— or two or more nonadjacent —$CH_2$— present in this group may be substituted with —O— or —S—) and (e) a 1,4-phenylene group (where one —CH= or two or more nonadjacent —CH= present in this group may be substituted with —N=), wherein one or more hydrogen atoms in the group (d) or (e) described above may each independently be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when PM represents 2, 3, or 4 and two or more $K^{M1}$ are present, they may be the same or different and when PM represents 2, 3, or 4 and two or more $C^{M2}$ are present, they may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. Compounds represented by general formula (ii) are excluded.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, six in another embodiment of the present invention, and seven or more in yet another embodiment of the present invention.

In the liquid crystal composition of the present invention, the content of the compound represented by general formula (M) must be appropriately adjusted according to the performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 1 to 95% by mass according to one embodiment of the present invention. In another embodiment of the present invention, the content is 10 to 95% by mass. In another embodiment of the present invention, the content is 20 to 95% by mass. In another embodiment of the present invention, the content is 30 to 95% by mass. In another embodiment of the present invention, the content is 40 to 95% by mass. In another embodiment of the present invention, the content is 45 to 95% by mass. In another embodiment of the present invention, the content is 50 to 95% by mass. In another embodiment of the present invention, the content is 55 to 95% by mass. In another embodiment of the present invention, the content is 60 to 95% by mass. In another embodiment of the present invention, the content is 65 to 95% by mass. In another embodiment of the present invention, the content is 70 to 95% by mass. In another embodiment of the present invention, the content is 75 to 95% by mass. In another embodiment of the present invention, the content is 80 to 95% by mass.

The content of the aforementioned compound relative to the total mass of the liquid crystal composition of the present invention is, for example, 1 to 95% in one embodiment of the present invention. In another embodiment of the present invention, the content is 1 to 85%. In another embodiment of the present invention, the content is 1 to 75%. In another embodiment of the present invention, the content is 1 to 65%. In another embodiment of the present invention, the content is 1 to 55%. In another embodiment of the present invention, the content is 1 to 45%. In another embodiment of the present invention, the content is 1 to 35%. In another embodiment of the present invention, the content is 1 to 25%.

In order to keep viscosity of the liquid crystal composition of the present invention to a low level and response speed to a high level, the lower limit and the upper limit of the above-described content are preferably relatively low. In order to keep Tni of the liquid crystal composition of the present invention to a high level and temperature stability to a high level, the lower limit and the upper limit of the above-described content are preferably relatively low. In order to increase the dielectric anisotropy to keep the driving voltage low, the lower limit and the upper limit of the above-described content are preferably relatively high.

In the case where the ring structure with which $R^{M1}$ bonds is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms. In the case where the ring structure with which $R^{M1}$ bonds is a saturated ring structure such as cyclohexane, pyran, or dioxane, $R^{M1}$ preferably represents a linear alkyl group having 1 to 5 carbon atoms, a linear alkoxy group having 1 to 4 carbon atoms, or a linear alkenyl group having 2 to 5 carbon atoms.

In the case where the liquid crystal composition needs to be chemically stable, the compound represented by general formula (M) preferably contains no chlorine atoms in the molecule. The content of the compound having chlorine atoms in the liquid crystal composition is preferably 5% or less, preferably 3% or less, preferably 1% or less, preferably 0.5% or less, and preferably substantially zero. "Substantially zero" means the only chlorine-atom-containing compound contained in the liquid crystal composition is the unintended compound such as one generated as an impurity during production of the compound.

The compound represented by general formula (M) is, for example, preferably a compound selected from the group of compounds represented by general formula (VIII).

[Chem. 79]

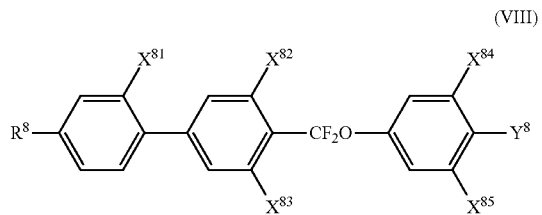

(VIII)

(In the formula, $R^8$ represents an alkyl group having 1 to 5 carbon atoms, an alkenyl group having 2 to 5 carbon atoms, or an alkoxy group having 1 to 4 carbon atoms, $X^{81}$ to $X^{85}$ each independently represent a hydrogen atom or a fluorine atom, and $Y^8$ represents a fluorine atom or —$OCF_3$.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, and three or more in another embodiment of the present invention.

In the liquid crystal composition of the present invention, the content of the compound represented by general formula (VIII) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 2 to 40% by mass according to one embodiment of the present invention. In another embodiment of the present invention, the content is, for example, 4 to 40% by mass. In another embodiment of the present invention, the content is, for example, 5 to 40% by mass. In another embodiment of the present invention, the content is, for example, 6 to 40% by mass. In another embodiment of the present invention, the content is, for example, 7 to 40% by mass. In another embodiment of the present invention, the content is, for example, 8 to 40% by mass. In another embodiment of the present invention, the content is, for example, 9 to 40% by mass. In another embodiment of the present invention, the content is, for example, 10 to 40% by mass. In another embodiment of the present invention, the content is, for example, 11 to 40% by mass. In another embodiment of the present invention, the content is, for example, 12 to 40% by mass. In another embodiment of the present invention, the content is, for example, 14 to 40% by mass. In another embodiment of the present invention, the content is, for example, 15 to 40% by mass. In another embodiment of the present invention, the content is, for example, 21 to 40% by mass. In another embodiment of the present invention, the content is, for example, 23 to 40% by mass.

The content of the aforementioned compound relative to the total mass of the liquid crystal composition of the present invention is, for example, 2 to 40% by mass according to one embodiment of the present invention. In another embodiment of the present invention, the content is 2 to 30% by mass. In another embodiment of the present invention, the content is 2 to 25% by mass. In another embodiment of the present invention, the content is 2 to 21% by mass. In another embodiment of the present invention, the content is 2 to 16% by mass. In another embodiment of the present invention, the content is 2 to 12% by mass. In another embodiment of the present invention, the content is 2 to 8% by mass. In another embodiment of the present invention, the content is 2 to 5% by mass.

In order to keep viscosity of the liquid crystal composition of the present invention to a low level and response speed to a high level, the lower limit and the upper limit of the above-described content are preferably relatively low. In order to keep Tni of the liquid crystal composition of the present invention to a high level and temperature stability to a high level, the lower limit and the upper limit of the above-described content are preferably relatively low. In order to increase the dielectric anisotropy to keep the driving voltage low, the lower limit and the upper limit of the above-described content are preferably relatively high.

The compound represented by general formula (VIII) is preferably a compound represented by general formula (VIII-1).

[Chem. 80]

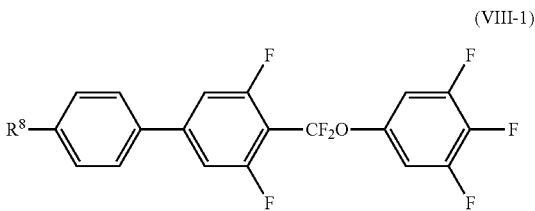

(VIII-1)

(In the formula, $R^8$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention and two or more in another embodiment of the present invention.

The compound represented by general formula (VIII-1) is specifically preferably any of compounds represented by formula (26.1) to formula (26.4) and is preferably a compound represented by formula (26.1) or formula (26.2).

[Chem. 81]

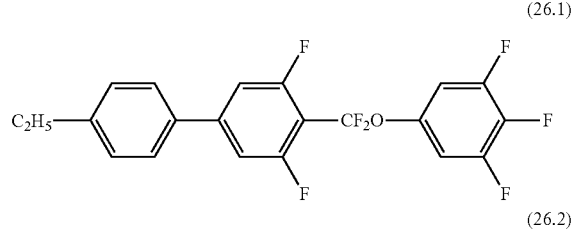

(26.1)

(26.2)

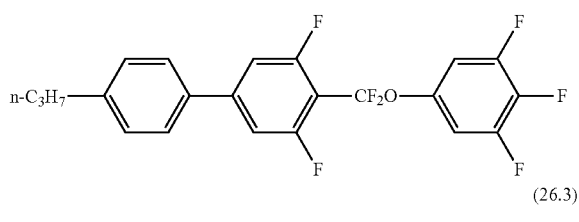

(26.3)

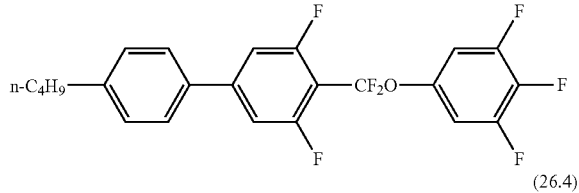

(26.4)

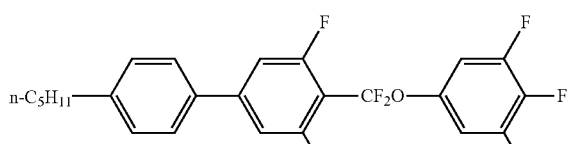

The content of the compound represented by formula (26.1) relative to the total mass of the liquid crystal composition of the present invention is preferably 2 to 30% by mass, more preferably 3 to 20% by mass, more preferably 3 to 10% by mass, and most preferably 3 to 7% by mass considering low-temperature solubility, transition temperature, electrical reliability, birefringence, etc.

The content of the compound represented by formula (26.2) relative to the total mass of the liquid crystal composition of the present invention is preferably 1 to 30% by mass, more preferably 2 to 20 by mass, more preferably 2 to 10% by mass, and most preferably 2 to 6% by mass considering low-temperature solubility, transition temperature, electrical reliability, birefringence, etc.

The compound represented by general formula (VIII) is preferably a compound represented by general formula (VIII-2).

[Chem. 82]

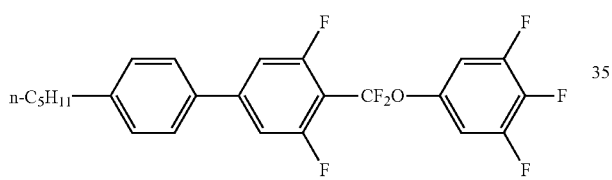

(VIII-2)

(In the formula, $R^8$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, and three or more in another embodiment of the present invention.

The content of the compound represented by formula (VIII-2) is preferably 2.5% by mass or more and 25% by mass or less, preferably 8% by mass or more and 25% by mass or less, more preferably 10% by mass and 20% by mass or less, and more preferably 12% by mass or more and 15% by mass or less considering low-temperature solubility, transition temperature, electrical reliability, birefringence, etc.

The compound represented by general formula (VIII-2) is preferably any of compounds represented by formula (27.1) to formula (27.4) and is preferably a compound represented by formula (27.2).

[Chem. 83]

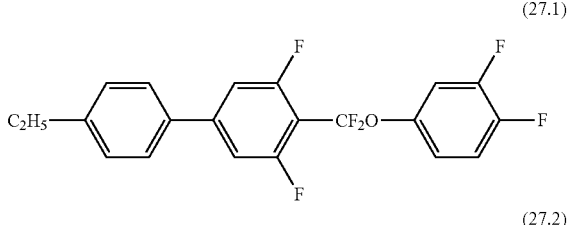

(27.1)

(27.2)

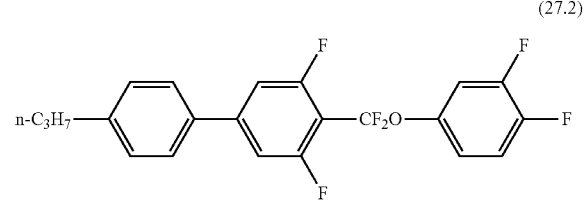

(27.3)

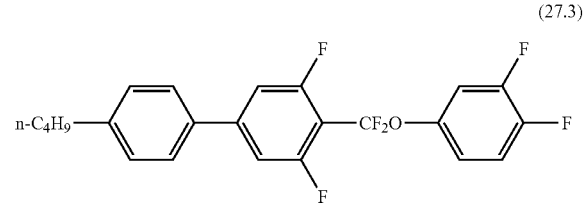

(27.4)

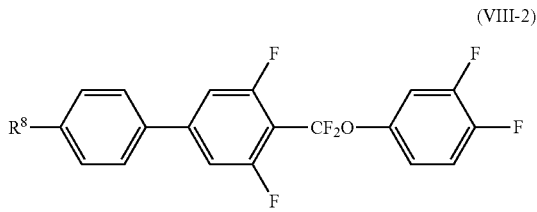

The compound represented by general formula (M) is preferably a compound represented by general formula (VIII-3).

[Chem. 84]

(VIII-3)

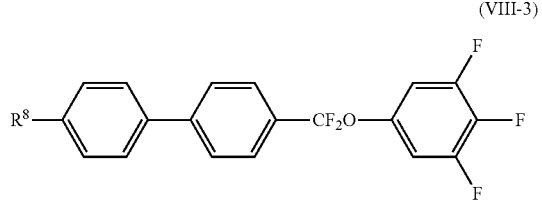

(In the formula, $R^8$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention and two or more in another embodiment of the present invention.

The compound represented by general formula (VIII-3) is specifically preferably any of compounds represented by formula (26.11) to formula (26.14), preferably a compound represented by formula (26.11) or formula (26.12), and more preferably a compound represented by formula (26.12).

[Chem. 83]

(26.11)

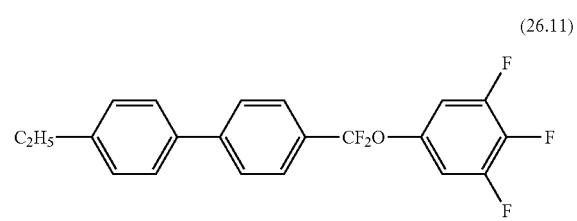

(26.12)

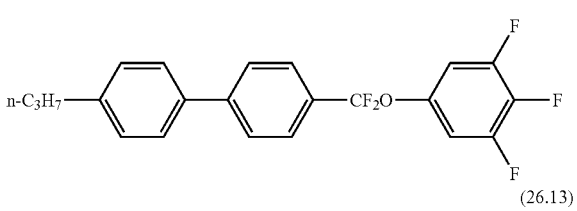

(26.13)

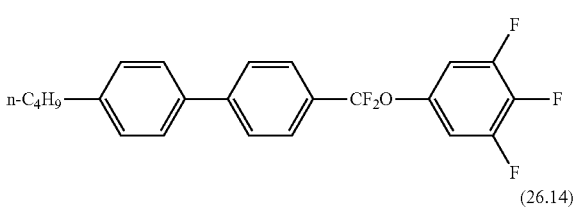

(26.14)

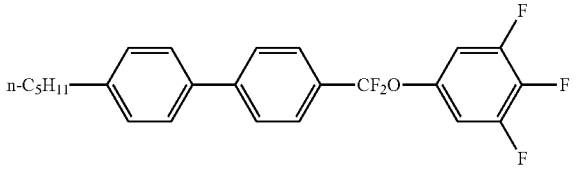

The compound represented by general formula (M) is preferably a compound selected from the group of compounds represented by general formula (IX).

[Chem. 86]

(IX)

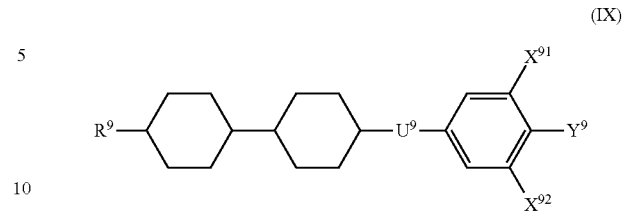

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, $Y^9$ represents a fluorine atom, a chlorine atom, or —$OCF_3$, and $U^9$ represents a single bond, —COO—, or —$CF_2O$—.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention.

In the liquid crystal composition of the present invention, the content of the compound represented by general formula (IX) must be appropriately adjusted according to the desired performance such as low-temperature solubility, transition temperature, electrical reliability, birefringence, process compatibility, drop marks, ghosting, and dielectric anisotropy.

The content of the aforementioned compound relative to the total mass of the liquid crystal composition of the present invention is, for example, 3 to 70% by mass according to one embodiment of the present invention. In another embodiment of the present invention, the content is, for example, 5 to 70% by mass. In another embodiment of the present invention, the content is, for example, 8 to 70% by mass. In another embodiment of the present invention, the content is, for example, 10 to 70% by mass. In another embodiment of the present invention, the content is, for example, 12 to 70% by mass. In another embodiment of the present invention, the content is, for example, 15 to 70% by mass. In another embodiment of the present invention, the content is, for example, 17 to 70% by mass. In another embodiment of the present invention, the content is, for example, 20 to 70% by mass. In another embodiment of the present invention, the content is, for example, 24 to 70% by mass. In another embodiment of the present invention, the content is, for example, 28 to 70% by mass. In another embodiment of the present invention, the content is, for example, 30 to 70% by mass. In another embodiment of the present invention, the content is, for example, 34 to 70% by mass. In another embodiment of the present invention, the content is, for example, 39 to 70% by mass. In another embodiment of the present invention, the content is, for example, 40 to 70% by mass. In another embodiment of the present invention, the content is, for example, 42 to 70% by mass. In another embodiment of the present invention, the content is, for example, 45 to 70% by mass.

The content of the aforementioned compound relative to the total mass of the liquid crystal composition of the present invention is, for example, 3 to 70% by mass according to one embodiment of the present invention. In another embodiment of the present invention, the content of the compound is 3 to 60% by mass. In another embodiment of the present invention, the content of the compound is 3 to 55% by mass. In another embodiment of the present invention, the content of the compound is 3 to 50% by mass. In another embodiment of the present invention, the content of the compound is 3 to 45% by mass. In another embodiment of the present invention, the content of the compound is 3 to 40% by mass. In another embodiment of the present invention, the content of the compound is 3 to 35% by mass. In another embodiment of the present invention, the content of the compound is 3 to 30% by mass. In another embodiment of the present invention, the content is 25% by mass. In another embodiment of the present invention, the content of the compound is 3 to 20% by mass. In another embodiment of the present invention, the content of the compound is 3 to 15% by mass. In another embodiment of the present invention, the content of the compound is 3 to 10% by mass.

In order to keep viscosity of the liquid crystal composition of the present invention to a low level and response speed to a high level, the lower limit and the upper limit of the above-described content are preferably relatively low. In order to keep Tni of the liquid crystal composition of the present invention to a high level and decrease the frequency of ghosting, the lower limit and the upper limit of the above-described content are preferably relatively low. In order to increase the dielectric anisotropy to keep the driving voltage low, the lower limit and the upper limit of the above-described content are preferably relatively high.

The compound represented by general formula (IX) is preferably a compound represented by general formula (IX-1).

[Chem. 87]

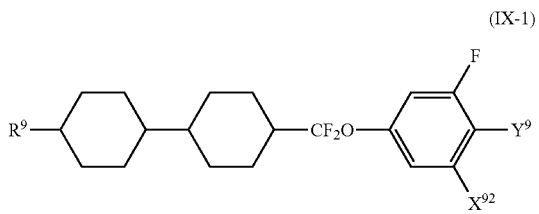

(IX-1)

(In the formula, $R^9$ represents an alkyl group having 1 to 5 carbon atoms, an alkenyl group having 2 to 5 carbon atoms, or an alkoxy group having 1 to 4 carbon atoms, $X^{92}$ represents a hydrogen atom or a fluorine atom, and $Y^9$ represents a fluorine atom or —$OCF_3$.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, and four or more in another embodiment of the present invention.

The compound represented by general formula (IX-1) is preferably a compound represented by general formula (IX-1-1).

[Chem. 88]

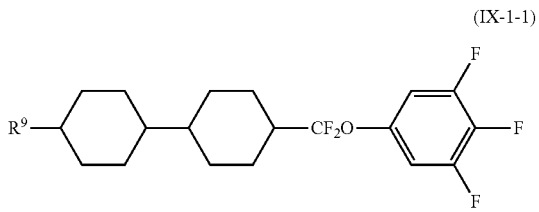

(IX-1-1)

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used in accordance with desired performance, such as low-temperature solubility, transition temperature, electrical reliability, and birefringence. The number of compounds used is, for example, one in one embodiment of the present invention, two in another embodiment of the present invention, and three or more in another embodiment of the present invention.

The content of the compound represented by general formula (IX-1-1) has an upper limit and a lower limit preferable for respective embodiments considering low-temperature solubility, transition temperature, electrical reliability, birefringence, etc.

For example, the content of the aforementioned compound relative to the total mass of the liquid crystal composition of the present invention is 1 to 40% by mass in one embodiment, 2 to 40% by mass in another embodiment, 4 to 40% by mass in another embodiment, 10 to 40% by mass in another embodiment, 14 to 40% by mass in another embodiment, and 16 to 40% by mass in another embodiment.

The content of the aforementioned compound relative to the total mass of the liquid crystal composition of the present invention is, for example, 1 to 40% by mass in one embodiment, 1 to 35% by mass in another embodiment, 1 to 30% by mass in another embodiment, and 1 to 25% by mass in another embodiment.

The compound represented by general formula (IX-1-1) is preferably any of compounds represented by formula (28.1) to formula (28.5) and is preferably a compound represented by formula (28.3) or formula (28.5).

[Chem. 89]

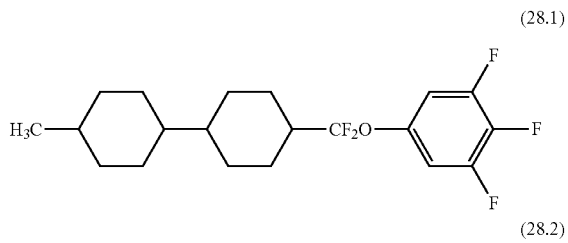

(28.1)

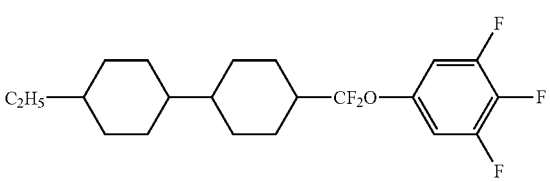

(28.2)

-continued

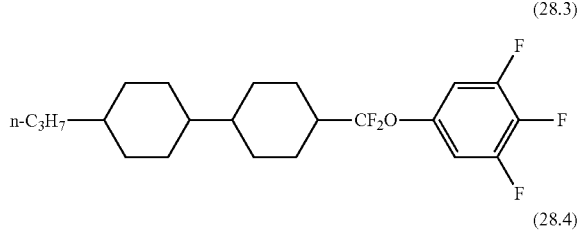
(28.3)

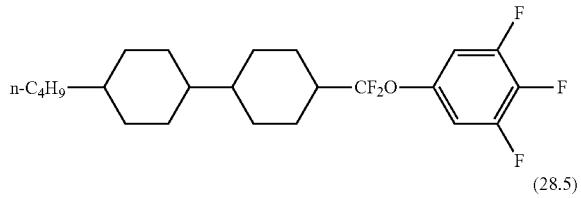
(28.4)

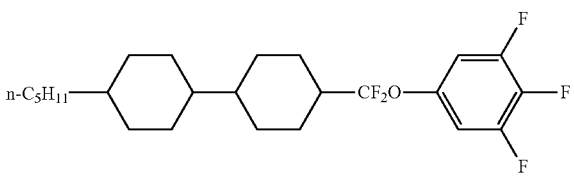
(28.5)

In the liquid crystal composition of the present invention, the content of the compound represented by formula (28.3) relative to the total mass of the liquid crystal composition of the present invention is preferably 1% by mass or more 30% by mass or less considering low-temperature solubility, transition temperature, electrical reliability, etc. More preferable examples of the content include 2% by mass or more and 20% by mass or less, 2% by mass or more and 15% by mass or less, 2% by mass or more and 12% by mass or less, 2% by mass or more and 9% by mass or less, 4% by mass or more and 20% by mass or less, 6% by mass or more and 20% by mass or less, and 8% by mass or more and 20% by mass or less.

In the liquid crystal composition of the present invention, the content of the compound represented by formula (28.5) relative to the total mass of the liquid crystal composition is preferably 3% by mass or more and 25% by mass or less, more preferably 3% by mass or more and 20% by mass or less, yet more preferably 3% by mass or more and 15% by mass or less, and most preferably 3% by mass or more 10% by mass or less considering low-temperature solubility, transition temperature, electrical reliability, etc.

The compound represented by general formula (IX-1) is preferably a compound represented by general formula (IX-1-2).

[Chem. 90]

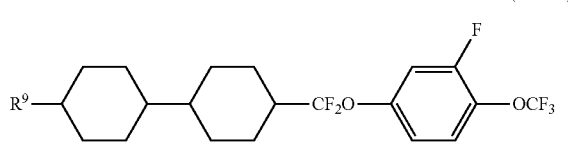
(IX-1-2)

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. Considering low-temperature solubility, transition temperature, electrical reliability, birefringence, etc., preferably one to three compounds and more preferably one to four compounds are used in combination.

The content of the compound represented by general formula (IX-1-2) relative to the total mass of the liquid crystal composition of the present invention is preferably 1% by mass or more and 30% by mass or less, more preferably 5% by mass or more and 30% by mass or less, more preferably 8% by mass or more and 30% by mass or less, more preferably 10% by mass or more and 25% by mass or less, yet more preferably 14% by mass or more and 22% by mass or less, and most preferably 16% by mass or more and 20% by mass or less considering low-temperature solubility, transition temperature, electrical reliability, etc.

The compound represented by general formula (IX-1-2) is preferably any of compounds represented by formula (29.1) to formula (29.4) and is preferably a compound represented by formula (29.2) or formula (29.4).

[Chem. 91]

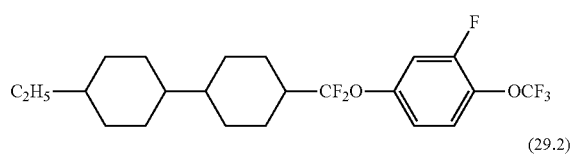
(29.1)

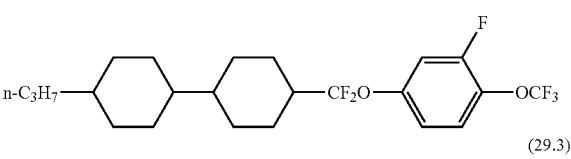
(29.2)

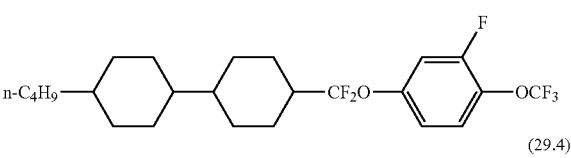
(29.3)

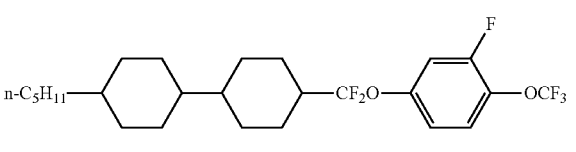
(29.4)

The compound represented by general formula (IX) is preferably a compound represented by general formula (IX-2).

[Chem. 92]

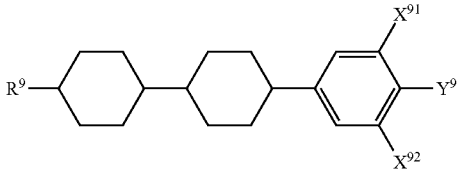
(IX-2)

(In the formula, $R^9$ represents an alkyl group having 1 to 5 carbon atoms, an alkenyl group having 2 to 5 carbon atoms, or an alkoxy group having 1 to 4 carbon atoms, $X^{91}$ and $X^{92}$ each independently represent a hydrogen atom or a fluorine atom, $Y^9$ represents a fluorine atom, a chlorine atom, or —$OCF_3$.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment, three in another embodiment, four in another embodiment, five in another embodiment, and six or more in another embodiment.

The compound represented by general formula (IX-2) is preferably a compound represented by general formula (IX-2-1).

[Chem. 93]

(IX-2-1)

(In the formula, $R^9$ represents an alkyl group having 1 to 5 carbon atoms, an alkenyl group having 2 to 5 carbon atoms, or an alkoxy group having 1 to 4 carbon atoms.)

The number of compound that can be used in combination is not particularly limited and one to three compounds are preferably used in combination considering low-temperature solubility, transition temperature, electrical reliability, birefringence, etc.

The content of the compound represented by general formula (IX-2-1) has an upper limit and a lower limit preferable for respective embodiments considering low-temperature solubility, transition temperature, electrical reliability, birefringence, etc.

For example, the content of the aforementioned compound relative to the total mass of the liquid crystal composition of the present invention is 1 to 40% by mass in one embodiment of the present invention, 2 to 40% by mass in another embodiment, 4 to 40% by mass in another embodiment, 10 to 40% by mass in another embodiment, 14 to 40% by mass in another embodiment, 16 to 40% by mass in another embodiment, and 21 to 40% by mass in another embodiment.

The content of the aforementioned compound relative to the total mass is, for example, 1 to 40% by mass in one embodiment of the present invention, 1 to 35% by mass in another embodiment, 1 to 30% by mass in another embodiment, 1 to 25% by mass in another embodiment, 1 to 22% by mass in another embodiment, 1 to 20% by mass in another embodiment, 1 to 10% by mass in another embodiment, 1 to 7% by mass in another embodiment, and 1 to 5% by mass in another embodiment.

The compound represented by general formula (IX-2-1) is preferably any of compounds represented by formula (30.1) to formula (30.4) and is preferably any of compounds represented by formula (30.1) and formula (30.2).

[Chem. 94]

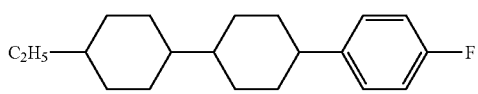

(30.1)

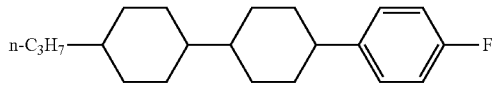

(30.2)

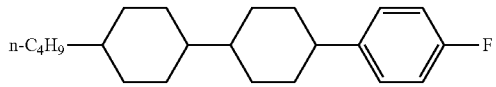

(30.3)

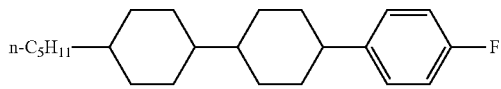

(30.4)

The compound represented by general formula (IX-2) is preferably a compound represented by general formula (IX-2-2).

[Chem. 95]

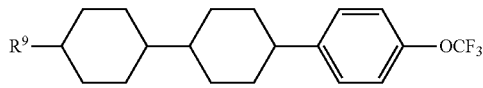

(IX-2-2)

(In the formula, $R^9$ represents an alkyl group having 1 to 5 carbon atoms, an alkenyl group having 2 to 5 carbon atoms, or an alkoxy group having 1 to 4 carbon atoms.)

The number of compound that can be used in combination is not particularly limited and preferably one to three compounds and more preferably one to four compounds are used in combination considering low-temperature solubility, transition temperature, electrical reliability, birefringence, etc.

The content of the compound represented by general formula (IX-2-2) has an upper limit and a lower limit preferable for respective embodiments considering low-temperature solubility, transition temperature, electrical reliability, birefringence, etc. For example, the content of the aforementioned compound relative to the total mass of the liquid crystal composition of the present invention is 1 to 40% by mass in one embodiment of the present invention and 2 to 40% by mass in another embodiment of the present invention.

The content of the aforementioned compound relative to the total mass is, for example, 1 to 40% by mass in one embodiment of the present invention, 1 to 35% by mass in another embodiment, 1 to 30% by mass in another embodiment, 1 to 25% by mass in another embodiment, 1 to 22% by mass in another embodiment, 1 to 15% by mass in another embodiment, and 1 to 12% by mass in another embodiment.

The compound represented by general formula (IX-2-2) is preferably any of compounds represented by formula (31.1) to formula (31.4), preferably any of compounds represented by formula (31.2) to formula (31.4), and more preferably a compound represented by formula (31.2).

[Chem. 96]

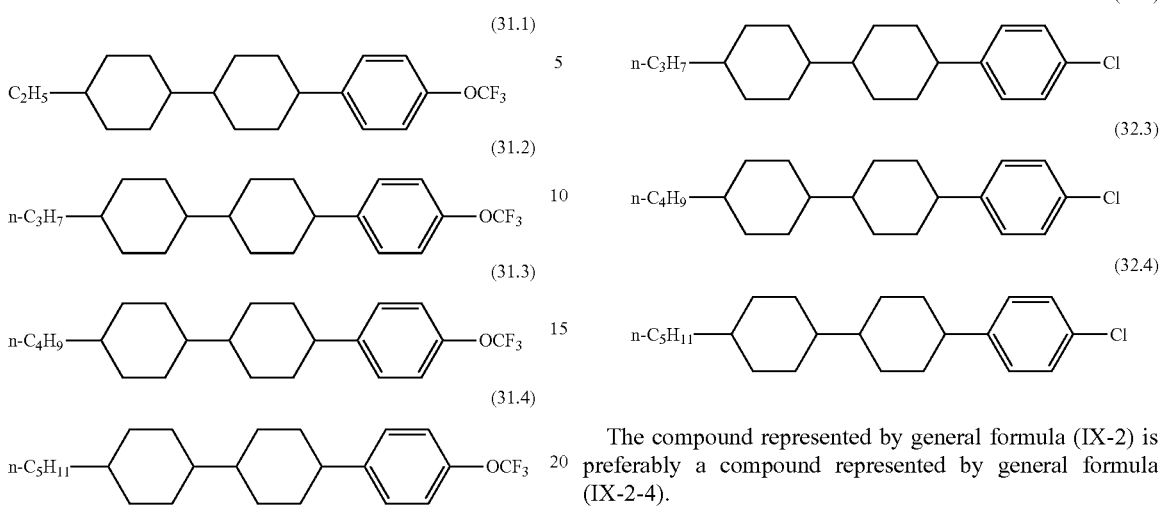

The compound represented by general formula (IX-2) is preferably a compound represented by general formula (IX-2-3).

[Chem. 97]

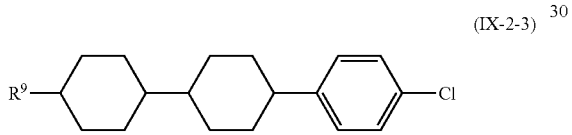

(In the formula, $R^9$ represents an alkyl group having 1 to 5 carbon atoms, an alkenyl group having 2 to 5 carbon atoms, or an alkoxy group having 1 to 4 carbon atoms.)

The number of compound that can be used in combination is not particularly limited and one or two compounds are preferably used in combination considering low-temperature solubility, transition temperature, electrical reliability, birefringence, etc.

The content of the compound represented by general formula (IX-2-3) relative to the total mass of the liquid crystal composition of the present invention is preferably 1% by mass or more and 30% by mass or less, more preferably 3% by mass or more and 20% by mass or less, yet more preferably 6% by mass or more and 15% by mass or less, and most preferably 8% by mass or more and 10% by mass or less considering low-temperature solubility, transition temperature, electrical reliability, etc.

The compound represented by general formula (IX-2-3) is preferably any of compounds represented by formula (32.1) to formula (32.4) and is preferably a compound represented by formula (32.2) and/or formula (32.4).

[Chem. 98]

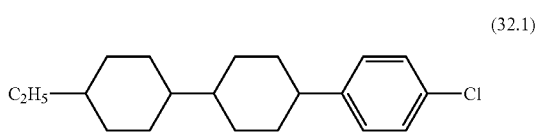

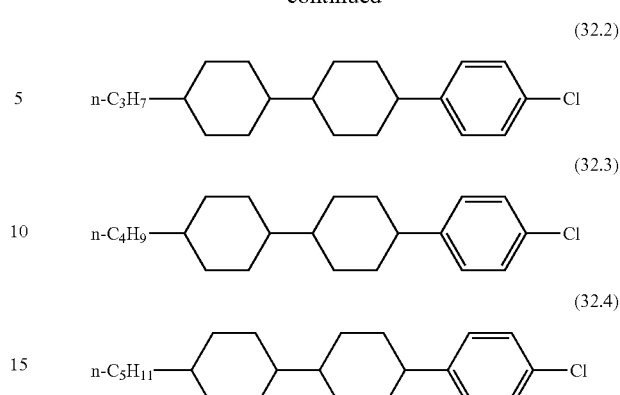

The compound represented by general formula (IX-2) is preferably a compound represented by general formula (IX-2-4).

[Chem. 99]

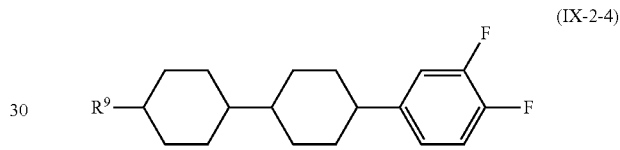

(In the formula, $R^9$ represents an alkyl group having 1 to 5 carbon atoms, an alkenyl group having 2 to 5 carbon atoms, or an alkoxy group having 1 to 4 carbon atoms.)

The content of the compound represented by represented by general formula (IX-2-4) relative to the total mass of the liquid crystal composition of the present invention is preferably 1% by mass or more and 30% by mass or less, more preferably 3% by mass or more and 20% by mass or less, yet more preferably 6% by mass or more and 15% by mass or less, and most preferably 8% by mass or more and 10% by mass or less considering low-temperature solubility, transition temperature, electrical reliability, etc.

The compound represented by general formula (IX-2-4) is preferably any of compounds represented by formula (33.1) to formula (33.6) and preferably a compound represented by formula (33.1) and/or formula (33.3).

[Chem. 100]

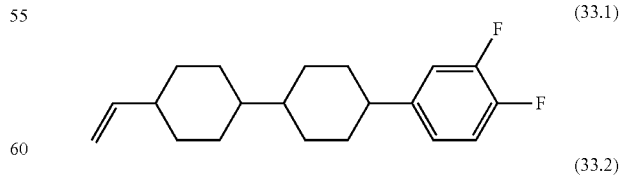

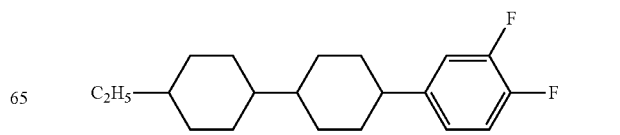

-continued

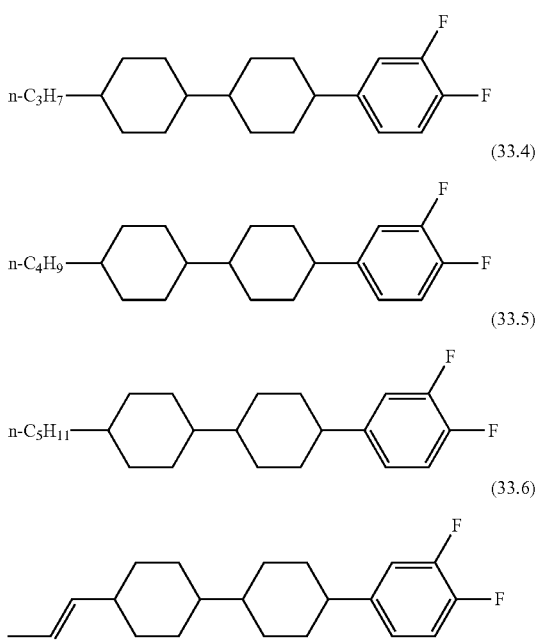

(33.3)
(33.4)
(33.5)
(33.6)

The compound represented by general formula (IX-2) is preferably a compound represented by general formula (IX-2-5).

[Chem. 101]

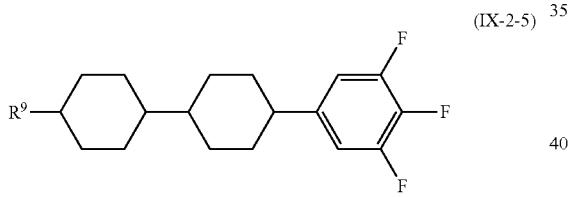

(IX-2-5)

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment, three in another embodiment, and four or more in another embodiment of the present invention.

The content of the compound represented by general formula (IX-2-5) has an upper limit and a lower limit preferable for respective embodiments considering low-temperature solubility, transition temperature, electrical reliability, birefringence, etc. For example, the content of the aforementioned compound relative to the total mass of the liquid crystal composition of the present invention is 4 to 45% by mass in one embodiment of the present invention, 8 to 45% by mass in another embodiment, 12 to 45% by mass in another embodiment, 21 to 45% by mass in another embodiment, 30 to 45% by mass in another embodiment, 31 to 45% by mass in another embodiment, and 34 to 45% by mass in another embodiment. The content of the aforementioned compound relative to the total mass is, for example, 4 to 45% by mass in one embodiment of the present invention, 4 to 40% by mass in another embodiment, 4 to 35% by mass in another embodiment, 4 to 32% by mass in another embodiment, 4 to 22% by mass in another embodiment, 4 to 13% by mass in another embodiment, 4 to 9% by mass in another embodiment, 4 to 8% by mass in another embodiment, and 4 to 5% by mass in another embodiment.

In order to keep viscosity of the liquid crystal composition of the present invention to a low level and response speed to a high level, the lower limit and the upper limit of the above-described content are preferably relatively low. In order to keep Tni of the liquid crystal composition of the present invention to a high level and decrease the frequency of ghosting, the lower limit and the upper limit of the above-described content are preferably relatively low. In order to increase the dielectric anisotropy to keep the driving voltage low, the lower limit and the upper limit of the above-described content are preferably relatively high.

The compound represented by general formula (IX-2-5) is preferably any of compounds represented by formula (34.1) to formula (34.7), and preferably any of compounds represented by formula (34.1), formula (34.2), formula (34.3), and/or formula (34.5).

[Chem. 102]

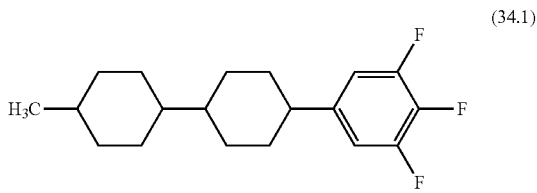

(34.1)
(34.2)

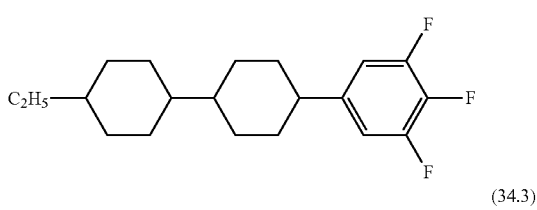

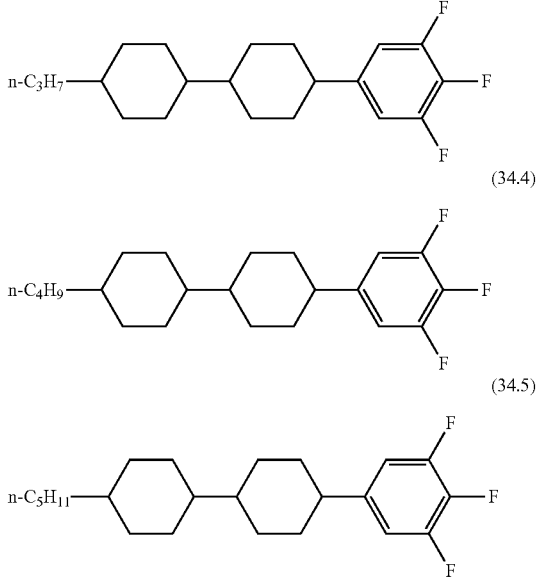

(34.3)
(34.4)
(34.5)

-continued (34.6)
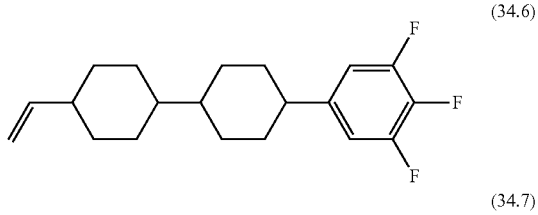

(34.7)
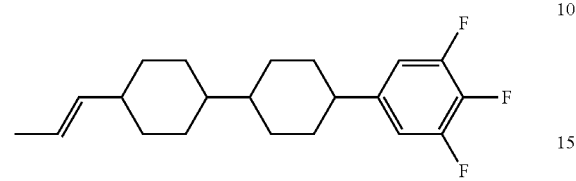

The compound represented by general formula (IX) is preferably a compound represented by general formula (IX-3).

[Chem. 103]

(IX-3)
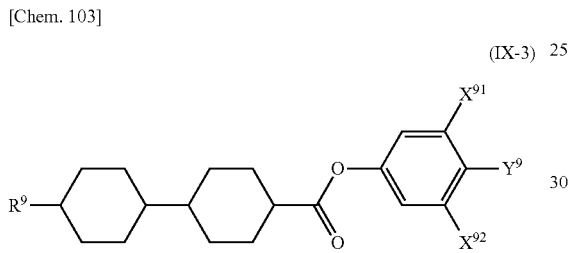

(In the formula, $R^9$ represents an alkyl group having 1 to 5 carbon atoms or an alkenyl group having 2 to 5 carbon atoms, $X^{91}$ and $X^{92}$ each independently represent a hydrogen atom or a fluorine atom, and $Y^9$ represents a fluorine atom, a chlorine atom, or —OCF$_3$.)

The compound represented by general formula (IX-3) is preferably a compound represented by general formula (IX-3-1).

[Chem. 104]

(IX-3-1)
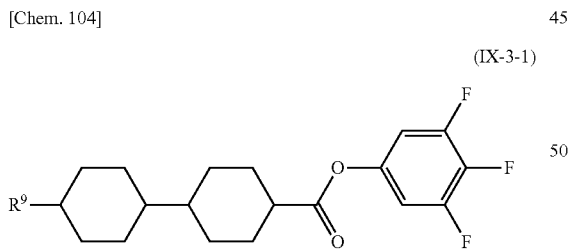

(In the formula, $R^9$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited and one or two compounds are preferably used in combination considering low-temperature solubility, transition temperature, electrical reliability, birefringence, etc.

The content of the compound represented by general formula (IX-3-1) relative to the total mass of the liquid crystal composition of the present invention is preferably 3% by mass or more and 30% by mass or less, more preferably 7% by mass or more and 30% by mass or less, yet more preferably 13% by mass or more and 20% by mass or less, and most preferably 15% by mass or more and 18% by mass or less considering low-temperature solubility, transition temperature, electrical reliability, etc.

The compound represented by general formula (IX-3-1) is preferably any of compounds represented by formula (35.1) to formula (35.4) and preferably a compound represented by formula (35.1) and/or formula (35.2).

[Chem. 105]

(35.1)
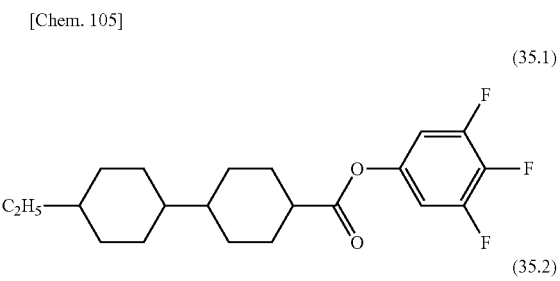

(35.2)
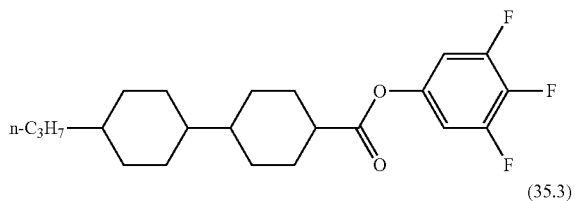

(35.3)
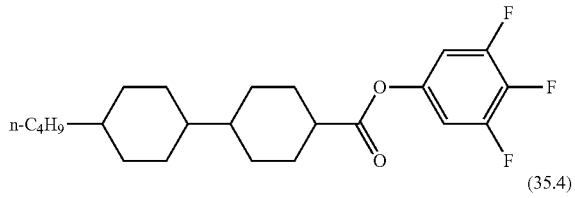

(35.4)
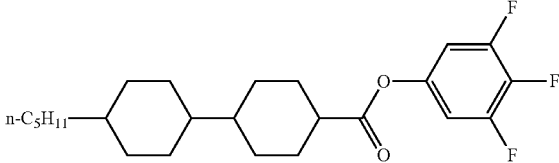

The compound represented by general formula (M) is preferably a compound represented by general formula (X).

[Chem. 106]

(X)
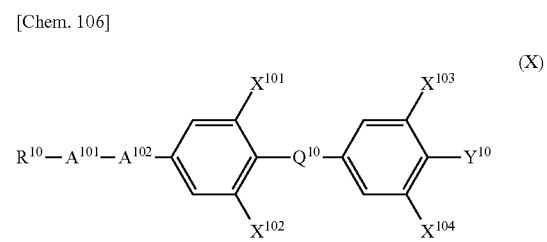

(In the formula, $X^{101}$ to $X^{104}$ each independently represent a fluorine atom or a hydrogen atom, $Y''$ represents a fluorine atom, a chlorine atom, or —OCF$_3$, $Q^{10}$ represents a single bond or —CF$_2$O—, $R''$ represents an alkyl group having 1 to 5 carbon atoms, an alkenyl group having 2 to 5 carbon atoms, or an alkoxy group having 1 to 4 carbon atoms, and $A^{101}$ and $A^{102}$ each independently represent a 1,4-cyclohexylene group, a 1,4-phenylene group, or

[Chem. 107]

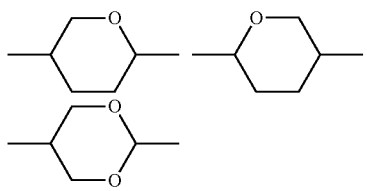

where a hydrogen atom on the 1,4-phenylene group may be substituted with a fluorine atom. However, compounds represented by general formula (ii) are excluded.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment of the present invention, three in another embodiment, four in another embodiment, and five or more in another embodiment.

The content of the compound represented by general formula (X) has an upper limit and a lower limit preferable for respective embodiments considering low-temperature solubility, transition temperature, electrical reliability, birefringence, etc. For example, the content of the aforementioned compound relative to the total mass of the liquid crystal composition of the present invention is 2 to 45% by mass in one embodiment of the present invention, 3 to 45% by mass in another embodiment, 6 to 45% by mass in another embodiment, 8 to 45% by mass in another embodiment, 9 to 45% by mass in another embodiment, 11 to 45% by mass in another embodiment, 12 to 45% by mass in another embodiment, 18 to 45% by mass in another embodiment, 19 to 45% by mass in another embodiment, 23 to 45% by mass in another embodiment, and 25 to 45% by mass in another embodiment. The content of the aforementioned compound relative to the total mass is, for example, 2 to 45% by mass in one embodiment of the present invention, 2 to 35% by mass in another embodiment, 2 to 30% by mass in another embodiment, 2 to 25% by mass in another embodiment, 2 to 20% by mass in another embodiment, 2 to 13% by mass in another embodiment, 2 to 9% by mass in another embodiment, 2 to 6% by mass in another embodiment, and 2 to 3% by mass in another embodiment.

In order to keep viscosity of the liquid crystal composition of the present invention to a low level and response speed to a high level, the lower limit and the upper limit of the above-described content are preferably relatively low. If a liquid crystal composition in which ghosting rarely occurs is needed, the lower limit and the upper limit of the above-described content are preferably relatively low. In order to increase the dielectric anisotropy to keep the driving voltage low, the lower limit and the upper limit of the above-described content are preferably relatively high.

The compound represented by general formula (X) used in the liquid crystal composition of the present invention is preferably a compound represented by general formula (X-1).

[Chem. 108]

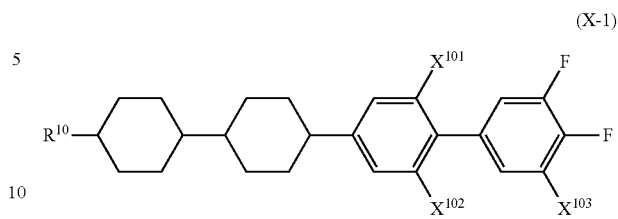

(X-1)

(In the formula, $X^{101}$ to $X^{103}$ each independently represent a fluorine atom or a hydrogen atom, and $R^{10}$ each independently represent an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment of the present invention, three in another embodiment, four in another embodiment, and five or more in another embodiment.

The content of the compound represented by general formula (X-1) has an upper limit and a lower limit preferable for respective embodiments considering low-temperature solubility, transition temperature, electrical reliability, birefringence, etc. For example, the content of the aforementioned compound relative to the total mass of the liquid crystal composition of the present invention is 2 to 40% by mass in one embodiment of the present invention, 3 to 40% by mass in another embodiment, 5 to 40% by mass in another embodiment, 6 to 40% by mass in another embodiment, 7 to 40% by mass in another embodiment, 8 to 40% by mass in another embodiment, and 9 to 40% by mass in another embodiment. The content of the compound is 13 to 40% by mass in another embodiment. The content of the compound is 18 to 40% by mass in another embodiment. The content of the compound is 23 to 40% by mass in another embodiment.

The content of the aforementioned compound relative to the total mass is, for example, 2 to 40% by mass in one embodiment of the present invention, 2 to 30% by mass in another embodiment, 2 to 25% by mass in another embodiment, 2 to 20% by mass in another embodiment, 2 to 15% by mass in another embodiment, 2 to 10% by mass in another embodiment, 2 to 6% by mass in another embodiment, and 2 to 4% by mass in another embodiment.

The compound represented by general formula (X-1) used in the liquid crystal composition of the present invention is preferably a compound represented by general formula (X-1-1).

[Chem. 109]

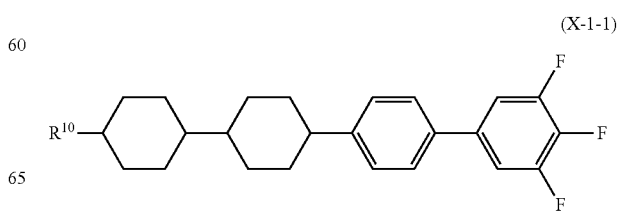

(X-1-1)

(In the formula, $R^{10}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment of the present invention, three in another embodiment, and four or more in another embodiment.

The content of the compound represented by general formula (X-1-1) has an upper limit and a lower limit preferable for respective embodiments considering low-temperature solubility, transition temperature, electrical reliability, birefringence, etc. For example, the content of the aforementioned compound relative to the total mass of the liquid crystal composition of the present invention is 3 to 30% by mass in one embodiment of the present invention, 4 to 30% by mass in another embodiment, 6 to 30% by mass in another embodiment, 9 to 30% by mass in another embodiment, 12 to 30% by mass in another embodiment, 15 to 30% by mass in another embodiment, 18 to 30% by mass in another embodiment, and 21 to 30% by mass in another embodiment.

The content of the aforementioned compound relative to the total mass is, for example 3 to 30% by mass in one embodiment of the present invention, 3 to 20% by mass in another embodiment, 3 to 13% by mass in another embodiment, 3 to 10% by mass in another embodiment, and 3 to 7% by mass in another embodiment.

The compound represented by general formula (X-1-1) used in the liquid crystal composition of the present invention is specifically preferably any of compounds represented by formula (36.1) to formula (36.4) and, of these, a compound represented by formula (36.1) and/or formula (36.2) is preferably contained.

[Chem. 110]

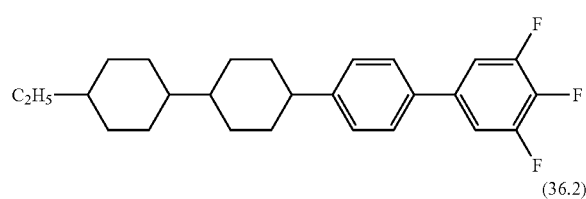
(36.1)

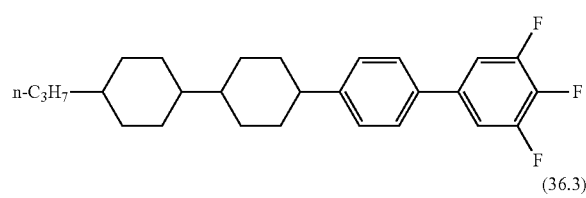
(36.2)

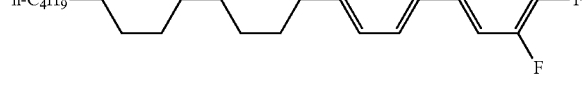
(36.3)

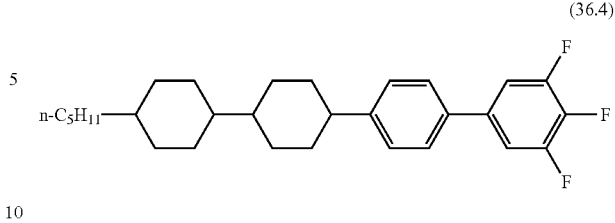
(36.4)

The compound represented by general formula (X-1) used in the liquid crystal composition of the present invention is preferably a compound represented by general formula (X-1-2).

[Chem. 111]

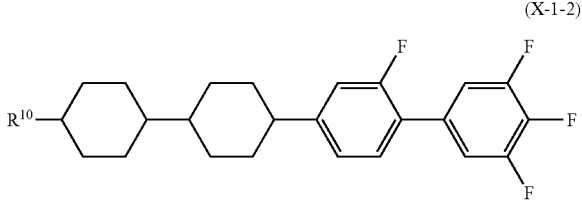
(X-1-2)

(In the formula, $R^{10}$ represents an alkyl group having 1 to 5 carbon atoms, an alkenyl group having 2 to 5 carbon atoms, or an alkoxy group having 1 to 4 carbon atoms.)

The content of the compound represented by general formula (X-1-2) relative to the total mass of the liquid crystal composition of the present invention is preferably 1% by mass or more and 20% by mass or less, more preferably 2% by mass or more and 16% by mass or less, yet more preferably 6% by mass or more and 12% by mass or less, and most preferably 6% by mass or more and 10% by mass or less considering low-temperature solubility, transition temperature, electrical reliability, etc.

The compound represented by general formula (X-1-2) used in the liquid crystal composition of the present invention is specifically preferably any of compounds represented by formula (37.1) to formula (37.4) and, of these, a compound represented by formula (37.2) is preferably contained.

[Chem. 112]

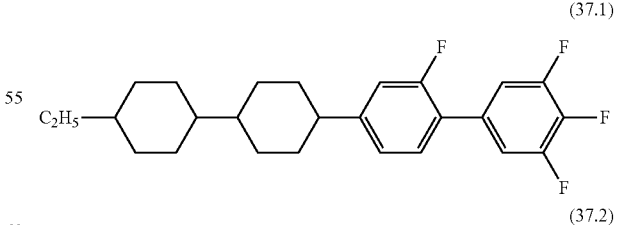
(37.1)

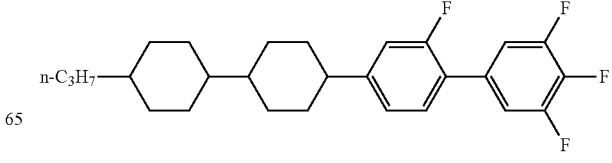
(37.2)

-continued (37.3)
(37.4)

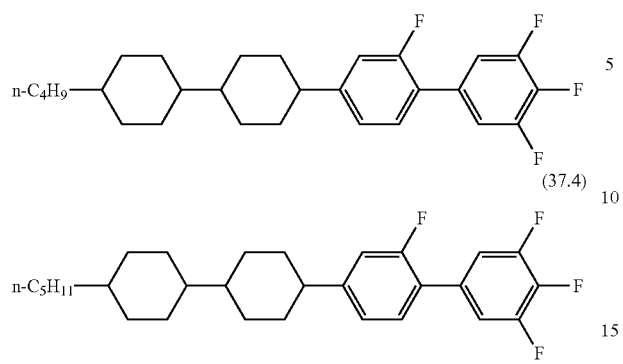

In the liquid crystal composition of the present invention, the content of the compound represented by formula (37.2) relative to the total mass of the liquid crystal composition of the present invention is preferably 1 to 20% by mass, more preferably 2 to 10% by mass, yet more preferably 2 to 8% by mass, and most preferably 2 to 5% by mass considering low-temperature solubility, transition temperature, electrical reliability, etc.

The compound represented by general formula (X-1) used in the liquid crystal composition of the present invention is preferably a compound represented by general formula (X-1-3).

[Chem. 113]

(X-1-3)

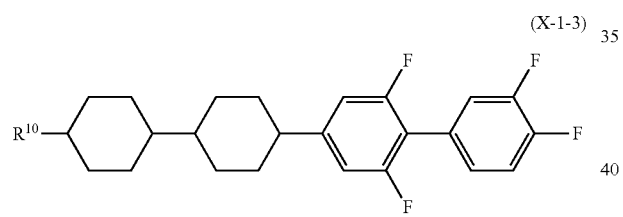

(In the formula, $R^{10}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. One or more compounds are preferably used in combination considering as low-temperature solubility, transition temperature, electrical reliability, birefringence, etc.

The content of the compound represented by general formula (X-1-3) relative to the total mass of the liquid crystal composition of the present invention is preferably 1% by mass or more, more preferably 2% by mass or more, and most preferably 6% by mass or more. Considering low-temperature solubility, transition temperature, electrical reliability, etc., the maximum content is preferably 20% by mass or less, more preferably 16% by mass or less, yet more preferably 12% by mass or less, and most preferably 10% by mass or less.

The compound represented by general formula (X-1-3) used in the liquid crystal composition of the present invention is specifically preferably any of compounds represented by formula (38.1) to formula (38.4) and, of these, a compound represented by formula (38.2) is preferably contained.

[Chem. 114]

(38.1)
(38.2)
(38.3)
(38.4)

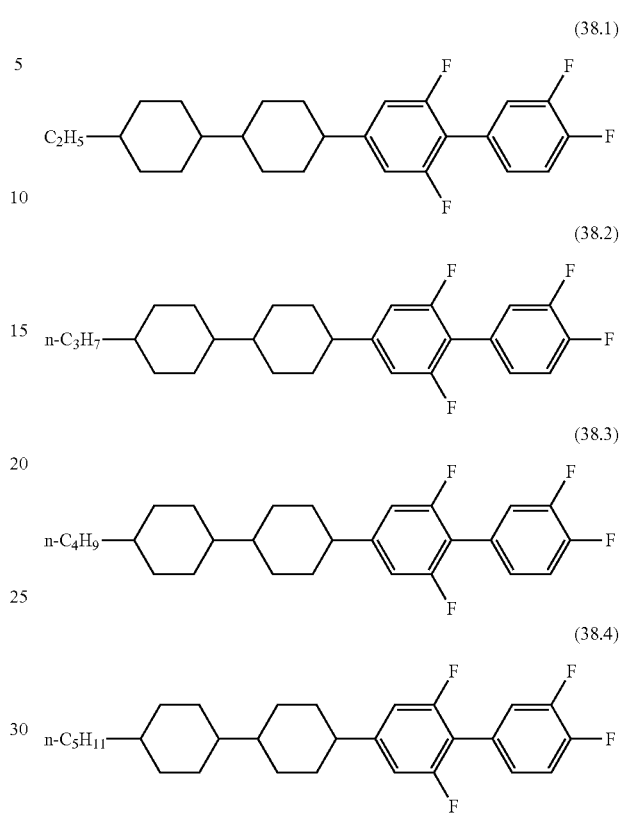

The compound represented by general formula (X) used in the liquid crystal composition of the present invention is preferably a compound represented by general formula (X-2).

[Chem. 115]

(X-2)

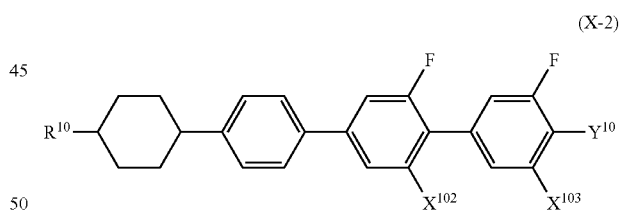

(In the formula, $X^{102}$ to $X^{103}$ each independently represent a fluorine atom or a hydrogen atom, $Y^{10}$ represents a fluorine atom or a chlorine atom, and $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited and one or more compounds are preferably used in combination considering low-temperature solubility, transition temperature, electrical reliability, birefringence, etc.

The compound represented by general formula (X) is preferably a compound represented by general formula (X-3).

[Chem. 116]

(X-3)

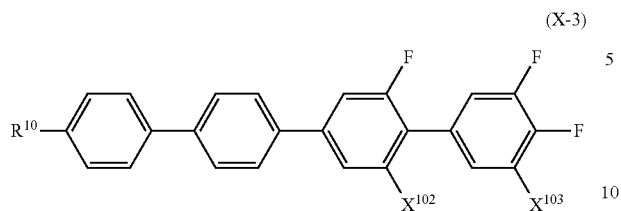

(In the formula, $X^{102}$ to $X^{103}$ each independently represent a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited and one or more compounds are preferably used in combination considering low-temperature solubility, transition temperature, electrical reliability, birefringence, etc.

The compound represented by general formula (X-3) used in the liquid crystal composition of the present invention is preferably a compound represented by general formula (X-3-1).

[Chem. 117]

(X-3-1)

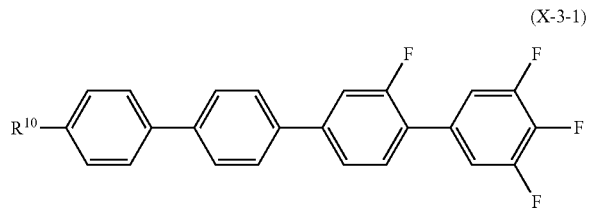

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited and one or more compounds are preferably used in combination considering low-temperature solubility, transition temperature, electrical reliability, birefringence, etc.

The content of the compound represented by general formula (X-3-1) relative to the total mass of the liquid crystal composition of the present invention is preferably 1% by mass or more, more preferably 2% by mass or more, and most preferably 3% by mass or more. Considering low-temperature solubility, transition temperature, electrical reliability, etc., the maximum content is preferably 10% by mass or less, more preferably 8% by mass or less, yet more preferably 6% by mass or less, and most preferably 4% by mass or less.

The compound represented by general formula (X-3-1) used in the liquid crystal composition of the present invention is specifically preferably any of compounds represented by formula (41.1) to formula (41.4), and, of these, a compound represented by formula (41.2) is preferably contained.

[Chem. 118]

(41.1)

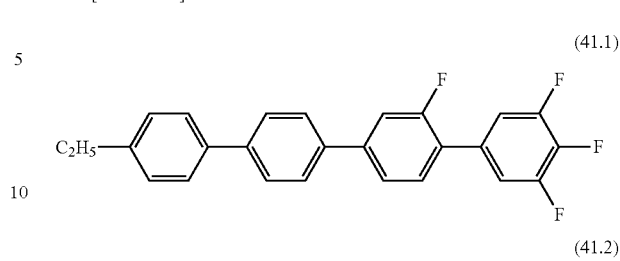

(41.2)

(41.3)

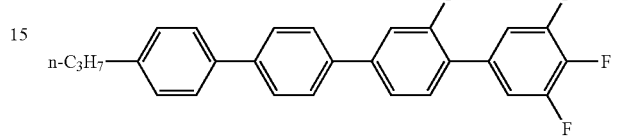

(41.4)

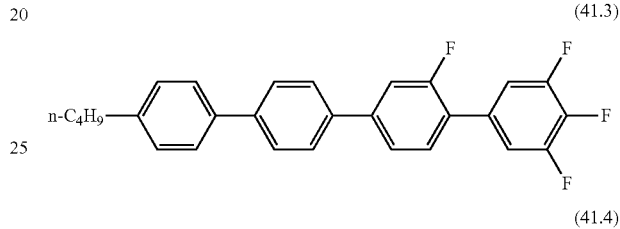

The compound represented by general formula (X) is preferably a compound represented by general formula (X-4).

[Chem. 119]

(X-4)

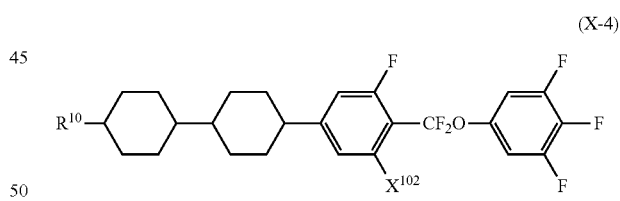

(In the formula, $X^{102}$ represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Preferably one or more and more preferably one to three or more compounds are used in combination considering low-temperature solubility, transition temperature, electrical reliability, birefringence, etc.

The compound represented by general formula (X-4) used in the liquid crystal composition of the present invention is preferably a compound represented by general formula (X-4-1).

[Chem. 120]

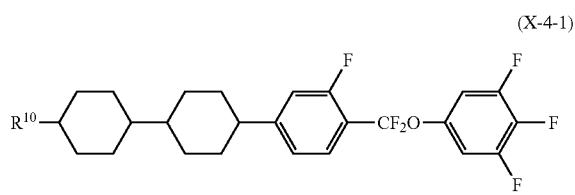
(X-4-1)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited and preferably one or more compounds and more preferably one to three or more compounds are used in combination considering low-temperature solubility, transition temperature, electrical reliability, birefringence, etc.

The content of the compound represented by general formula (X-4-1) relative to the total mass of the liquid crystal composition of the present invention is preferably 2% by mass or more and 20% by mass or less, more preferably 5% by mass or more and 17% by mass or less, yet more preferably 10% by mass or more and 15% by mass or less, and most preferably 10% by mass or more and 13% by mass or less considering low-temperature solubility, transition temperature, electrical reliability, etc.

The compound represented by general formula (X-4-1) used in the liquid crystal composition of the present invention is specifically preferably any of compounds represented by formula (42.1) to formula (42.4) and, of these, a compound represented by formula (42.3) is preferably contained.

[Chem. 121]

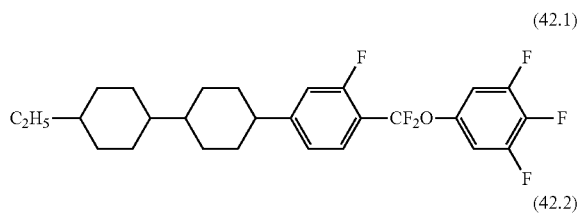
(42.1)

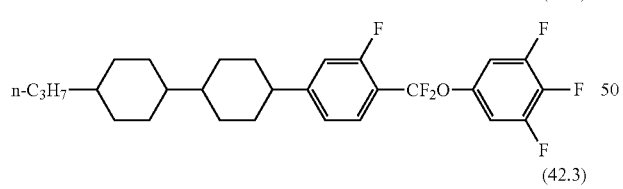
(42.2)

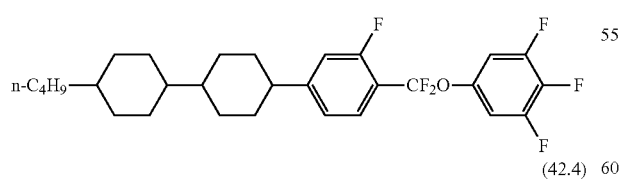
(42.3)

(42.4)

In the liquid crystal composition of the present invention, the content of the compound represented by formula (42.3) relative to the total mass of the liquid crystal composition of the present invention is preferably 1 to 20% by mass, more preferably 2 to 10% by mass, and most preferably 2 to 8% by mass considering low-temperature solubility, transition temperature, electrical reliability, etc.

The compound represented by general formula (X) used in the liquid crystal composition of the present invention is preferably a compound represented by general formula (X-4-2).

[Chem. 122]

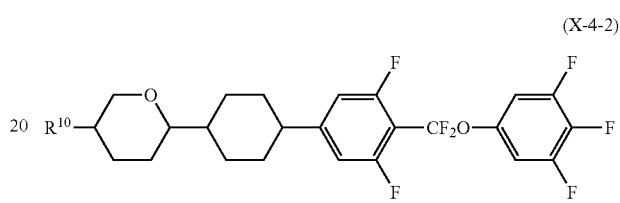
(X-4-2)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Preferably one or more and more preferably one to three or more compounds are used in combination considering low-temperature solubility, transition temperature, electrical reliability, birefringence, etc.

The content of the compound represented by general formula (X-4-2) relative to the total mass of the liquid crystal composition of the present invention is preferably 2% by mass or more and 20% by mass or less, more preferably 5% by mass or more and 17% by mass or less, yet more preferably 10% by mass or more and 15% by mass or less, and most preferably 10% by mass or more and 13% by mass or less considering low-temperature solubility, transition temperature, electrical reliability, etc.

The compound represented by general formula (X-4-2) used in the liquid crystal composition of the present invention is specifically preferably any of compounds represented by (42.11) to formula (42.14) and, of these, a compound represented by formula (42.13) or formula (42.14) is preferably contained.

[Chem. 123]

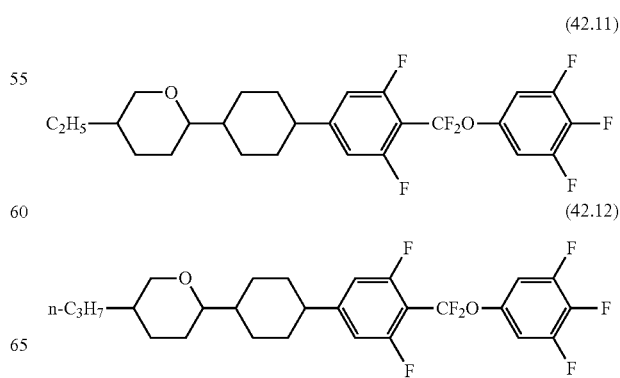
(42.11)

(42.12)

(42.13)
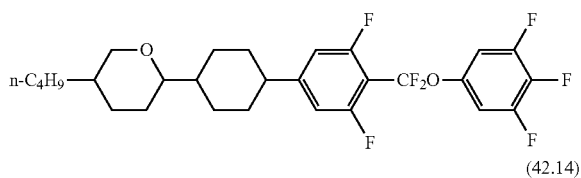

(42.14)
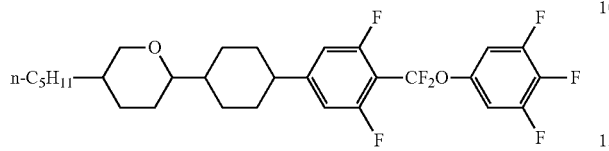

The compound represented by general formula (X) used in the liquid crystal composition of the present invention is preferably a compound represented by general formula (X-4-3).

[Chem. 124]

(X-4-3)
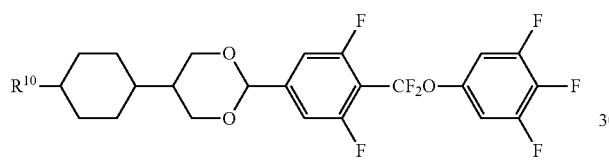

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Preferably one or more and more preferably one to three or more compounds are used in combination considering low-temperature solubility, transition temperature, electrical reliability, birefringence, etc.

The content of the compound represented by general formula (X-4-3) relative to the total mass of the liquid crystal composition of the present invention is preferably 2% by mass or more and 20% by mass or less, more preferably 5% by mass or more and 17% by mass or less, yet more preferably 10% by mass or more and 15% by mass or less, and most preferably 10% by mass or more and 13% by mass or less considering low-temperature solubility, transition temperature, electrical reliability, etc.

The compound represented by general formula (X-4-3) used in the liquid crystal composition of the present invention is specifically preferably any of compounds represented by formula (42.21) to formula (42.24) and, of these, a compound represented by formula (42.22) is preferably contained.

[Chem. 125]

(42.21)
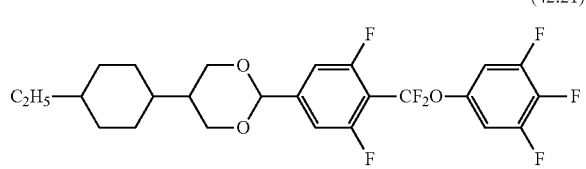

(42.22)
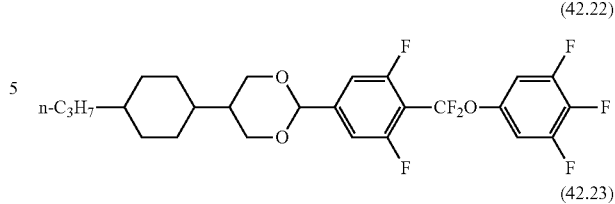

(42.23)
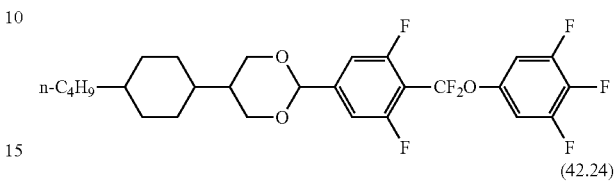

(42.24)
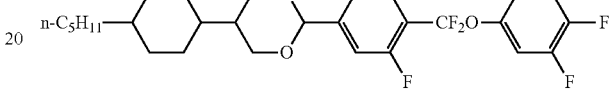

The compound represented by general formula (X) is preferably a compound represented by general formula (X-5).

[Chem. 126]

(X-5)
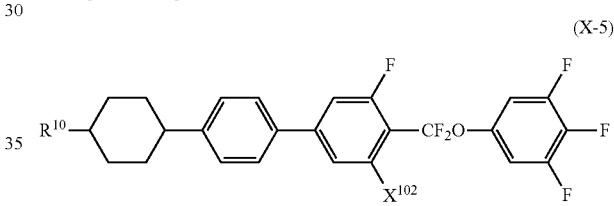

(In the formula, $X^{102}$ represents a fluorine atom or a hydrogen atom, and $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Preferably one or more and more preferably one to three or more compounds are used in combination considering low-temperature solubility, transition temperature, electrical reliability, birefringence, etc.

The compound represented by general formula (X-5) used in the liquid crystal composition of the present invention is preferably a compound represented by general formula (X-5-1).

[Chem. 127]

(X-5-1)
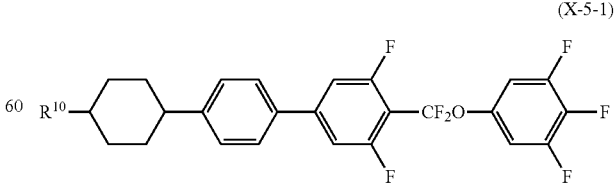

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Preferably one or more and more preferably one to three or more compounds are used in combination considering low-temperature solubility, transition temperature, electrical reliability, birefringence, etc.

The compound represented by general formula (X-5-1) used in the liquid crystal composition of the present invention is specifically preferably any of compounds represented by formula (43.1) to formula (43.4) and, of these, a compound represented by formula (43.2) is preferably contained.

[Chem. 128]

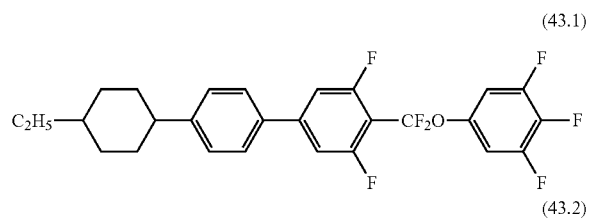

(43.1), (43.2), (43.3), (43.4)

The compound represented by general formula (X) used in the liquid crystal composition of the present invention is preferably a compound represented by general formula (X-6).

[Chem. 129]

(X-6)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. One or more compounds are preferably used in combination considering low-temperature solubility, transition temperature, electrical reliability, birefringence, etc.

The content of the compound represented by general formula (X-6) has an upper limit and a lower limit preferable for respective embodiments considering low-temperature solubility, transition temperature, electrical reliability, birefringence, etc. For example, the content of the aforementioned compound relative to the total mass of the liquid crystal composition of the present invention is 4 to 30% by mass in one embodiment of the present invention, 5 to 30% by mass in another embodiment, 6 to 30% by mass in another embodiment, and 8 to 30% by mass in another embodiment.

The content of the aforementioned compound relative to the total mass of the liquid crystal composition of the present invention is, for example, 1 to 30% by mass in one embodiment of the present invention, 1 to 20% by mass in another embodiment, 1 to 13% by mass in another embodiment, and 1 to 10% by mass in another embodiment.

The compound represented by general formula (X-6) used in the liquid crystal composition of the present invention is specifically preferably any of compounds represented by formula (44.1) to formula (44.4), and, of these, a compound represented by formula (44.1) and/or formula (44.2) is preferably contained.

[Chem. 130]

(44.1), (44.2), (44.3), (44.4)

The liquid crystal composition of the present invention may contain a compound represented by general formula (X-7), which is a compound similar to a compound represented by general formula (X).

[Chem. 131]

(X-7)

(In the formula, $R^{10}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited and one or more compounds are preferably used in combination considering low-temperature solubility, transition temperature, electrical reliability, birefringence, etc.

The content of the compound represented by general formula (X-7) has an upper limit and a lower limit preferable for respective embodiments considering low-temperature solubility, transition temperature, electrical reliability, birefringence, etc.

For example, the content of the aforementioned compound relative to the total mass of the liquid crystal composition of the present invention is 4 to 30% by mass in one embodiment of the present invention, 5 to 30% by mass in another embodiment, 6 to 30% by mass in another embodiment, 8 to 30% by mass in another embodiment, 9 to 30% by mass in another embodiment, 11 to 30% by mass in another embodiment, 14 to 30% by mass in another embodiment, and 18 to 30% by mass in another embodiment.

The content of the aforementioned compound relative to the total mass is, for example, 4 to 30% by mass in one embodiment of the present invention, 4 to 20% by mass in another embodiment, 4 to 13% by mass in another embodiment, 4 to 10% by mass in another embodiment, 4 to 7% by mass in another embodiment, and 3% by mass in another embodiment.

The compound represented by general formula (X-7) used in the liquid crystal composition of the present invention is specifically preferably any of compounds represented by formula (44.11) to formula (44.14) and, of these, a compound represented by formula (44.13) is preferably contained.

[Chem. 132]

The compound represented by general formula (X) is preferably a compound selected from the group of compounds represented by general formula (XI).

[Chem. 133]

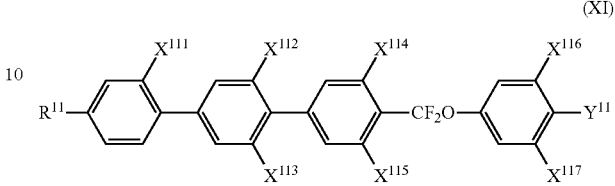

(XI)

(In the formula, $X^{111}$ to $X^{117}$ each independently represent a fluorine atom or a hydrogen atom, at least one of $X^{111}$ to $X^{117}$ represents a fluorine atom, $R^{11}$ represents an alkyl group having 1 to 5 carbon atoms, an alkenyl group having 2 to 5 carbon atoms, or an alkoxy group having 1 to 4 carbon atoms, and $Y^{11}$ represents a fluorine atom or —$OCF_3$.)

The compounds that can be used in combination are not particularly limited and one to three or more compounds are preferably used in combination considering low-temperature solubility, transition temperature, electrical reliability, birefringence, etc.

The content of the compound represented by general formula (XI) has an upper limit and a lower limit preferable for respective embodiments considering low-temperature solubility, transition temperature, electrical reliability, birefringence, etc. For example, the content of the aforementioned compound relative to the total mass of the liquid crystal composition of the present invention is 2 to 30% by mass in one embodiment of the present invention, 4 to 30% by mass in another embodiment, 5 to 30% by mass in another embodiment, 7 to 30% by mass in another embodiment, 9 to 30% by mass in another embodiment, 10 to 30% by mass in another embodiment, 12 to 30% by mass in another embodiment, 13 to 30% by mass in another embodiment, 15 to 30% by mass in another embodiment, and 18 to 30% by mass in another embodiment.

The content of the aforementioned compound relative to the total mass is, for example, 2 to 30% by mass in one embodiment of the present invention, 2 to 25% by mass in another embodiment, 2 to 20% by mass in another embodiment, 2 to 15% by mass in another embodiment, 2 to 10% by mass in another embodiment, and 2 to 5% by mass in another embodiment.

If the liquid crystal composition of the present invention is to be used in a liquid crystal display element having a small cell gap, the content of the compound represented by general formula (XI) is preferably relatively large. If it is to be used in a liquid crystal display element with a low operation voltage, the content of the compound represented by general formula (XI) is preferably relatively large. If it is to be used in a liquid crystal display element for use in low-temperature environments, the content of the compound represented by general formula (XI) is preferably relatively small. If the liquid crystal composition is to be used a liquid crystal display element having a high response speed, the content of the compound represented by general formula (XI) is preferably relatively small.

The compound represented by general formula (XI) used in the liquid crystal composition of the present invention is preferably a compound represented by general formula (XI-1).

[Chem. 134]

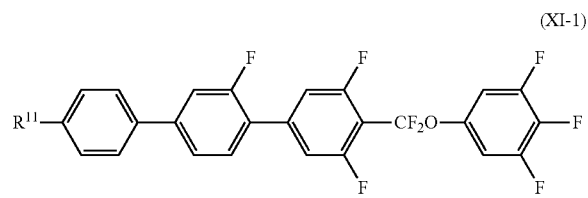

(XI-1)

(In the formula, $R^{11}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. An appropriate combination of compounds is used for each embodiment considering low-temperature solubility, transition temperature, electrical reliability, birefringence, etc. For example, one compound is used in one embodiment of the present invention, two are used in another embodiment, and three or more are used in another embodiment.

The content of the compound represented by general formula (XI-1) relative to the total mass of the liquid crystal composition of the present invention is preferably 1% by mass or more and 20% by mass or less, more preferably 3% by mass or more and 20% by mass or less, yet more preferably 4% by mass or more and 20% by mass or less, yet more preferably 6% by mass or more and 15% by mass or less, and most preferably 9% by mass or more and 12% by mass or less considering low-temperature solubility, transition temperature, electrical reliability, etc.

The compound represented by general formula (XI-1) used in the liquid crystal composition of the present invention is specifically preferably any of compounds represented by formula (45.1) to formula (45.4). Of these, compounds represented by formula (45.2) to formula (45.4) are preferably contained and a compound represented by formula (45.2) is more preferably contained.

[Chem. 135]

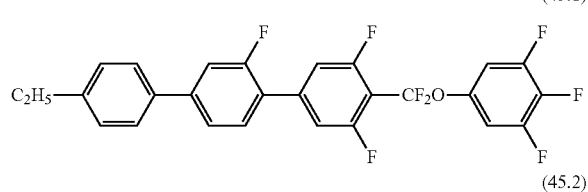

(45.1)

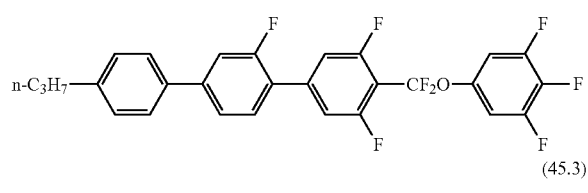

(45.2)

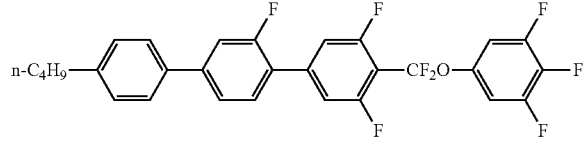

(45.3)

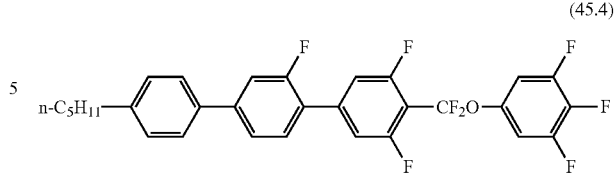

(45.4)

In the liquid crystal composition of the present invention, the content of the compound represented by formula (45.2) relative to the total mass of the liquid crystal composition of the present invention is preferably 1 to 25% by mass, more preferably 2 to 15% by mass, yet more preferably 3 to 10% by mass, and most preferably 4 to 8% by mass considering low-temperature solubility, transition temperature, electrical reliability, etc.

The compound represented by general formula (XI) used in the liquid crystal composition of the present invention is preferably a compound represented by general formula (XI-2).

[Chem. 136]

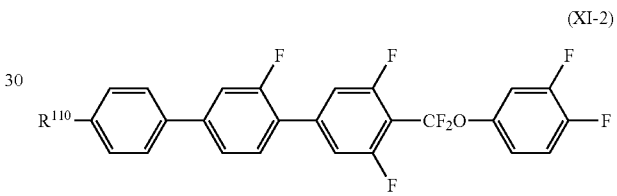

(XI-2)

(In the formula, $R^{i1o}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. An appropriate combination of compounds is used for each embodiment considering low-temperature solubility, transition temperature, electrical reliability, birefringence, etc. For example, one compound is used in one embodiment of the present invention, two are used in another embodiment, and three or more are used in another embodiment.

The content of the compound represented by general formula (XI-2) relative to the total mass of the liquid crystal composition of the present invention is preferably 1% by mass or more and 20% by mass or less, more preferably 3% by mass or more and 20% by mass or less, yet more preferably 4% by mass or more and 20% by mass or less, yet more preferably 6% by mass or more and 15% by mass or less, and most preferably 9% by mass or more and 12% by mass or less considering low-temperature solubility, transition temperature, electrical reliability, etc.

The compound represented by general formula (XI-2) used in the liquid crystal composition of the present invention is specifically preferably any of compounds represented by formula (45.11) to formula (45.14). Of these, compounds represented by formula (45.12) to formula (45.14) are preferably contained and a compound represented by formula (45.12) is most preferably contained.

[Chem. 137]

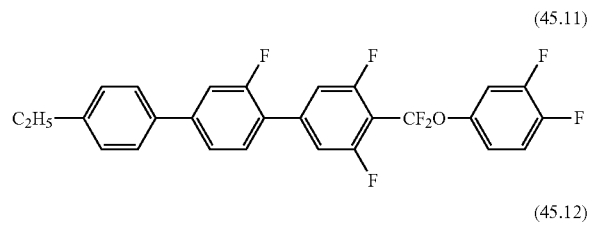
(45.11)

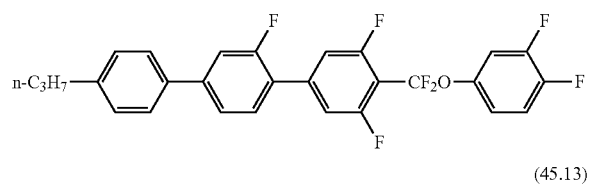
(45.12)

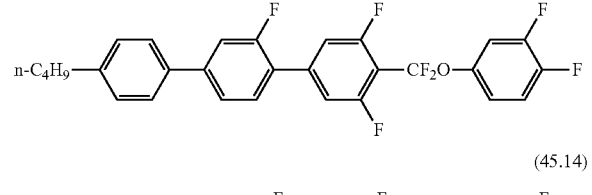
(45.13)

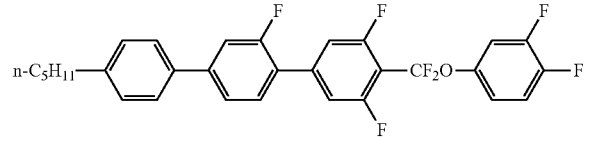
(45.14)

The compound represented by general formula (X) is preferably a compound selected from the group of compounds represented by general formula (XII).

[Chem. 138]

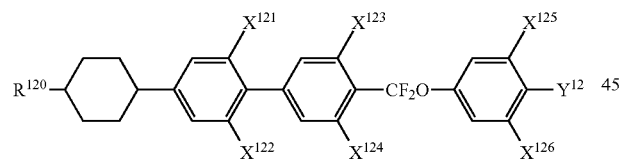
(XII)

(In the formula, $X^{121}$ to $X^{126}$ each independently represent a fluorine atom or a hydrogen atom, $R^{120}$ represents an alkyl group having 1 to 5 carbon atoms, an alkenyl group having 2 to 5 carbon atoms, or an alkoxy group having 1 to 4 carbon atoms, and $Y^{12}$ represents a fluorine atom or —OCF$_3$.)

The compounds that can be used in combination are not particularly limited. Considering low-temperature solubility, transition temperature, electrical reliability, birefringence, etc., preferably one to three or more compounds and more preferably one to four or more compounds are used in combination.

The compound represented by general formula (XII) used in the liquid crystal composition of the present invention is preferably a compound represented by general formula (XII-1).

[Chem. 139]

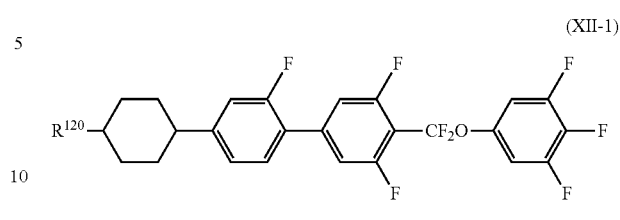
(XII-1)

(In the formula, $R^{120}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering low-temperature solubility, transition temperature, electrical reliability, birefringence, etc., preferably one or two or more compounds and more preferably one to three or more compounds are used in combination.

The content of the compound represented by general formula (XII-1) relative to the total mass of the liquid crystal composition of the present invention is preferably 1% by mass or more and 15% by mass or less, more preferably 2% by mass or more and 10% by mass or less, yet more preferably 3% by mass or more and 8% by mass or less, and most preferably 4% by mass or more and 6% by mass or less considering low-temperature solubility, transition temperature, electrical reliability, etc.

The compound represented by general formula (XII-1) used in the liquid crystal composition of the present invention is specifically preferably any of compounds represented by formula (46.1) to formula (46.4) and, of these, compounds represented by formula (46.2) to formula (46.4) are preferably contained.

[Chem. 140]

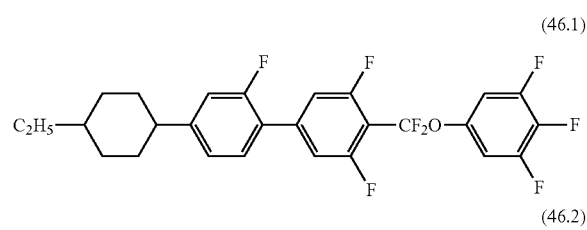
(46.1)

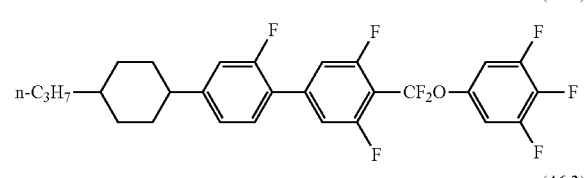
(46.2)

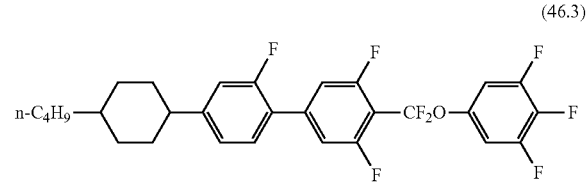
(46.3)

-continued (46.4)
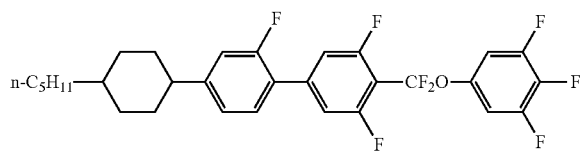

The compound represented by general formula (XII) is preferably a compound represented by general formula (XII-2).

[Chem. 141]

(XII-2)
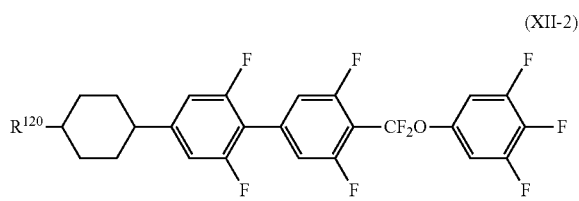

(In the formula, $R^{120}$ represents an alkyl group having 1 to 5 carbon atoms, an alkenyl group having 2 to 5 carbon atoms, or an alkoxy group having 1 to 4 carbon atoms.)

The compounds that can be used in combination are not particularly limited. Considering low-temperature solubility, transition temperature, electrical reliability, birefringence, etc., preferably one or two or more compounds and more preferably one to three or more compounds are used in combination.

The content of the compound represented by general formula (XII-2) relative to the total mass of the liquid crystal composition of the present invention is preferably 1% by mass or more and 20% by mass or less, more preferably 3% by mass or more and 20% by mass or less, yet more preferably 4% by mass or more and 17% by mass or less, yet more preferably 6% by mass or more and 15% by mass or less, and most preferably 9% by mass or more and 13% by mass or less considering low-temperature solubility, transition temperature, electrical reliability, etc.

The compound represented by general formula (XII-2) used in the liquid crystal composition of the present invention is specifically preferably any of compounds represented by formula (47.1) to formula (47.4) and, of these, compounds represented by formula (47.2) to formula (47.4) are preferably contained.

[Chem. 142]

(47.1)
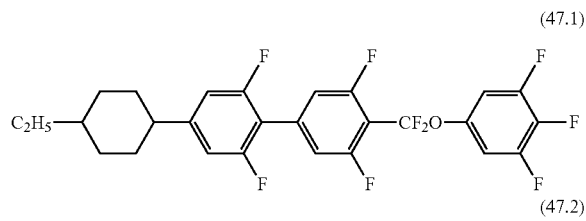

(47.2)
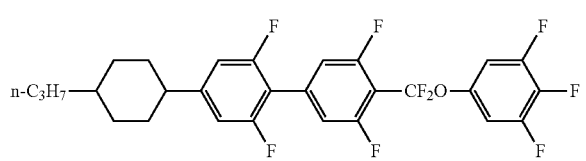

-continued (47.3)
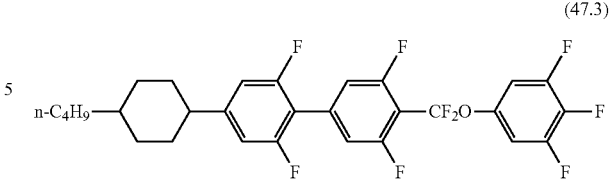

(47.4)
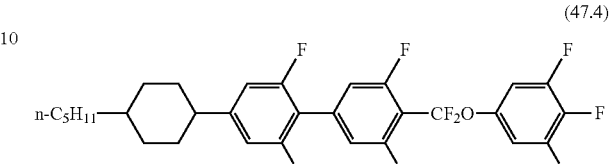

The compound represented by general formula (M) is preferably a compound selected from the group of compounds represented by general formula (XIII).

[Chem. 143]

(XIII)
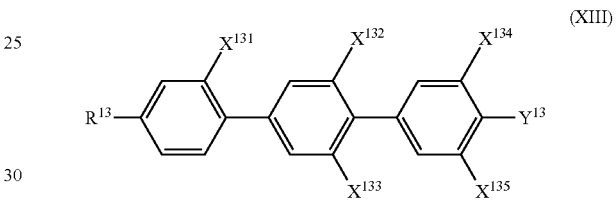

(In the formula, $X^{131}$ to $X^{135}$ each independently represent a fluorine atom or a hydrogen atom, $R^{13}$ represents an alkyl group having 1 to 5 carbon atoms, an alkenyl group having 2 to 5 carbon atoms, or an alkoxy group having 1 to 4 carbon atoms, and $Y^{13}$ represents a fluorine atom or —$OCF_3$. However, compounds represented by general formula (i) are excluded.)

The number of compounds that can be used in combination is not particularly limited. Of these compounds, preferably one or two, more preferably one to three, and most preferably one to four compounds are preferably contained.

The content of the compound represented by general formula (XIII) has an upper limit and a lower limit preferable for respective embodiments considering low-temperature solubility, transition temperature, electrical reliability, birefringence, etc.

For example, the content of the aforementioned compound relative to the total mass of the liquid crystal composition of the present invention is 2 to 30% by mass in one embodiment of the present invention, 4 to 30% by mass in another embodiment, 5 to 30% by mass in another embodiment, 7 to 30% by mass in another embodiment, 9 to 30% by mass in another embodiment, 11 to 30% by mass in another embodiment, 13 to 30% by mass in another embodiment, 14 to 30% by mass in another embodiment, 16 to 30% by mass in another embodiment, and 20 to 30% by mass in another embodiment.

The content of the aforementioned compound relative to the total mass is, for example 2 to 30% by mass in one embodiment of the present invention, 2 to 25% by mass in another embodiment, 2 to 20% by mass in another embodiment, 2 to 15% by mass in another embodiment, 2 to 10% by mass in another embodiment, and 2 to 5% by mass in another embodiment.

If the liquid crystal composition of the present invention is to be used in a liquid crystal display element having a small cell gap, the content of the compound represented by general formula (XIII) is preferably relatively large. If it is to be used in a liquid crystal display element with a low operation voltage, the content of the compound represented by general formula (XIII) is preferably relative large. If it is to be used in a liquid crystal display element for use in low-temperature environments, the content of the compound represented by general formula (XIII) is preferably relatively small. If the liquid crystal composition is to be used a liquid crystal display element having a high response speed, the content of the compound represented by general formula (XIII) is preferably relatively small.

The compound represented by general formula (XIII) is preferably a compound represented by general formula (XIII-1).

[Chem. 144]

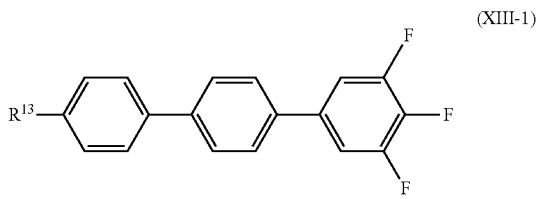

(XIII-1)

(In the formula, R$^{13}$ represents an alkyl group having 1 to 5 carbon atoms, an alkenyl group having 2 to 5 carbon atoms, or an alkoxy group having 1 to 4 carbon atoms.)

The content of the compound represented by general formula (XIII-1) relative to the total mass of the liquid crystal composition of the present invention is preferably 1 to 25% by mass, more preferably 3 to 25% by mass, yet more preferably 5 to 20% by mass, and most preferably 10 to 15% by mass.

The compound represented by general formula (XIII-1) is preferably any compounds represented by formula (48.1) to formula (48.4) and is preferably a compound represented by formula (48.2).

[Chem. 145]

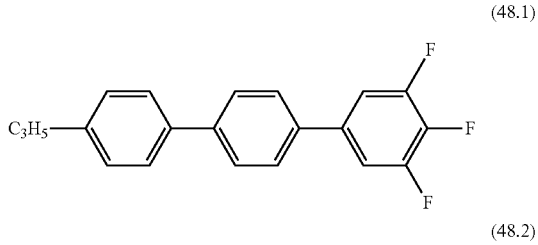

(48.1)

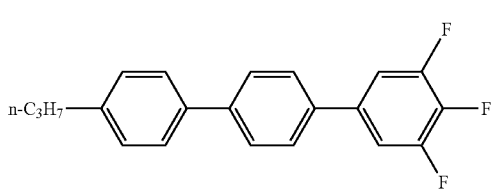

(48.2)

-continued

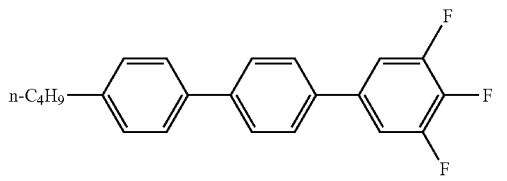

(48.3)

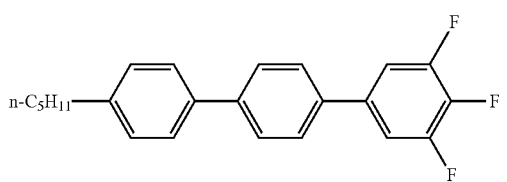

(48.4)

The compound represented by general formula (XIII) is preferably a compound represented by general formula (XIII-2).

[Chem. 146]

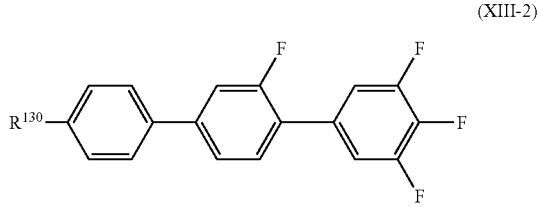

(XIII-2)

(In the formula, R$^{130}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited and, of these compounds, one or more compounds are preferably contained.

The content of the compound represented by general formula (XIII-2) relative to the total mass of the liquid crystal composition of the present invention is preferably 5 to 25% by mass, more preferably 6 to 25% by mass, yet more preferably 8 to 20% by mass, and most preferably 10 to 15% by mass.

The compound represented by general formula (XIII-2) is preferably any of compounds represented by formula (49.1) to formula (49.4) and preferably a compound represented by formula (49.1) and/or formula (49.2).

[Chem. 147]

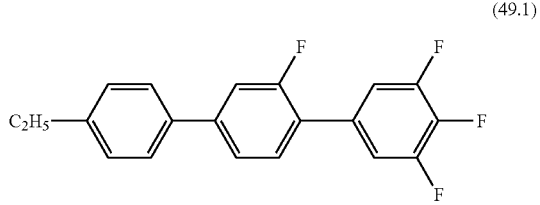

(49.1)

-continued (49.2)
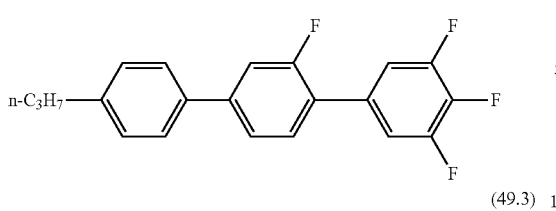

(49.3)
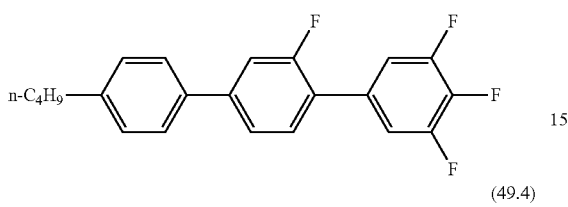

(49.4)
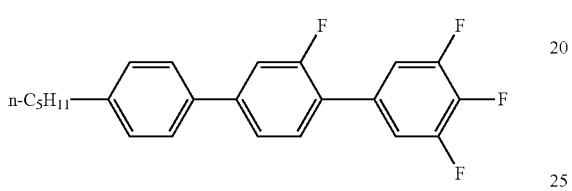

In the liquid crystal composition of the present invention, the content of the compound represented by formula (49.1) relative to the total mass of the liquid crystal composition of the present invention is preferably 1 to 20% by mass, more preferably 2 to 10% by mass, and most preferably 3 to 8% by mass considering low-temperature solubility, transition temperature, electrical reliability, etc.

In the liquid crystal composition of the present invention, the content of the compound represented by formula (49.2) relative to the total mass of the liquid crystal composition of the present invention is preferably 1 to 20% by mass, more preferably 2 to 10% by mass, and most preferably 3 to 8% by mass considering low-temperature solubility, transition temperature, electrical reliability, etc.

The compound represented by general formula (XIII) is preferably a compound represented by general formula (XIII-3).

[Chem. 148]

(XIII-3)
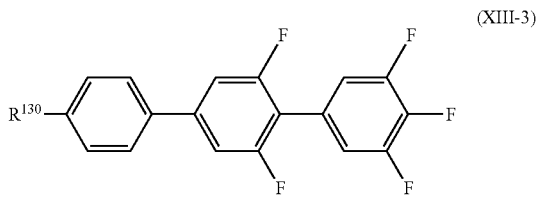

(In the formula, $R^{130}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited and, of these compounds, one or two compounds are preferably contained.

The content of the compound represented by general formula (XIII-3) relative to the total mass of the liquid crystal composition of the present invention is preferably 2 to 20% by mass, more preferably 4 to 20% by mass, yet more preferably 9 to 17% by mass, and most preferably 11 to 14% by mass.

The compound represented by general formula (XIII-3) is preferably any of compounds represented by formula (50.1) to formula (50.4) and more preferably a compound represented by formula (50.1) or formula (50.2).

[Chem. 149]

(50.1)
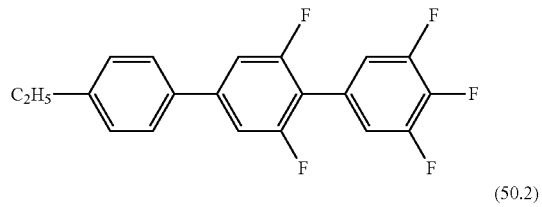

(50.2)
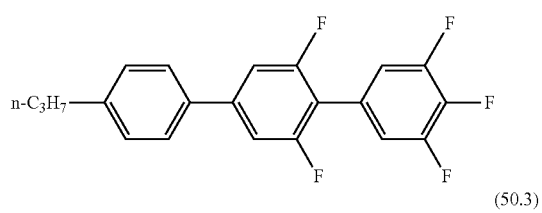

(50.3)
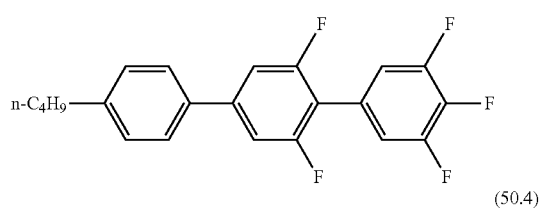

(50.4)
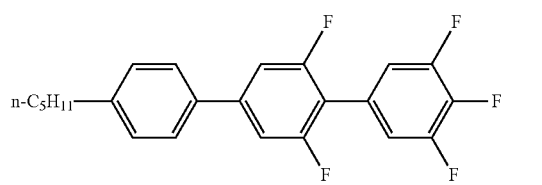

The compound represented by general formula (M) is preferably a compound selected from the group of compounds represented by general formula (XIV).

[Chem. 150]

(XIV)
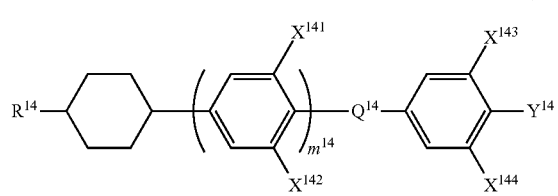

(In the formula, $R^{14}$ represents an alkyl group having 1 to 5 carbon atoms, an alkenyl group having 2 to 5 carbon atoms, or an alkoxy group having 1 to 4 carbon atoms, $X^{141}$ to $X^{144}$ each independently represent a fluorine atom or a hydrogen atom, $Y^{14}$ represents a fluorine atom, a chlorine atom, or —$OCF_3$, $Q^{14}$ represents a single bond, —COO—, or —$CF_2O$—, and $m^{14}$ represents 0 or 1.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention.

The content of the compound represented by general formula (XIV) has an upper limit and a lower limit preferable for respective embodiments considering low-temperature solubility, transition temperature, electrical reliability, birefringence, etc.

For example, the content of the aforementioned compound relative to the total mass of the liquid crystal composition of the present invention is, 3 to 40% by mass in one embodiment of the present invention 7 to 40% by mass in another embodiment, 8 to 40% by mass in another embodiment, 11 to 40% by mass in another embodiment, 12 to 40% by mass in another embodiment, 16 to 40% by mass in another embodiment, 18 to 40% by mass in another embodiment, 19 to 40% by mass in another embodiment, 22 to 40% by mass in another embodiment, and 25 to 40% by mass in another embodiment.

The content of the aforementioned compound relative to the total mass is, for example, 3 to 40% by mass in one embodiment of the present invention, 3 to 35% by mass in another embodiment, 3 to 30% by mass in another embodiment, 3 to 25% by mass in another embodiment, 3 to 20% by mass in another embodiment, and 3 to 15% by mass in another embodiment.

If the liquid crystal composition of the present invention is to be used in a liquid crystal display element having a low driving voltage, the content of the compound represented by general formula (XIV) is preferably relatively large. If the liquid crystal composition is to be used in a liquid crystal display element having high response speed, the content of the compound represented by general formula (XIV) is preferably relatively small.

The compound represented by general formula (XIV) is preferably a compound represented by general formula (XIV-1).

[Chem. 151]

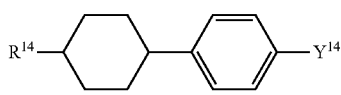

(XIV-1)

(In the formula, $R^{14}$ represents an alkyl group having 1 to 7 carbon atoms, an alkenyl group having 2 to 7 carbon atoms, or an alkoxy group having 1 to 7 carbon atoms, and $Y^{14}$ represents a fluorine atom, a chlorine atom, or —$OCF_3$.)

The number of compounds that can be used in combination is not particularly limited and one to three compounds are preferably used in combination considering low-temperature solubility, transition temperature, electrical reliability, birefringence, etc.

The compound represented by general formula (XIV-1) is preferably a compound represented by general formula (XIV-1-1).

[Chem. 152]

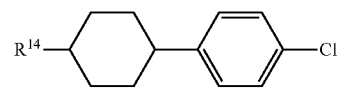

(XIV-1-1)

(In the formula, $R^{14}$ represents an alkyl group having 1 to 7 carbon atoms, an alkenyl group having 2 to 7 carbon atoms, or an alkoxy group having 1 to 7 carbon atoms.)

The content of the compound represented by general formula (XIV-1) relative to the total mass of the liquid crystal composition of the present invention is preferably 2% by mass or more, more preferably 4% by mass or more, yet more preferably 7% by mass or more, more preferably 10% by mass or more, and most preferably 18% by mass or more. Considering low-temperature solubility, transition temperature, electrical reliability, etc., the maximum content is preferably 30% by mass or less, more preferably 27% by mass or less, yet more preferably 24% by mass or less, and most preferably less than 21% by mass.

The compound represented by general formula (XIV-1-1) is specifically preferably any of compounds represented by formula (51.1) to formula (51.4) and more preferably a compound represented by formula (51.1).

[Chem. 153]

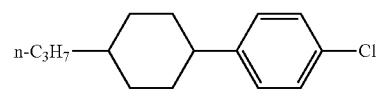

(51.1)

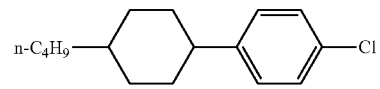

(51.2)

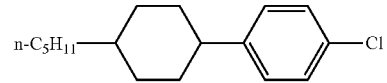

(51.3)

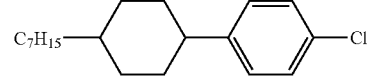

(51.4)

The compound represented by general formula (XIV) is a compound represented by general formula (XIV-1-2).

[Chem. 154]

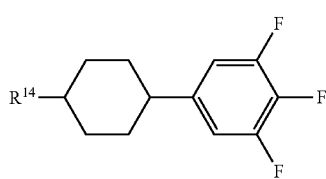

(XIV-1-2)

(In the formula, $R^{14}$ represents an alkyl group having 1 to 7 carbon atoms, an alkenyl group having 2 to 7 carbon atoms, or an alkoxy group having 1 to 7 carbon atoms.)

The content of the compound represented by general formula (XIV-1-2) relative to the total mass of the liquid crystal composition of the present invention is preferably 1% by mass or more and 15% by mass or less, more preferably 3% by mass or more and 13% by mass or less, yet more preferably 5% by mass or more and 11% by mass or less, and most preferably 7% by mass or more and 9% by mass or less considering low-temperature solubility, transition temperature, electrical reliability, etc.

The compound represented by general formula (XIV-1-2) is specifically preferably any of compounds represented by formula (52.1) to formula (52.4) and, of these, a compound represented by formula (52.4) is preferably contained.

[Chem. 155]

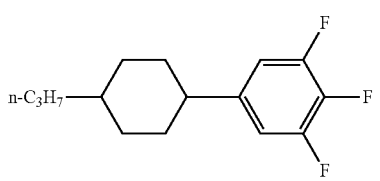
(52.1)

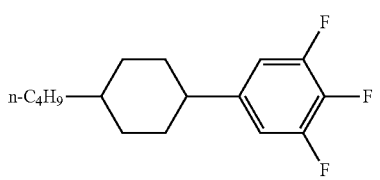
(52.2)

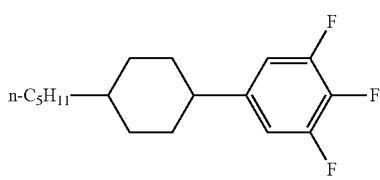
(52.3)

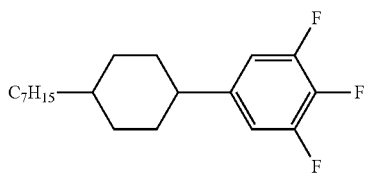
(52.4)

The compound represented by general formula (XIV) is preferably a compound represented by general formula (XIV-2).

[Chem. 156]

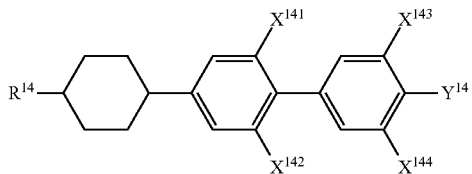
(XIV-2)

(In the formula, $R^{14}$ represents an alkyl group having 1 to 5 carbon atoms, an alkenyl group having 2 to 5 carbon atoms, or an alkoxy group having 1 to 4 carbon atoms, $X^{141}$ to $X^{144}$ each independently represent a fluorine atom or a hydrogen atom, and $Y^{14}$ represents a fluorine atom, a chlorine atom, or —$OCF_3$. However, compounds represented by general formula (i) are excluded.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, and five or more in another embodiment of the present invention.

The content of the compound represented by general formula (XIV-2) has an upper limit and a lower limit preferable for respective embodiments considering low-temperature solubility, transition temperature, electrical reliability, birefringence, etc.

For example, the content of the aforementioned compound relative to the total mass of the liquid crystal composition of the present invention is 3 to 40% by mass in one embodiment of the present invention, 7 to 40% by mass in another embodiment, 8 to 40% by mass in another embodiment, 10 to 40% by mass in another embodiment, 11 to 40% by mass in another embodiment, 12 to 40% by mass in another embodiment, 18 to 40% by mass in another embodiment, 19 to 40% by mass in another embodiment, 21 to 40% by mass in another embodiment, and 22 to 40% by mass in another embodiment.

The content of the aforementioned compound relative to the total mass is, for example, 3 to 40% by mass according to one embodiment of the present invention, 3 to 35% by mass in another embodiment, 3 to 25% by mass in another embodiment, 3 to 20% by mass in another embodiment, 3 to 15% by mass in another embodiment, and 3 to 10% by mass in another embodiment.

If the liquid crystal composition of the present invention is to be used in a liquid crystal display element with a low operation voltage, the content of the compound represented by general formula (XIV-2) is preferably relatively large. If the liquid crystal composition is to be used in a liquid crystal display element having high response speed, the content of the compound represented by general formula (XIV-2) is preferably relatively small.

The compound represented by general formula (XIV-2) is preferably a compound represented by general formula (XIV-2-1).

[Chem. 157]

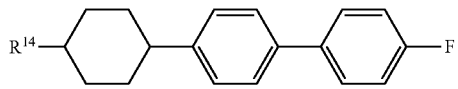
(XIV-2-1)

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-1) relative to the total mass of the liquid crystal composition of the present invention is preferably 1% by mass or more and 15% by mass or less, more preferably 3% by mass or more and 13% by mass or less, yet more preferably 5% by mass or more and 11% by mass or less, and most preferably 7% by mass or more and 9% by mass or less considering low-temperature solubility, transition temperature, electrical reliability, etc.

The compound represented by general formula (XIV-2-1) is preferably any of compounds represented by formula (53.1) to formula (53.4) and, of these, a compound represented by formula (53.4) is preferably contained.

[Chem. 158]

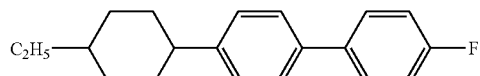
(53.1)

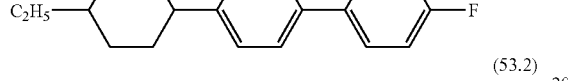
(53.2)

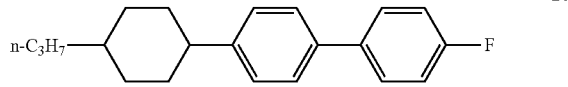
(53.3)

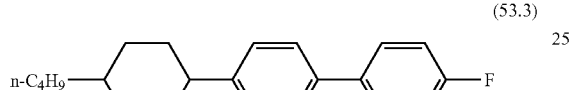
(53.4)

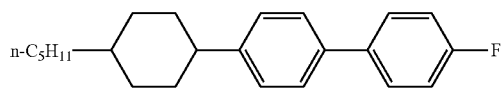

The compound represented by general formula (XIV-2) is preferably a compound represented by general formula (XIV-2-2).

[Chem. 159]

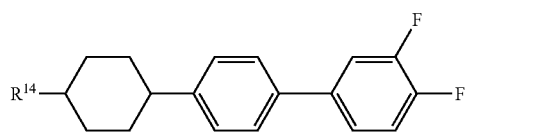
(XIV-2-2)

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-2) relative to the total mass of the liquid crystal composition of the present invention is preferably 3% by mass or more and 20% by mass or less, more preferably 6% by mass or more and 17% by mass or less, yet more preferably 9% by mass or more and 15% by mass or less, and most preferably 12% by mass or more and 14% by mass or less considering low-temperature solubility, transition temperature, electrical reliability, etc.

The compound represented by general formula (XIV-2-2) is specifically preferably any of compounds represented by formula (54.1) to formula (54.4) and, of these, a compound represented by formula (54.2) and/or formula (54.4) is preferably contained.

[Chem. 160]

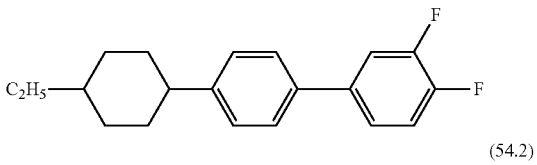
(54.1)

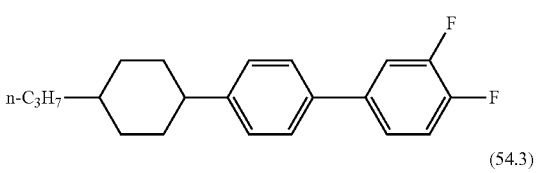
(54.2)

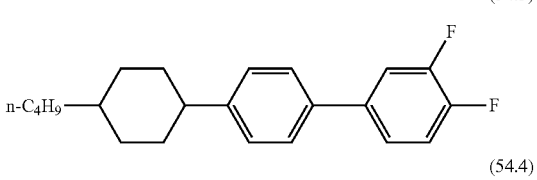
(54.3)

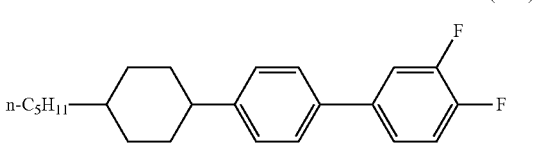
(54.4)

The compound represented by general formula (XIV-2) is preferably a compound represented by general formula (XIV-2-3).

[Chem. 161]

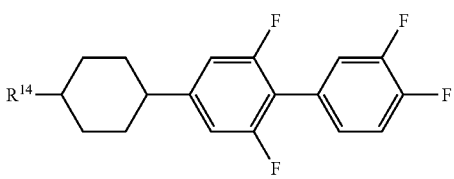
(XIV-2-3)

(In the formula, $R^{14}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-3) relative to the total mass of the liquid crystal composition of the present invention is preferably 5% by mass or more and 30% by mass or less, more preferably 9% by mass or more and 27% by mass or less, yet more preferably 12% by mass or more and 24% by mass or less, and most preferably 12% by mass or more and 20% by mass or less considering low-temperature solubility, transition temperature, electrical reliability, etc.

The compound represented by general formula (XIV-2-3) is preferably any of compounds represented by formula (55.1) to formula (55.4) and, of these, a compound represented by formula (55.2) and/or formula (55.4) is preferably contained.

[Chem. 162]

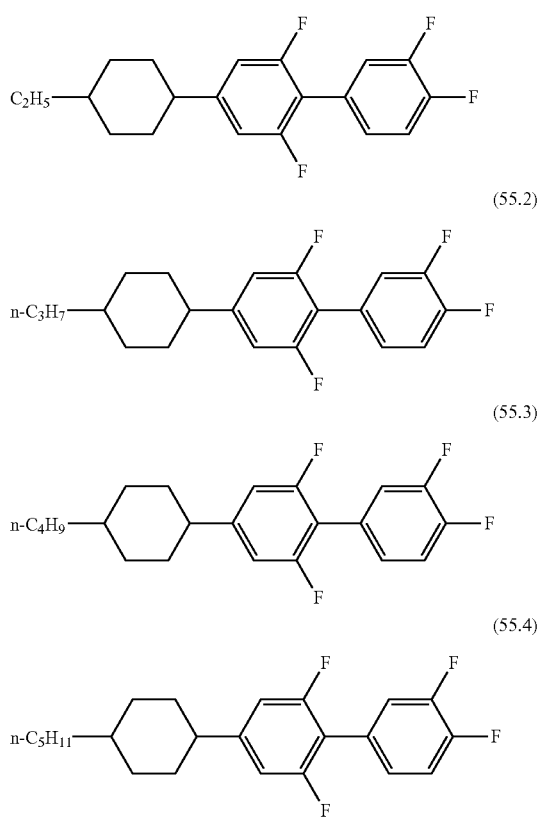

The compound represented by general formula (XIV-2) is preferably a compound represented by general formula (XIV-2-4).

[Chem. 163]

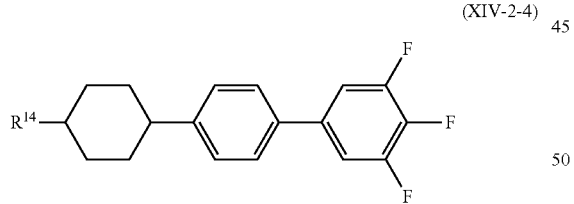

(In the formula, R$^{14}$ represents an alkyl group having 1 to 5 carbon atoms, an alkenyl group having 2 to 5 carbon atoms, or an alkoxy group having 1 to 4 carbon atoms.)

The number of compounds that can be used in combination is not particularly limited. An appropriate combination of compounds is used for each embodiment in accordance with desired performance, such as low-temperature solubility, transition temperature, electrical reliability, and birefringence. The number of compounds used is, for example, one in one embodiment of the present invention, two in another embodiment of the present invention, and three or more in another embodiment of the present invention.

The content of the compound represented by general formula (XIV-2-4) has an upper limit and a lower limit preferable for respective embodiments considering low-temperature solubility, transition temperature, electrical reliability, birefringence, etc.

For example, the content of the aforementioned compound relative to the total mass of the liquid crystal composition of the present invention is 2 to 35% by mass in one embodiment of the present invention, 5 to 35% by mass in another embodiment, 8 to 35% by mass in another embodiment, 9 to 35% by mass in another embodiment, 10 to 35% by mass in another embodiment, 18 to 35% by mass in another embodiment, 21 to 35% by mass in another embodiment, 22 to 35% by mass in another embodiment, and 24 to 35% by mass in another embodiment.

For example, the content of the aforementioned compound relative to the total mass is 2 to 35% by mass in one embodiment of the present invention, 2 to 30% by mass in another embodiment, 2 to 25% by mass in another embodiment, 2 to 20% by mass in another embodiment, 2 to 15% by mass in another embodiment, and 2 to 10% by mass in another embodiment.

If the liquid crystal composition of the present invention is to be used in a liquid crystal display element with a low operating voltage, the content of the compound represented by general formula (XIV-2-4) is preferably relatively large. If the liquid crystal composition is to be used in a liquid crystal display element having high response speed, the content of the compound represented by general formula (XIV-2-4) is preferably relatively small.

The compound represented by general formula (XIV-2-4) is specifically preferably any of compounds represented by formula (56.1) to formula (56.4) and, of these, a compound represented by formula (56.1), formula (56.2), or formula (56.4) is preferably contained.

[Chem. 164]

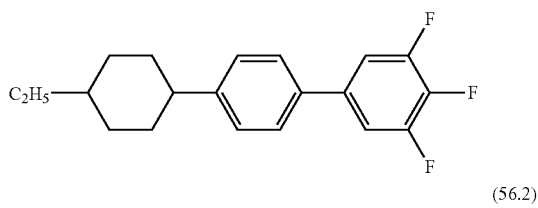

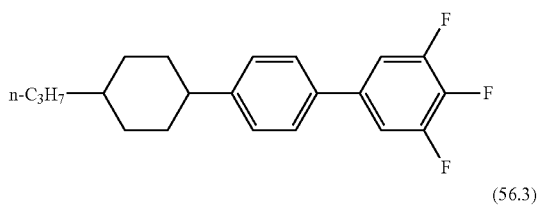

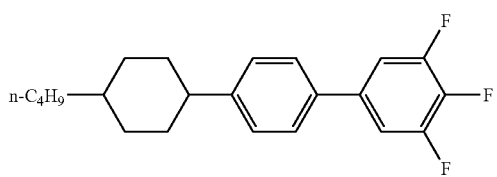

(56.4)

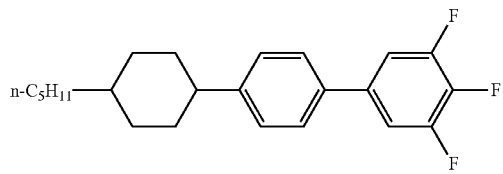

The compound represented by general formula (XIV-2) is preferably a compound represented by general formula (XIV-2-5).

[Chem. 165]

(XIV-2-5)

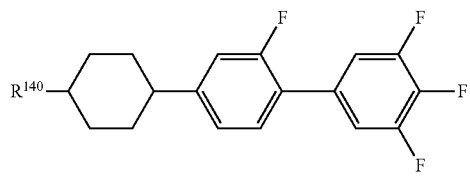

(In the formula, $R^{140}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-5) relative to the total mass of the liquid crystal composition of the present invention is preferably 5% by mass or more and 25% by mass or less, more preferably 10% by mass or more and 22% by mass or less, yet more preferably 13% by mass or more and 18% by mass or less, and most preferably 13% by mass or more and 15% by mass or less considering low-temperature solubility, transition temperature, electrical reliability, etc.

The compound represented by general formula (XIV-2-5) is specifically preferably compounds represented by formula (57.1) to formula (57.4) and, of these, a compound represented by formula (57.1) is preferably contained.

[Chem. 166]

(57.1)

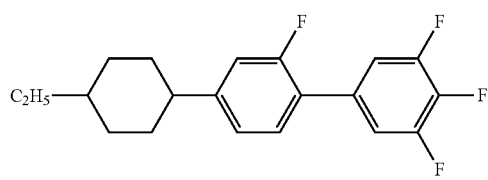

(57.2)

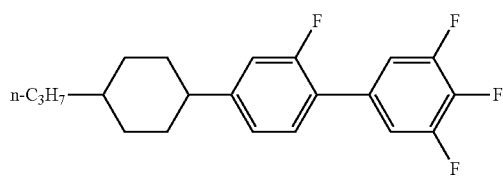

(57.3)

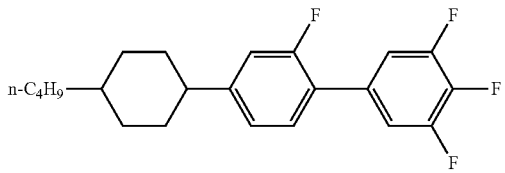

(57.4)

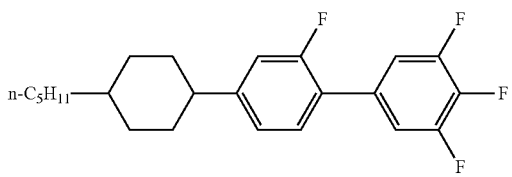

The compound represented by general formula (XIV-2) is preferably a compound represented by general formula (XIV-2-6).

[Chem. 167]

(XIV-2-6)

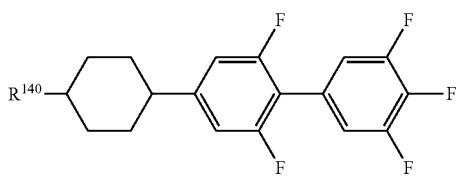

(In the formula, $R^{140}$ represents an alkyl group having 1 to 5 carbon atoms, an alkenyl group having 2 to 5 carbon atoms, or an alkoxy group having 1 to 4 carbon atoms.)

The content of the compound represented by general formula (XIV-2-6) relative to the total mass of the liquid crystal composition of the present invention is preferably 5% by mass or more and 25% by mass or less, more preferably 10% by mass or more and 22% by mass or less, yet more preferably 15% by mass or more and 20% by mass or less, and most preferably 15% by mass or more and 17% by mass or less considering low-temperature solubility, transition temperature, electrical reliability, etc.

The compound represented by general formula (XIV-2-6) is specifically preferably any of compounds represented by formula (58.1) to formula (58.4) and, of these, a compound represented by formula (58.2) is preferably contained.

[Chem. 168]

(58.1)

-continued (58.2)
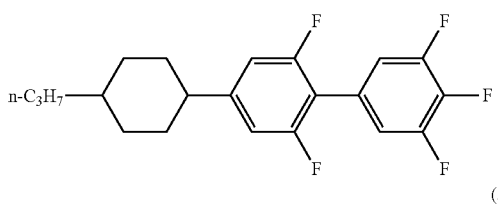

(58.3)
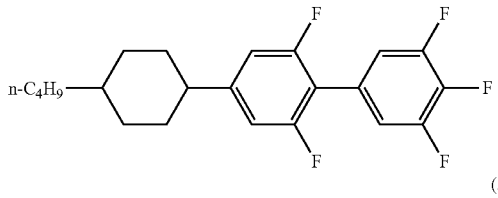

(58.4)
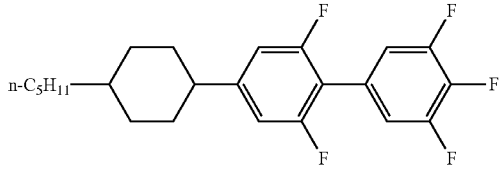

The liquid crystal composition of the invention of the subject application is preferably free of a compound intramolecularly having a structure, such as a peroxide structure (—CO—OO—), in which oxygen atoms are bonded to each other.

In the case where reliability and long-term stability of the liquid crystal composition are important, the content of the compound having a carbonyl group relative to the total mass of the composition is preferably 5% by mass or less, more preferably 3% by mass or less, yet more preferably 1% by mass or less, and most preferably substantially zero.

In the case where stability under UV irradiation is important, the content of chlorine-substituted compounds relative to the total mass of the composition is preferably 15% by mass or less, more preferably 10% by mass or less, yet more preferably 5% by mass or less, and most preferably substantially zero.

The content of the compounds in which all ring structures in the molecule are six-membered rings is preferably large. The content of the compounds in which all ring structures in the molecule are six-membered rings relative to the total mass of the composition is preferably 80% by mass or more, more preferably 90% by mass or more, and yet more preferably 95% by mass or more, and most preferably the liquid crystal composition is substantially solely composed of compounds in which all ring structures in the molecule are six-membered rings.

In order to suppress deterioration of the liquid crystal composition due to oxidation, the content of the compounds having a cyclohexenylene group as a ring structure is preferably decreased. The content of the compound having a cyclohexenylene group relative to the total mass of the composition is preferably 10% by mass or less, more preferably 5% by mass or less, and most preferably substantially zero.

In the case where improving viscosity and Tni is important, the content of the compounds intramolecularly having a 2-methylbenzene-1,4-diyl group which may have a hydrogen atom substituted with a halogen is preferably decreased. The content of the compounds intramolecularly having a 2-methylbenzene-1,4-diyl group relative to the total mass of the composition is preferably 10% by mass or less, more preferably 5% by mass or less, and most preferably substantially zero.

In the case where the compounds contained in the composition of the first embodiment of the present invention has an alkenyl group as a side chain, the number of carbon atoms of the alkenyl group is preferably 2 to 5 when the alkenyl group is bonded to cyclohexane and is preferably 4 or 5 when the alkenyl group is bonded to benzene where an unsaturated bond of the alkenyl group is preferably not directly bonded to benzene.

The liquid crystal composition of the present invention may contain a polymerizable compound in order to fabricate a liquid crystal display element of a PS mode, a horizontal electric field-type PSA mode, or a horizontal electric field-type PSVA mode, for example. Examples of the polymerizable compound that can be used include photopolymerizable monomers whose polymerization proceeds by irradiation with an energy ray such as light and polymerizable compounds having liquid crystal skeletons in which plural six-membered rings are linked with one another, such as biphenyl derivatives and terphenyl derivatives, can be named as the examples thereof. To be more specific, preferable are difunctional monomers represented by general formula (XX):

[Chem. 169]

(XX)
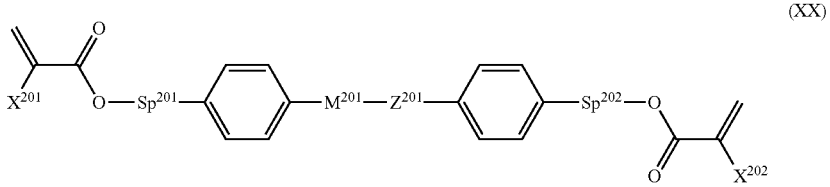

(In the formula, $X^{201}$ and $X^{202}$ each independently represent a hydrogen atom or a methyl group.

$Sp^{201}$ and $Sp^{202}$ each independently represent a single bond, an alkylene group having 1 to 8 carbon atoms, or —O—$(CH_2)_s$— (In the formula, s represents an integer of 2 to 7 and the oxygen atom is to bond with the aromatic ring), $Z^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—OCO—, —CH$_2$CH$_2$—OCO—, —COO—CH$_2$—, —OCO—CH$_2$—, —CH$_2$—OCO—, —CH$_2$—OCO—, —CY$^1$=CY$^2$— (In the formula, Y$^1$ and Y$^2$ each independently represent a fluorine atom or a hydrogen atom), —C≡C—, or a single bond, M$^{201}$ represents a 1,4-phenylene group, a trans-1,4-cyclohexylene group, or a single bond, where all 1,4-phenylene groups in the formula may have any hydrogen atom substituted with a fluorine atom.).

A diacrylate derivative with X$^{201}$ and X$^{202}$ each representing a hydrogen atom and a dimethacrylate derivative with X$^{201}$ and X$^{202}$ each representing a methyl group are both preferable, and a compound with one of X$^{201}$ and X$^{202}$ representing a hydrogen atom and the other a methyl group is also preferable. As for the polymerization speed of these compounds, the diacrylate derivative is the fastest, the dimethacrylate derivative is the slowest, and the asymmetric compound is in the middle; a preferable form is used depending on the usage. A dimethacrylate derivative is particularly preferable for PSA display elements.

Sp$^{201}$ and Sp$^{202}$ each independently represent a single bond, an alkylene group having 1 to 8 carbon atoms, or —O—(CH$_2$)$_s$—. For a PSA display element, at least one of them preferably represents a single bond and a compound in which Sp$^{201}$ and Sp$^{202}$ each represent a single bond or a compound in which one of them represents a single bond and the other an alkylene group having 1 to 8 carbon atoms or —O—(CH$_2$)$_s$— are preferable. In such a case, an alkyl group having 1 to 4 is preferable and s preferably represents 1 to 4.

Z$^{201}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and most preferably represents a single bond.

M$^{201}$ represents a 1,4-phenylene group which may have any hydrogen atom substituted with a fluorine atom, a trans-1,4-cyclohexylene group, or a single bond and preferably represents a 1,4-phenylene group or a single bond. In the case where M$^{201}$ represents a ring structure and not a single bond, Z$^{201}$ preferably represents a bonding group and not a single bond. In the case where M$^{201}$ represents a single bond, Z$^{201}$ preferably represents a single bond.

From those points, the ring structure between Sp$^{201}$ and Sp$^{202}$ in general formula (XX) is specifically preferably any of structures described below:

In the case where M$^{201}$ in general formula (XX) represents a single bond and the ring structure is formed by two rings, the structures represented by formula (XXa-1) to formula (XXa-5) below are preferable, those represented by formula (XXa-1) to formula (XXa-3) are more preferable, and a structure represented by formula (XXa-1) is most preferable.

[Chem. 170]

(XXa-1)

(XXa-2)

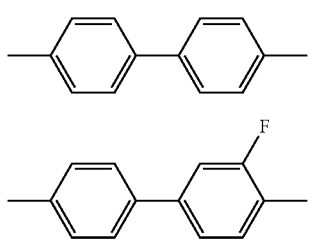

(XXa-3)

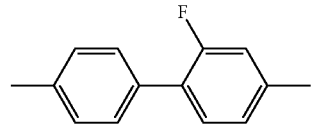

(XXa-4)

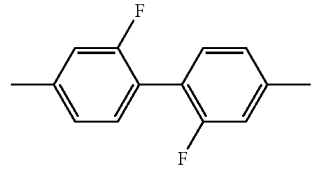

(XXa-5)

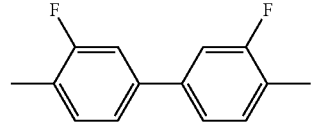

(In the formula, each end is to bond with Sp$^{201}$ or Sp$^{202}$.)

The polymerizable compounds containing these skeletons have anchoring energy optimum for PSA-mode liquid crystal display elements once they are polymerized and a satisfactory alignment state is obtained; thus, display nonuniformity is suppressed or prevented.

Due to these factors, structures represented by general formula (XX-1) to general formula (XX-4) are particularly preferable and one represented by general formula (XX-2) is most preferable as the polymerizable monomer.

[Chem. 171]

(XX-1)

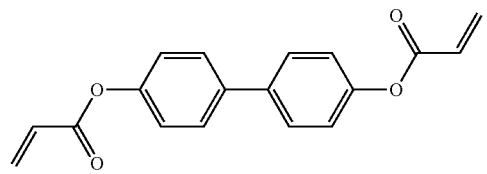

(XX-2)

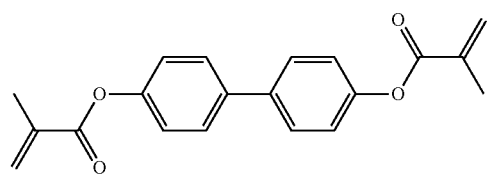

(XX-3)

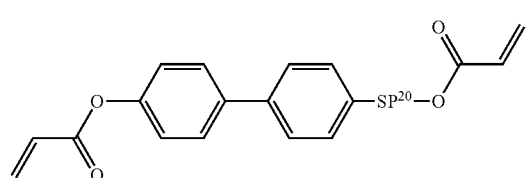

(XX-4)

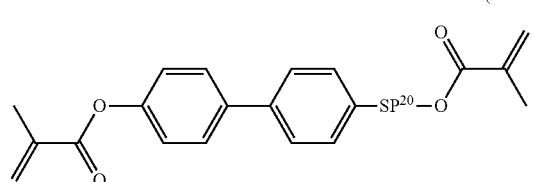

(In the formula, Sp$^{20}$ represents an alkylene group having 2 to 5 carbon atoms.)

In the case where a monomer is to be added to the liquid crystal composition of the present invention, polymerization proceeds in the absence of a polymerization initiator; however, a polymerization initiator may be added to accelerate polymerization. Examples of the polymerization initiator include benzoin ethers, benzophenones, acetophenones, benzyl ketals, and acylphosphine oxides.

The liquid crystal composition of the present invention may further contain a compound represented by general formula (Q).

[Chem. 172]

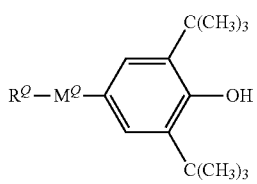

(Q)

(In the formula, $R^Q$ represents a linear or branched alkyl group having 1 to 22 carbon atoms, where one or more $CH_2$ groups in the alkyl group may be substituted with —O—, —CH=CH—, —CO—, —OCO—, —COO—, —C≡C—, —$CF_2$O—, or —O$CF_2$— so long as oxygen atoms are not directly adjacent to each other, and $M^Q$ represents a trans-1,4-cyclohexylene group, a 1,4-phenylene group, or a single bond.)

$R^Q$ represents a linear or branched alkyl group having 1 to 22 carbon atoms where one or more $CH_2$ groups in the alkyl group may be substituted with —O—, —CH=CH—, —CO—, —OCO—, —COO—, —C≡C—, —$CF_2$O—, or —O$CF_2$— so long as oxygen atoms are not directly adjacent to each other. $R^Q$ preferably represents a linear alkyl group, a linear alkoxy group, a linear alkyl group having one $CH_2$ group substituted with —OCO— or —COO—, a branched alkyl group, a branched alkoxy group, or a branched alkyl group having one $CH_2$ group substituted with —OCO— or —COO—, each group having 1 to 10 carbon atoms. $R^Q$ more preferably represents a linear alkyl group, a linear alkyl group having one $CH_2$ group substituted with —OCO— or —COO—, a branched alkyl group, a branched alkoxy group, or a branched alkyl group having one $CH_2$ group substituted with —OCO— or —COO—, each group having 1 to 20 carbon atoms. $M^Q$ represents a trans-1,4-cyclohexylene group, a 1,4-phenylene group, or a single bond and preferably represents a trans-1,4-cyclohexylene group or a 1,4-phenylene group.

The compound represented by general formula (Q) is specifically preferably any of compounds represented by general formula (Q-a) to general formula (Q-d) below:

[Chem. 173]

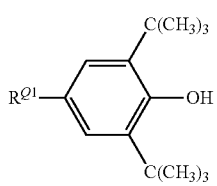

(Q-a)

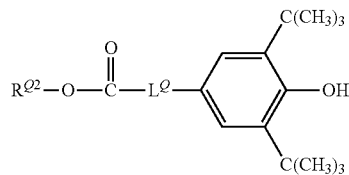

(Q-b)

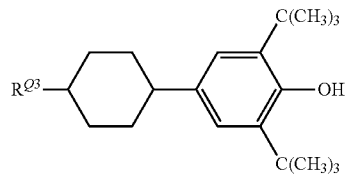

(Q-c)

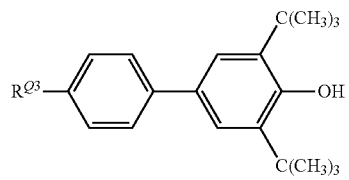

(Q-d)

In the formulae, $R^{Q1}$ preferably represents a linear or branched alkyl group having 1 to 10 carbon atoms, $R^{Q2}$ preferably represents a linear or branched alkyl group having 1 to 20 carbon atoms, $R^{Q3}$ preferably represents a linear or branched alkyl group or linear or branched alkoxy group having 1 to 8 carbon atoms, and $L^Q$ preferably represents a linear or branched alkylene group having 1 to 8 carbon atoms. Among the compounds represented by general formula (Q-a) to general formula (Q-d), the compounds represented by general formula (Q-c) and general formula (Q-d) are more preferable.

The liquid crystal composition of the invention of the subject application preferably contains one or two compounds represented by general formula (Q) and more preferably contains one to five compounds represented by general formula (Q). The content thereof is preferably 0.001 to 1% by mass, more preferably 0.001 to 0.1% by mass, and most preferably 0.001 to 0.05% by mass.

<Liquid Crystal Display Element>

The liquid crystal composition of the present invention containing polymerizable compounds gains a liquid crystal aligning ability when the polymerizable compounds are polymerized by ultraviolet irradiation and is used in a liquid crystal display element in which the amount of transmitted light is controlled by utilizing birefringence of the liquid crystal composition. The liquid crystal composition is useful in AM-LCD (active matrix liquid crystal display element), TN (nematic liquid crystal display element), STN-LCD (super twisted nematic liquid crystal display element), OCB-LCD, and IPS-LCD (in-plane switching liquid crystal display element), and is particularly useful in AM-LCD. The liquid crystal composition can be used in transmissive or reflective liquid crystal display elements.

The two substrates of a liquid crystal cell used in a liquid crystal display element can be composed of a flexible transparent material such as glass or plastic and one of them can be composed of an opaque material such as silicon. A transparent substrate having a transparent electrode layer can be obtained by, for example, sputter-depositing indium tin oxide (ITO) on a transparent substrate such as a glass plate.

A color filter can be manufactured by, for example, a pigment dispersion method, a printing method, an electrodeposition method, or a dyeing method. Preparation of a color filter by a pigment dispersion method is described here as an example. A curable color composition for a color filter is applied to the transparent substrate, patterning is performed, and the composition is cured by heating or irradiation with light. This process is performed for each of three colors, red, green and blue, and pixel portions of a color filter are formed as a result. Pixel electrodes including active elements such as TFTs and thin film diodes may be installed on the substrate.

The substrates are arranged to oppose each other with the transparent electrode layer facing inward. During this process, the gap between the substrates may be adjusted by using spacers. In such a case, the gap is preferably adjusted so that the thickness of a light adjusting layer to be obtained is 1 to 100 μm and more preferably 1.5 to 10 μm. In the case where a polarizer is used, the product of the cell thickness d and the refractive index anisotropy Δn of the liquid crystal is preferably adjusted to maximize contrast. In the case where two polarizers are used, the polarization axis of each polarizer can be adjusted to improve viewing angle and contrast. A retardation film for expanding the viewing angle can also be used. Examples of the spacers include glass particles, plastic particles, alumina particles, and columnar spacers composed of photoresist materials and the like. Then a sealing material such as an epoxy-based thermosetting composition is screen-printed onto the substrate while securing a liquid crystal injection port, the substrates are bonded to each other, and heating is performed to thermally cure the sealing material.

For example, a common vacuum injection method or ODF method can be used to place a polymerizable-compound-containing liquid crystal composition in a gap between the two substrates. However, the vacuum injection method has a problem in that, although drop marks do not occur, trace of injection remains. The invention of the subject application is more suitable for use in making a display element by an ODF method. In a liquid crystal display element manufacturing process by an ODF method, a sealing material such as an epoxy-based photothermal dual curing sealing material is applied to one of a backplane substrate or a frontplane substrate by using a dispenser so as to form a closed-loop bank, a particular amount of the liquid crystal composition is placed dropwise in the space defined by the bank while performing evacuation, and the frontplane and the backplane are bonded to each other to manufacture a liquid crystal display element. The liquid crystal composition of the present invention is favorable since dropping of the liquid crystal composition during the ODF step can be performed stably.

In order to satisfactorily align the liquid crystal, an appropriate polymerization speed is desirable. Thus, the method for polymerizing the polymerizable compounds is preferably involves irradiating the liquid crystal composition with an active energy ray such as an ultraviolet ray or an electron beam or with two or more active energy rays either simultaneously or sequentially. In the case where ultraviolet rays are used, a polarized light source may be used or unpolarized light source may be used. In the case where polymerization is performed while holding the polymerizable-compound-containing liquid crystal composition between the two substrates, at least the substrate on the incident side must have an appropriate degree of transparency for the active energy ray used. Moreover, after only a particular portion is polymerized by using a mask during irradiation, the alignment state of the unpolymerized portion may be changed by changing the conditions such as electric field, magnetic field, or temperature and then an active energy ray may be applied again to perform polymerization. In particular, when the liquid crystal composition is exposed with an UV ray, UV exposure is preferably performed while applying an AC electric field to the polymerizable-compound-containing liquid crystal composition. The AC electric field applied is preferably an AC having a frequency of 10 Hz to 10 kHz and more preferably an AC having a frequency of 60 Hz to 10 kHz, and the voltage is selected depending on the desired pretilt angle of the liquid crystal display element. In other words, the pretilt angle of the liquid crystal display element can be controlled by the applied voltage. For a horizontal electric field-type MVA-mode liquid crystal display element, the pretilt angle is preferably controlled to 80° to 89.9° from the viewpoints of alignment stability and contrast.

The temperature during irradiation is preferably within a temperature range in which the liquid crystal composition of the present invention retains a liquid crystal state. Polymerization is preferably conducted at a temperature near room temperature, that is, typically a temperature in a range of 15 to 35° C. The lamp that generates UV rays may be a metal halide lamp, a high-pressure mercury lamp, an ultra-high-pressure mercury lamp, or the like. The wavelength of the UV ray applied is preferably in the wavelength region outside the absorption wavelength region of the liquid crystal composition and, if needed, some portions of the UV rays may be cut. The intensity of the ultraviolet ray applied is preferably 0.1 mW/cm$^2$ to 100 W/cm$^2$ and more preferably 2 mW/cm$^2$ to 50 W/cm$^2$. The amount of energy of the ultraviolet ray applied can be appropriately adjusted but is preferably 10 mJ/cm$^2$ to 500 J/cm$^2$ and more preferably 100 mJ/cm$^2$ to 200 J/cm$^2$. The intensity may be varied during irradiation with UV rays. The amount of time for which the UV ray is applied is appropriately selected depending on the intensity of the UV ray applied but is preferably 10 to 3600 seconds and more preferably 10 to 600 seconds.

A liquid crystal display element that uses the liquid crystal composition of the present invention is useful since it exhibits high-speed response and suppresses display failures and is particularly useful in active matrix-driving liquid crystal display elements and liquid crystal display elements of VA mode, PSVA mode, PSA mode, IPS (in-plane-switching) mode, VA-IPS mode, FFS (fringe-field-switching) mode, and ECB mode.

Preferred embodiments of a liquid crystal display according to the present invention will now be described in detail with reference to the drawings.

FIG. 1 is a cross-sectional view of a liquid crystal display element that includes two substrates opposing each other, a sealing material disposed between the substrates, and a liquid crystal sealed inside the sealed region surrounded by the sealing material.

To be more specific, the drawing shows a specific embodiment of a liquid crystal display element that includes a backplane constituted by a TFT layer 102 and a pixel electrode 103 disposed on a first substrate 100 and a passivation film 104 and a first alignment film 105 disposed on the TFT layer 102 and the pixel electrode 103; a frontplane constituted by a black matrix 202, color filters 203, a planarizing film (overcoat layer) 201, and a transparent electrode 204 disposed on a second substrate 200, and a second alignment film 205 disposed on the transparent electrode 204, the frontplane opposing the backplane; a sealing material 301 disposed between the substrates; and a liquid crystal layer 303 sealed inside a sealed region surrounded by the sealing material. Projections (columnar spacers) 302 and 304 are disposed on the substrate surface in contact with the sealing material 301.

The first substrate and the second substrate may be composed of any material that is substantially transparent and glass, ceramics, plastics, etc., can be used. For a plastic substrate, cellulose, cellulose derivatives such as triacetyl cellulose and diacetyl cellulose, polycycloolefin derivatives, polyesters such as polyethylene terephthalate and polyethylene naphthalate, polyolefins such as polypropylene and polyethylene, polycarbonate, polyvinyl alcohols, polyvinyl chloride, polyvinylidene chloride, polyamide, polyimide, polyimide amide, polystyrene, polyacrylate, polymethyl methacrylate, polyether sulfone, polyarylate, and inorganic-organic composite materials such as glass fiber-epoxy resin and glass fiber-acryl resin can be used.

In the case where a plastic substrate is used, a barrier film is preferably provided. The function of the barrier film is to decrease the moisture permeability of the plastic substrate and improve reliability of the electric properties of the liquid crystal display element. The barrier film is not particularly limited as long as the film has high transparency and low water vapor permeability. Typically, a thin film formed by using an inorganic material such as silicon oxide through vapor deposition, sputtering, or chemical vapor deposition (CVD) is used.

In the present invention, the same material or different materials may be used in the first substrate and the second substrate. Glass substrates are preferable since a liquid crystal display element having good heat resistance and dimensional stability can be fabricated. Plastic substrates are also preferable since they are suitable for a roll-to-roll production method, light-weight, and flexible. If flatness and heat resistance are desirable, a plastic substrate and a glass substrate are preferably used in combination since preferable results can be yielded.

In Examples described below, substrates are used as the materials for the first substrate 100 and the second substrate 200.

In the backplane, the TFT layer 102 and the pixel electrode 103 are disposed on the first substrate 100. The TFT layer 102 and the pixel electrode 103 are produced in a typical array process. The passivation film 104 and the first alignment film 105 are formed thereon and a backplane is obtained as a result.

The passivation film 104 (also referred to as an inorganic protective film) is a film for protecting the TFT layer and is typically formed as a nitride film (SiNx), an oxide film (SiOx), or the like by chemical vapor deposition (CVD) technique.

The first alignment film 105 has a function of aligning the liquid crystal and a polymer material such as polyimide is typically frequently used. An alignment agent solution composed of a polymer material and a solvent is used as the coating solution. The alignment film has a possibility of inhibiting adhesive force to the sealing material and is thus patterned and applied in the sealed region. A printing method such as flexo printing or a droplet ejection method such as ink jet is employed for application. After the solvent has evaporated by precuring, the applied alignment agent solution is crosslinked and cured by baking. Subsequently, an aligning process is performed to yield an aligning function.

The aligning process is usually performed by a rubbing technique. The polymer film formed as mentioned above is rubbed in one direction with a rubbing cloth composed of fibers such as rayon so as to yield a liquid crystal aligning ability.

Alternatively, an optical alignment technique is sometimes employed. The optical alignment technique is a technique of generating the aligning property by irradiation of an alignment film containing a photosensitive organic material with polarized light. According to this technique, scratching of the substrate and generation of dust that occur in the rubbing technique do not occur. Examples of the organic material used in the optical alignment technique include materials that contain dichroic dyes. Examples of the dichroic dyes that can be used include those which have groups (hereinafter simply referred to as optical alignment groups) that induce an optical reaction from which the liquid crystal alignment property originates, such as induction of molecular alignment or isomerization reaction (ex. azobenzene group) caused by Weigert's effect caused by dichroism, dimerization reaction (ex. cinnamoyl group), optical cross-linking reaction (ex. benzophenone group), or optical decomposition reaction (ex. polyimide group). The applied aligning agent solution is precured to evaporate the solvent and then irradiated with light (polarized light) having a desired polarization so as to obtain an alignment film having an aligning property in the desired direction.

The frontplane is constituted by the black matrix 202, the color filter 203, the planarizing film 201, the transparent electrode 204, and the second alignment film 205 disposed on the second substrate 200.

The black matrix 202 is, for example, fabricated by a pigment dispersion method. In particular, a color resin solution containing an evenly dispersed black colorant for forming a black matrix is applied to the second substrate 200 having the barrier film 201 formed thereon so as to form a coloring layer. The coloring layer is then cured by baking. A photoresist is applied to the coloring layer and prebaked. The photoresist is exposed through a mask pattern and developed to perform patterning on the coloring layer. Then the photoresist layer is removed and the coloring layer is baked to form a black matrix 202.

Alternatively, a photoresist-type pigment dispersion may be used. In such a case, a photoresist-type pigment dispersion is applied, prebaked, exposed through a mask pattern, and developed to conduct patterning on the coloring layer. Then the photoresist layer is removed and the coloring layer is baked to form a black matrix 202.

The color filter 203 is prepared by a pigment dispersion method, an electrodeposition method, a printing method, or a dyeing method. For example, according to a pigment dispersion method, a color resin solution in which a pigment (for example, a red pigment) is evenly dispersed is applied to the second substrate 200 and cured by baking. Then a photoresist is applied thereto and prebaked. The photoresist is exposed through a mask pattern and then developed to perform patterning. The photoresist layer is then removed and baking is performed again. As a result, a (red) color filter 203 (203a) is obtained. The order of color in which the filters are made is not particularly limited. A green color filter 203 (203b) and a blue color filter 203 (203c) are made in the same manner.

The transparent electrode 204 is formed on the color filter 203 (if needed, an overcoat layer (201) for planarizing the surface is formed on the color filter 203). The transmittance of the transparent electrode 204 is preferably high and the electrical resistance of the transparent electrode 204 is preferably low. The transparent electrode 204 is formed by sputter-deposition or the like of an oxide film such as ITO.

A passivation film is sometimes formed on the transparent electrode 204 to protect the transparent electrode 204.

The second alignment film 205 is the same as the first alignment film 105.

While specific embodiments of the backplane and the frontplane used in the present invention are described above, the subject application is not limited to these specific embodiments and these embodiments may be freely altered depending on the desired liquid crystal display element.

The shape of the columnar spacers is not particularly limited and its horizontal cross section may have a variety of shapes such as circular, rectangular, and polygonal shapes. Considering the misalignment margin during the process, the horizontal cross section is particularly preferably circular or regular polygonal in shape. The shape of the projections is preferably a truncated cone or truncated pyramid.

The material of the columnar spacers is not particularly limited as long as it is a material that does not dissolve in the sealing material, the organic solvent used in the sealing material, or the liquid crystals. From the viewpoints of processing and weight reduction, a synthetic resin (curable resin) is preferable. The projections can be formed by a photolithographic method or a droplet ejection method on the surface of the first substrate that comes into contact with the sealing material. Due to these reasons, it is preferable to use a photocurable resin suitable for photolithography or a droplet ejection method.

Figure 2:
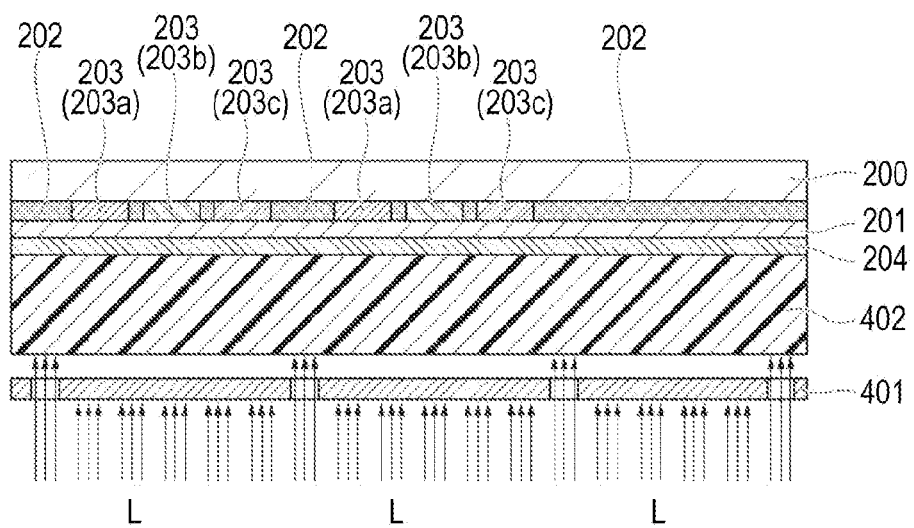
FIG. 2 is a diagram illustrating an exposure process step that uses a pattern for forming columnar spacers as a photomask pattern on a black matrix.

The case in which the columnar spacers are obtained by a photolithographic method is described below as an example. FIG. 2 is a diagram of an exposure process step that uses a pattern for forming columnar spacers as a photomask pattern on the black matrix.

A resin solution for forming columnar spacers (not containing colorants) is applied to the transparent electrode 204 of the frontplane. Then this resin layer 402 is cured by baking. A photoresist is applied thereto and prebaked. After exposing the photoresist through a mask pattern 401, development is conducted to conduct patterning of the resin layer. The photoresist layer is then removed and the resin layer is baked so as to complete formation of the columnar spacers (302 and 0304 in FIG. 1).

The positions of forming the columnar spacers can be determined as desired by using a mask pattern. Accordingly, the columnar spacers can be formed inside the sealed region and outside the sealed region (portion where the sealing material is applied) of the liquid crystal display element simultaneously. The columnar spacers are preferably formed to be positioned on the black matrix so as not to degrade quality of the sealed region. The columnar spacers fabricated by a photolithographic method as such are sometimes called column spacers or photo spacers.

A mixture containing a triazole-based initiator, an acrylic acid copolymer, a polyfunctional acryl-based monomer or a negative-type water-soluble resin such as PVA-stilbazo photosensitive resin, etc., is used as the material for the spacers. Alternatively, a method that uses a color resin in which a colorant is dispersed in a polyimide resin is available. In the present invention, the spacers can be obtained without any limitation by using a known material in accordance with the compatibility with the liquid crystals and the sealing material used.

After the columnar spacers are formed as such on the surface of the frontplane where a sealed region is to be formed, a sealing material (301 in FIG. 1) is applied to the surface that will make contact with the sealing material of the backplane.

The material for the sealing material is not particularly limited, and a curable resin composition containing a polymerization initiator and an epoxy-based or acryl-based photocurable, thermally curable, or photothermal dual curing resin is used. In order to control the moisture permeability, elastic modulus, viscosity, and the like, a filler composed of an inorganic material or an organic material is sometimes added. The shape of the filler is not particularly limited and may be spherical, fibrous, or irregular. A spherical gap material that has a monodisperse diameter or a fibrous gap material may be mixed in order to satisfactorily control the cell gap or a fibrous substance that easily becomes entangled with the projections on the substrate can be added in order to further increase the adhesive force to the substrate. The diameter of the fibrous substance used here is preferably about ⅕ to ⅒ of the cell gap or less. The length of the fibrous substance is preferably smaller than the width of the applied seal.

The material of the fibrous substance is not particularly limited as long as a particular shape can be obtained. A synthetic fiber such as cellulose, polyamide, or polyester, or an inorganic material such as glass or carbon can be appropriately selected.

A printing method and a dispensing method are available as the method for applying the sealing material. A dispensing method that uses less sealing material is preferable. The positions where the sealing material is applied are usually on a black matrix in order not to adversely affect the sealed region. In order to form a liquid crystal dropping region in the next step (in order to prevent leakage of the liquid crystals), the shape of the applied sealing material is to be a closed loop shape.

Liquid crystals are dropped in the closed loop (sealed region) of the frontplane to which the sealing material has been applied. Typically, a dispenser is used. The amount of liquid crystals to be dropped is basically equal to the volume obtained by multiplying the area of the applied seal and the height of the columnar spacer in order for the amount of the liquid crystals dropped to be equal to the cell volume. However, to deal with liquid crystal leakage that occurs in the cell bonding step and optimize the display properties, the amount of the liquid crystals to be dropped may be appropriately adjusted or the positions where the liquid crystals are to be dropped may be scattered.

Next, the frontplane onto which the sealing material has been applied and the liquid crystals have been dropped is bonded to the backplane. In particular, the frontplane and the backplane are adsorbed to stages having a substrate adsorbing mechanism such as an electrostatic chuck and are arranged in such a manner that the second alignment film of the frontplane and the first alignment film of the backplane face each other and in such a position (distance) that the sealing material does not contact the other substrate. Under such conditions, the interior of the system is evacuated. Upon completion of evacuation, the positions of the two substrates are adjusted (alignment operation) while monitoring the position where the frontplane and the backplane are to be bonded to each other. After adjustment of the bonding position is finished, the substrates are brought to be close to each other up to a position where the sealing material on the frontplane contacts the backplane. Under these conditions, the interior of the system is filled with inert gas and the pressure is slowly returned to normal while releasing the evacuation. Due to this process, the frontplane and the backplane become bonded to each other due to atmospheric pressure, and a cell gap is formed at a height position of the columnar spacers. Under these conditions, the sealing material is irradiated with an ultraviolet ray to be cured and form a liquid crystal cell. Subsequently, a heating step is performed in some cases so as to accelerate curing of the sealing material. A heating step is frequently added so as to increase the adhesive force of the sealing material and improve the reliability of electrical properties.

EXAMPLES

The present invention will now be described in further detail by using Examples below which do not limit the scope of the present invention. In the compositions of Examples and Comparative Examples below, "%" means "% by mass".

The properties that were measured in examples are as follows.

Tni: nematic phase-isotropic liquid phase transition temperature (° C.)
Δn: refractive index anisotropy at 298 K (in other words, birefringence)
Δ∈: dielectric anisotropy at 295 K
η: viscosity (mPa·s) at 293 K
γ1: rotational viscosity (mPa·s) at 295 K
VHR: voltage holding ratio (%) at a frequency of 60 Hz, and application voltage of 4 V at 333 K <Evaluation of Ghosting>

Evaluation of ghosting in liquid crystal display elements was conducted as follows: After a particular fixed pattern had been displayed in a display area for 6 weeks, uniform images were displayed in all parts of the screen and the extent of the afterimage of the fixed pattern was visually evaluated on the four-grade evaluation scale below:

AA: No after image
A: Faint afterimage was observed but the extent of the afterimage was acceptable
B: Afterimage was observed and the extent of the afterimage was unacceptable.
C: Extensive afterimage was observed.

<Evaluation of Volatility (Production Facility Contamination Property)>

Into a 0.33 L special container for a vacuum stirring defoaming mixer, 0.15 kg of a liquid crystal composition was placed and the vacuum stirring defoaming mixer was driven and evacuated at a revolution velocity of 20 $S^{-1}$ and a rotating velocity of 10.0 $S^{-1}$ until 15 kPa was reached. Then foaming of the liquid crystal material was visually observed. The volatility was rated on the four-grade scale below based on the time taken until start of foaming from the start of operation of the mixer.

AA: Three minutes or longer elapsed before foaming started. The possibility of facility contamination caused by evaporation is low.
A: One minute or longer but less than three minutes elapsed before foaming started. There is a low risk of facility contamination caused by evaporation.
B: Thirty seconds or longer but less than one minute elapsed before foaming started. Facility contamination caused by evaporation will occur.
C: Less than thirty seconds elapsed before foaming started. There is a risk of serious facility contamination by evaporation.

<Evaluation of Process Compatibility>

In an ODF process, 50 pL of a liquid crystal was dropped at a time by using a constant volume pump. This dropping operation was performed 100,000 times. The total amount of the liquid crystal dropped in 100 times of dropping operation was measured every hundred times of dropping (0 to 100th dropping, 101st to 200th dropping, 201st to 300th dropping, . . . 99,901st to 100,000th dropping) and changes in the amount of the liquid crystal dropped was evaluated on the following four-grade scale.

AA: Changes were very little (Liquid crystal display elements can be stably produced)
A: Changes were little and at an acceptable level
B: Changes were at an unacceptable level (Yield decreased due to occurrence of nonuniformity)
C: Significant changes occurred (Leakage of liquid crystals and vacuum bubbles occurred)

<Evaluation of Low-Temperature Solubility>

Evaluation of low-temperature solubility was conducted as follows. After preparation of a liquid crystal composition, 0.5 g of the liquid crystal composition was weighed and placed in a 1 mL sample jar and exposed to continuous temperature change cycles each consisting of "−25° C. (held for 1 hour)→heating (0.2° C./minute)→0° C. (held for 1 hour)→heating (0.2° C./minute)→25° C. (held for 1 hour)→cooling (−0.2° C./minute)→0° C. (held for 1 hour)→cooling (−0.2° C./minute)→−25° C." in a temperature-controlled testing chamber. Then generation of precipitates from the liquid crystal composition was observed visually and the solubility was evaluated based on the following four-grade scale.

AA: No precipitates were observed for 480 hours or longer.
A: No precipitates were observed for 240 hours or longer.
B: Precipitates were observed within 120 hours.
C: Precipitates were observed within 60 hours.

Example 1

A composition shown below was prepared. Physical properties of the composition of Example 1 are shown in Table 1.

[Chem. 174]

| Chemical Structure | Content (%) | |
|---|---|---|
| [structure: fluorinated biphenyl-CF₂O-fluorophenyl with alkyl chain] | (26.2) | 5 |
| [structure: bicyclohexyl with alkenyl chains] | (1.3) | 5 |

-continued
| Chemical Structure | | Content (%) |
|---|---|---|
| 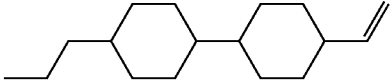 [SMILES: C=CC1CCC(C2CCC(CCC)CC2)CC1] | (2.2) | 40 |
| 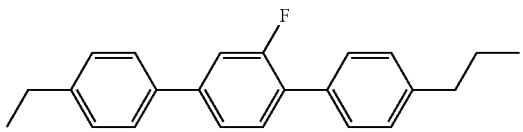 [SMILES: CCCc1ccc(-c2ccc(-c3ccc(CC)cc3)cc2F)cc1] | (i-1-1.1) | 5 |
| 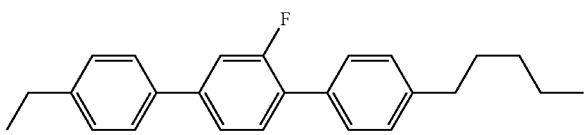 [SMILES: CCCCCc1ccc(-c2ccc(-c3ccc(CC)cc3)cc2F)cc1] | (i-1-1.6) | 5 |
| 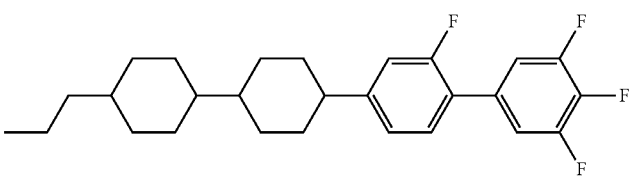 [SMILES: CCCC1CCC(C2CCC(c3ccc(-c4cc(F)c(F)c(F)c4)c(F)c3)CC2)CC1] | (37.2) | 5 |
| 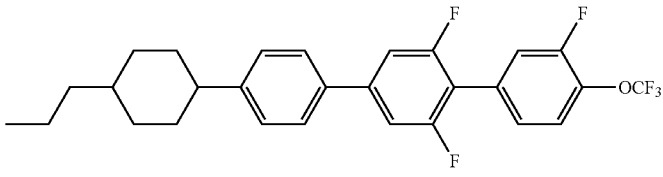 [SMILES: CCCC1CCC(c2ccc(-c3cc(F)c(-c4ccc(OC(F)(F)F)c(F)c4)c(F)c3)cc2)CC1] | (ii-1.2) | 8 |
| 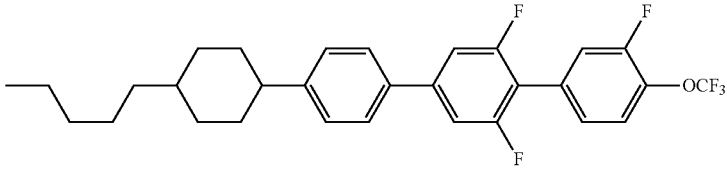 | (ii-1.4) | 7 |
| 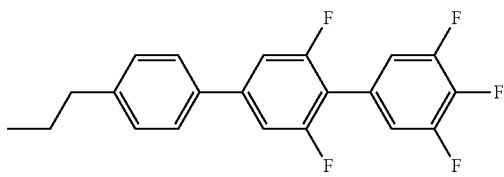 [SMILES: CCCc1ccc(-c2ccc(-c3cc(F)c(F)c(F)c3)c(F)c2)cc1] | (49.2) | 5 |
| 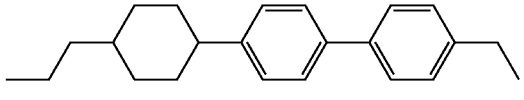 | (15.1) | 5 |
| 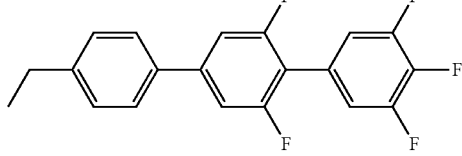 | (49.1) | 5 |
| 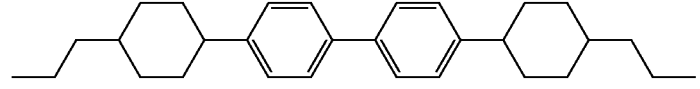 [SMILES: CCCC1CCC(c2ccc(-c3ccc(C4CCC(CCC)CC4)cc3)cc2)CC1] | (20.2) | 5 |

TABLE 1
| | |
|---|---|
| Tni (° C.) | 98.4 |
| Δn | 0.134 |
| Δε | 6.9 |
| η (mPa·s) | 18.5 |
Comparative Example 1
A composition shown below not containing a compound represented by general formula (ii) was prepared. Physical properties of the composition of Comparative Example 1 are shown in Table 2.
[Chem. 175]
| Chemical Structure | | Content (%) |
|---|---|---|
| 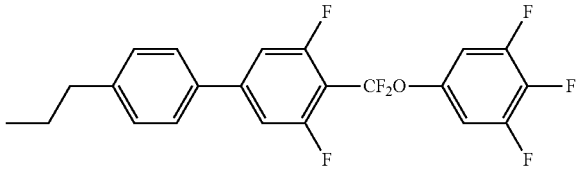 | (26.2) | 6 |
| 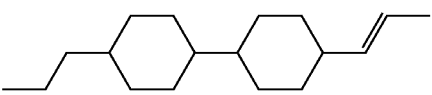 | (1.3) | 10 |
| 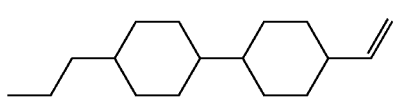 | (2.2) | 43 |
| 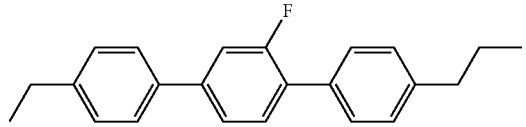 | (i-1-1.1) | 5 |
| 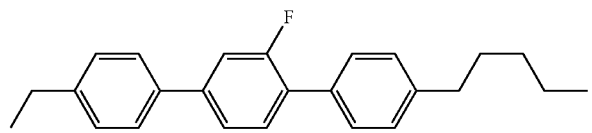 [SMILES: CCCCCc1ccc(-c2ccc(-c3ccc(CC)cc3)cc2F)cc1] | (i-1-1.6) | 5 |
| 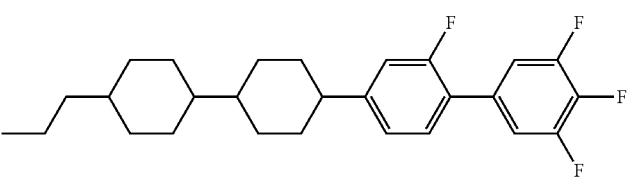 [SMILES: CCCC1CCC(C2CCC(c3ccc(-c4cc(F)c(F)c(F)c4)c(F)c3)CC2)CC1] | (37.2) | 2 |
| 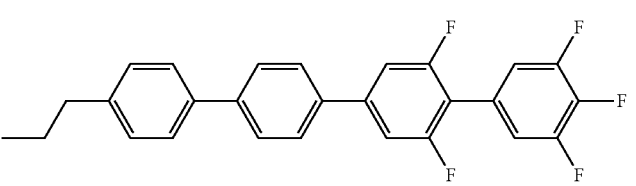 | (41.2) | 8 |
| 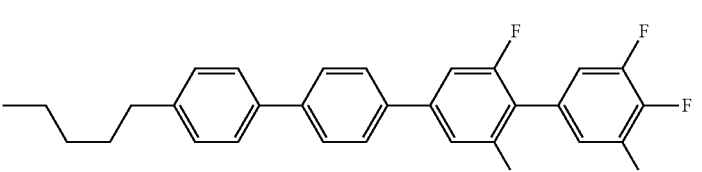 | (41.4) | 7 |
| 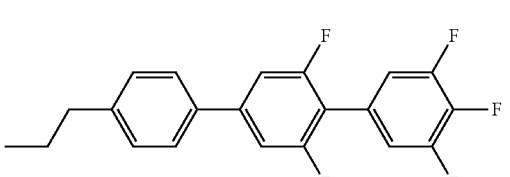 | (49.2) | 4 |

-continued

| Chemical Structure | Content (%) | |
|---|---|---|
| 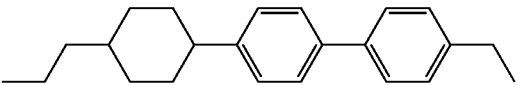 [SMILES: CCCC1CCC(c2ccc(-c3ccc(CC)cc3)cc2)CC1] | (15.1) | 3 |
| 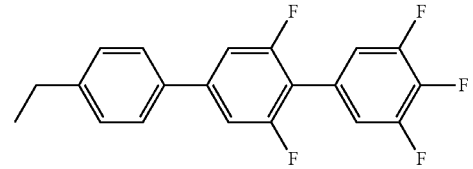 | (49.1) | 5 |
| 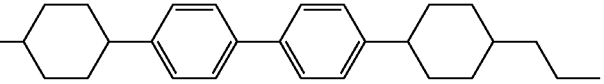 | (20.2) | 2 |

TABLE 2

| | |
|---|---|
| Tni (° C.) | 80.9 |
| Δn | 0.134 |
| Δε | 6.5 |
| η (mPa · s) | 16.9 |

The results indicate that the composition of Comparative Example 1 not containing a compound represented by general formula (ii) has a lower Tni and a smaller Δε than the composition of Example 1 containing a compound represented by general formula (ii).

Example 2

A composition shown below was prepared. Physical properties of the composition of Example 2 are shown in Table 3.

[Chem. 176]

| Chemical Structure | Content (%) | |
|---|---|---|
| 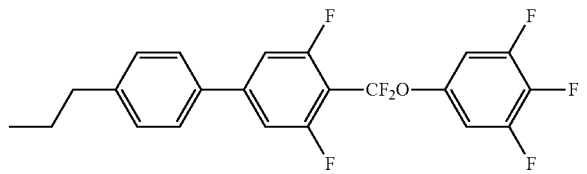 | (26.2) | 3 |
| 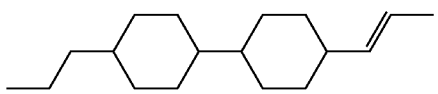 | (1.3) | 8 |
| 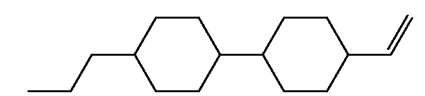 | (2.2) | 47 |
| 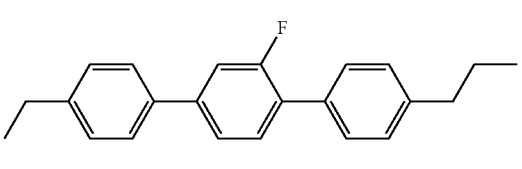 | (i-1-1.1) | 4 |
| 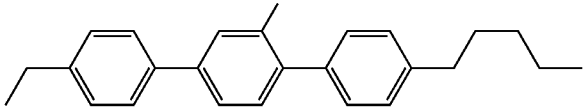 | (i-1-1.6) | 7 |
| 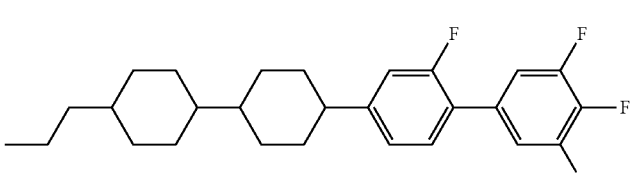 | (37.2) | 3 |

| Chemical Structure | | Content (%) |
|---|---|---|
| 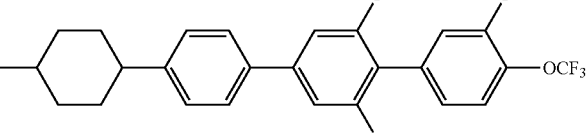 | (ii-1.2) | 6 |
| 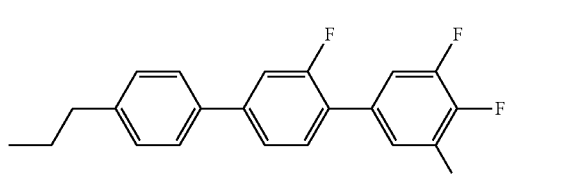 | (49.2) | 6 |
| 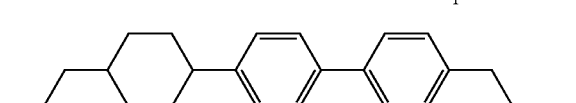 | (15.1) | 6 |
| 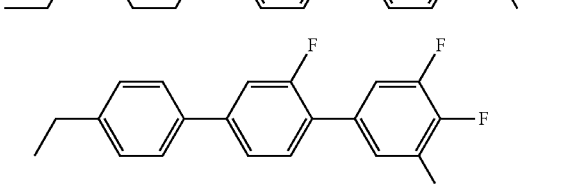 | (49.1) | 5 |
| 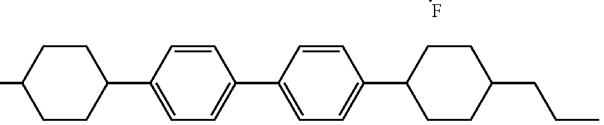 | (20.2) | 5 |
TABLE 3
| | |
|---|---|
| Tni (° C.) | 88.8 |
| Δn | 0.123 |
| Δε | 4.4 |
| η (mPa·s) | 12.0 |
Example 3
A composition shown below was prepared. Physical properties of the composition of Example 3 are shown in Table 4.
[Chem. 177]
| Chemical Structure | | Content (%) |
|---|---|---|
| | (26.2) | 5 |
| | (1.3) | 8 |
| | (2.2) | 47 |
| | (i-1-1.4) | 4 |

-continued
| Chemical Structure | | Content (%) |
|---|---|---|
| 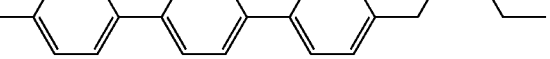 | (i-1-1.6) | 8 |
|  | (37.2) | 3 |
|  | (ii-4.2) | 5 |
| 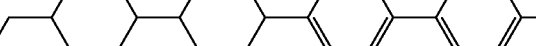 | (49.2) | 5 |
|  | (15.1) | 5 |
|  | (49.1) | 5 |
|  | (20.2) | 5 |
TABLE 4
| | |
|---|---|
| Tni (° C.) | 87.4 |
| Δn | 0.126 |
| Δε | 4.5 |
| η (mPa · s) | 13.0 |
Example 4
A composition shown below was prepared. Physical properties of the composition of Example 4 are shown in Table 5.
[Chem. 178]
| Chemical Structure | | Content (%) |
|---|---|---|
| 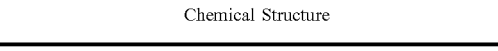 | (26.2) | 5 |

-continued
| Chemical Structure | | Content (%) |
|---|---|---|
| 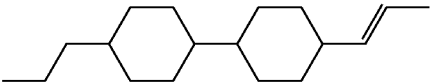 [SMILES: C/C=C/C1CCC(C2CCC(CCC)CC2)CC1] | (1.3) | 10 |
| 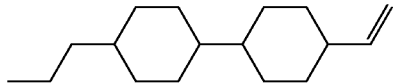 [SMILES: C=CC1CCC(C2CCC(CCC)CC2)CC1] | (2.2) | 45 |
| 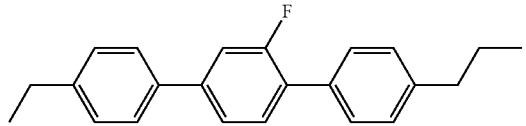 [SMILES: CCCc1ccc(-c2ccc(-c3ccc(CC)cc3)cc2F)cc1] | (i-1-1.1) | 5 |
| 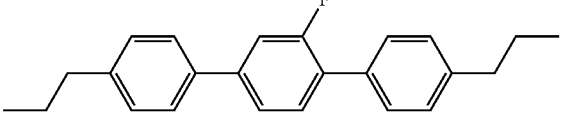 | (i-1-1.3) | 6 |
| 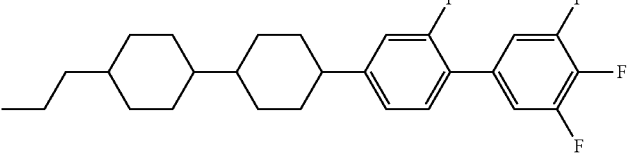 | (37.2) | 3 |
| 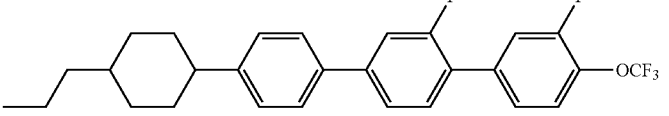 | (ii-2.2) | 5 |
| 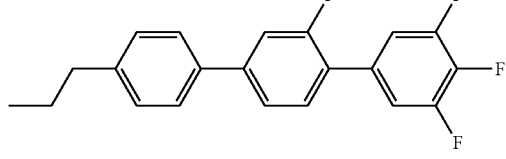 | (49.2) | 7 |
| 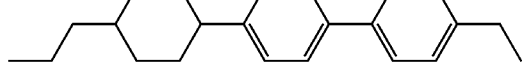 | (15.1) | 6 |
| 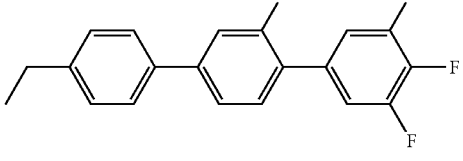 | (49.1) | 5 |

-continued
| Chemical Structure | | Content (%) |
|---|---|---|
| 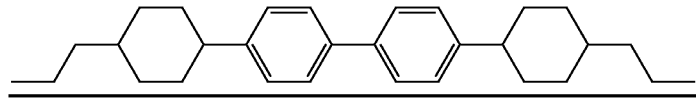 | (20.2) | 3 |
TABLE 5
| Tni (° C.) | 84.2 |
|---|---|
| Δn | 0.123 |
| Δε | 5.1 |
| η (mPa · s) | 11.3 |
Example 5
A composition shown below was prepared. Physical properties of the composition of Example 5 are shown in Table 6.
[Chem. 179]
| Chemical Structure | | Content (%) |
|---|---|---|
| 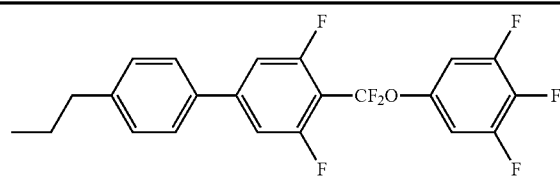 | (26.2) | 4 |
| 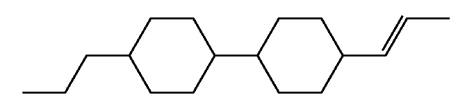 | (1.3) | 8 |
| 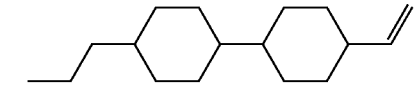 | (2.2) | 47 |
| 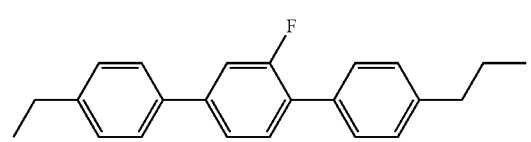 [SMILES: CCCc1ccc(-c2ccc(-c3ccc(CC)cc3)cc2F)cc1] | (i-1-1.1) | 5 |
| 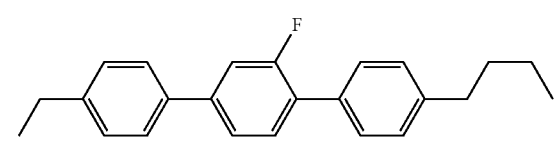 [SMILES: CCCCc1ccc(-c2ccc(-c3ccc(CC)cc3)cc2F)cc1] | (i-1-1.4) | 7 |
| 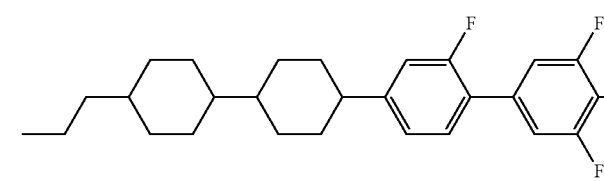 | (37.2) | 3 |
| 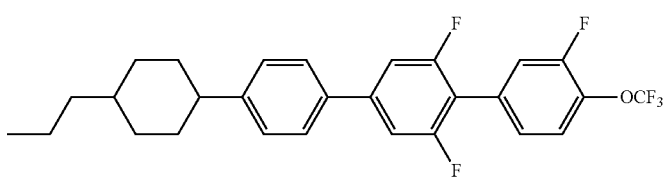 [SMILES: CCCC1CCC(c2ccc(-c3cc(F)c(-c4ccc(OC(F)(F)F)c(F)c4)c(F)c3)cc2)CC1] | (ii-1.2) | 6 |
| 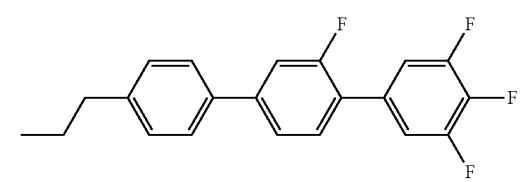 [SMILES: CCCc1ccc(-c2ccc(-c3cc(F)c(F)c(F)c3)c(F)c2)cc1] | (49.2) | 5 |

-continued

| Chemical Structure | | Content (%) |
|---|---|---|
| (propyl-cyclohexyl-phenyl-phenyl-ethyl) | (15.1) | 5 |
| (ethyl-phenyl-phenyl(2-F)-phenyl(3,4,5-F)) | (49.1) | 5 |
| (propyl-cyclohexyl-phenyl-phenyl-cyclohexyl-propyl) | (20.2) | 5 |

TABLE 6

| | |
|---|---|
| Tni (° C.) | 87.7 |
| Δn | 0.122 |
| Δε | 4.6 |
| η (mPa·s) | 11.9 |

Example 6

A composition shown below was prepared. Physical properties of the composition of Example 6 are shown in Table 7.

[Chem. 180]

| Chemical Structure | | Content (%) |
|---|---|---|
| (propyl-phenyl-phenyl(3,5-F)-CF₂O-phenyl(3,4,5-F)) | (26.2) | 5 |
| (propyl-cyclohexyl-cyclohexyl-CH=CH-CH₃) | (1.3) | 5 |
| (propyl-cyclohexyl-cyclohexyl-CH=CH₂) | (2.2) | 45 |
| (propyl-phenyl-phenyl(2-F)-phenyl(3,5-F)-CF₂O-phenyl(3,4,5-F)) | (45.2) | 5 |
| (ethyl-phenyl-phenyl(2-F)-phenyl-propyl) | (i-1-1.1) | 8 |
| (propyl-phenyl-phenyl(2-F)-phenyl-propyl) | (i-1-1.3) | 7 |

-continued
| Chemical Structure | | Content (%) |
|---|---|---|
| 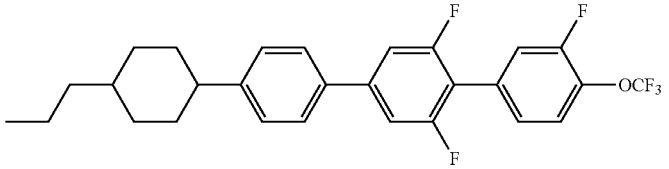 | (ii-1.2) | 5 |
| 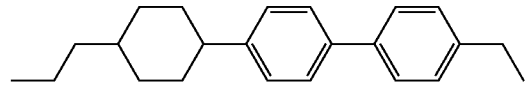 [SMILES: CCCC1CCC(c2ccc(-c3ccc(CC)cc3)cc2)CC1] | (15.1) | 5 |
|  | (5.4) | 10 |
| 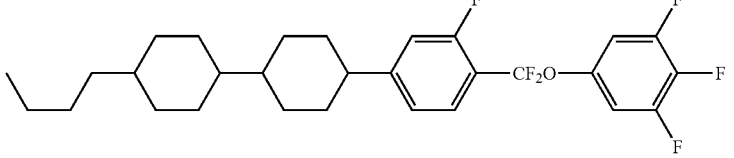 | (42.3) | 5 |
TABLE 7
| | |
|---|---|
| Tni (° C.) | 73.8 |
| Δn | 0.122 |
| Δε | 5.2 |
| η (mPa · s) | 15.4 |
Example 7
A composition shown below was prepared. Physical properties of the composition of Example 7 are shown in Table 8.
[Chem. 181]
| Chemical Structure | | Content (%) |
|---|---|---|
| 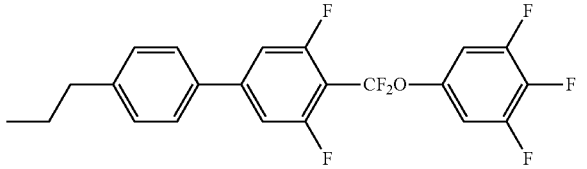 | (26.2) | 5 |
| 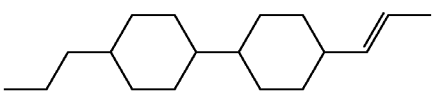 [SMILES: C/C=C/C1CCC(C2CCC(CCC)CC2)CC1] | (1.3) | 5 |
| 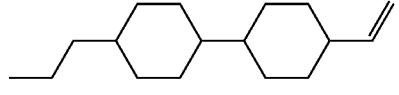 [SMILES: C=CC1CCC(C2CCC(CCC)CC2)CC1] | (2.2) | 45 |
| 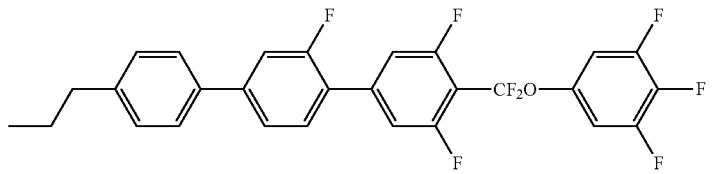 | (45.2) | 5 |
| 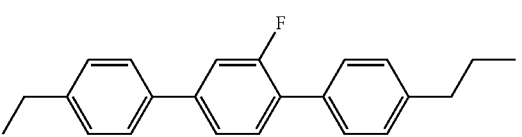 [SMILES: CCCc1ccc(-c2ccc(-c3ccc(CC)cc3)cc2F)cc1] | (i-1-1.1) | 8 |

| Chemical Structure | | Content (%) |
|---|---|---|
| 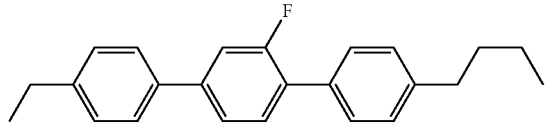 | (i-1-1.4) | 7 |
| 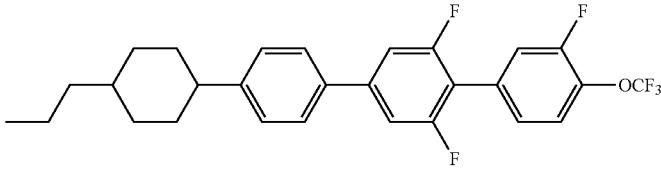 [SMILES: CCCC1CCC(c2ccc(-c3cc(F)c(-c4ccc(OC(F)(F)F)c(F)c4)c(F)c3)cc2)CC1] | (ii-1.2) | 5 |
| 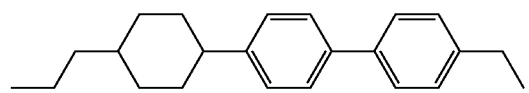 [SMILES: CCCC1CCC(c2ccc(-c3ccc(CC)cc3)cc2)CC1] | (15.1) | 5 |
| 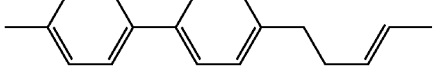 | (5.4) | 10 |
| 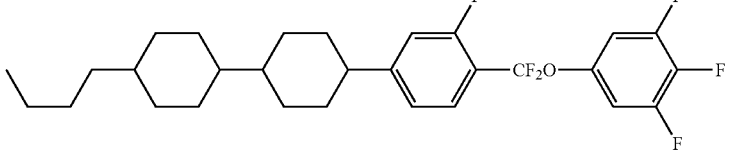 | (42.3) | 5 |
TABLE 8
| | |
|---|---|
| Tni (° C.) | 73.3 |
| Δn | 0.123 |
| Δε | 5.1 |
| η (mPa · s) | 16.1 |
Example 8
A composition shown below was prepared. Physical properties of the composition of Example 8 are shown in Table 9.
[Chem. 182]
| Chemical Structure | | Content (%) |
|---|---|---|
| 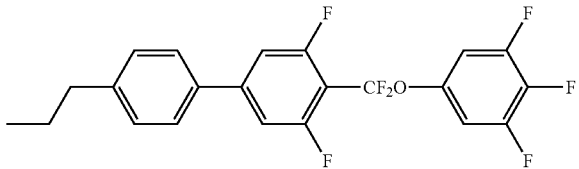 | (26.2) | 5 |
| 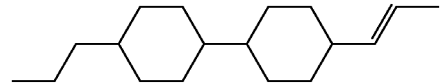 [SMILES: C/C=C/C1CCC(C2CCC(CCC)CC2)CC1] | (1.3) | 5 |
| 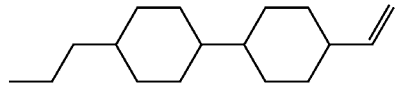 | (2.2) | 45 |
| 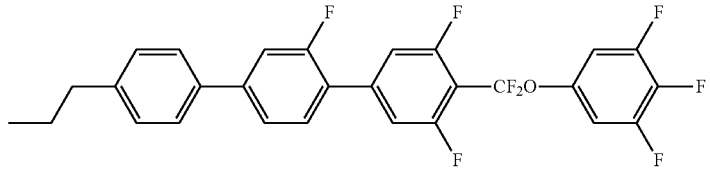 | (45.2) | 5 |

| Chemical Structure | | Content (%) |
|---|---|---|
| 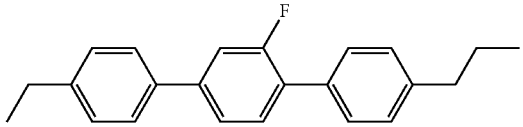 [SMILES: CCCc1ccc(-c2ccc(-c3ccc(CC)cc3)cc2F)cc1] | (i-1-1.1) | 8 |
| 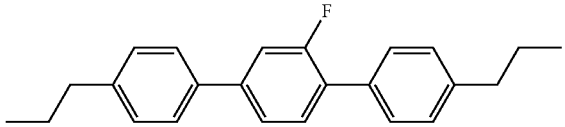 [SMILES: CCCc1ccc(-c2ccc(-c3ccc(CCC)cc3)c(F)c2)cc1] | (i-1-1.3) | 7 |
| 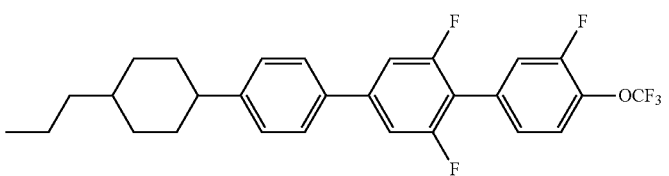 | (ii-1.2) | 3 |
| 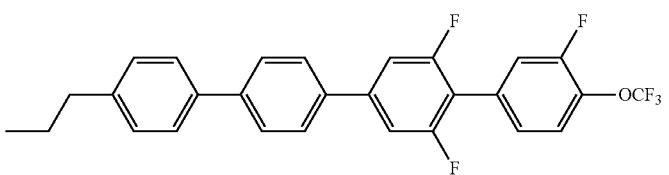 [SMILES: CCCc1ccc(-c2ccc(-c3cc(F)c(-c4ccc(OC(F)(F)F)c(F)c4)c(F)c3)cc2)cc1] | (ii-4.2) | 3 |
| 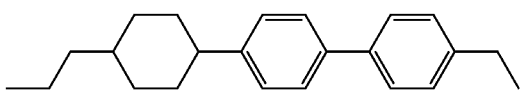 [SMILES: CCCC1CCC(c2ccc(-c3ccc(CC)cc3)cc2)CC1] | (15.1) | 5 |
|  | (5.4) | 10 |
| 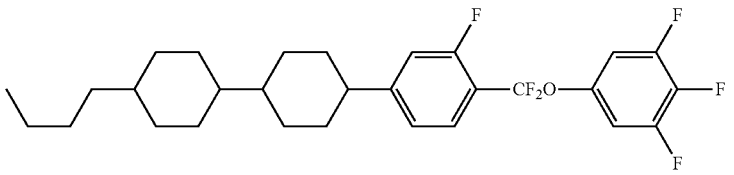 | (42.3) | 4 |
TABLE 9
| Tni (° C.) | 73.4 |
|---|---|
| Δn | 0.125 |
| Δε | 5.3 |
| η (mPa·s) | 15.5 |
Example 9
A composition shown below was prepared. Physical properties of the composition of Example 9 are shown in Table 10.
[Chem. 183]
| Chemical Structure | | Content (%) |
|---|---|---|
| 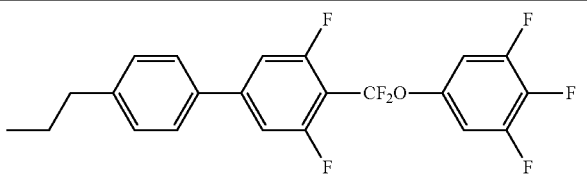 | (26.2) | 5 |
| 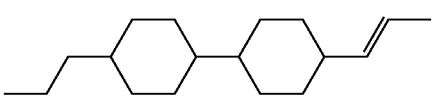 [SMILES: C/C=C/C1CCC(C2CCC(CCC)CC2)CC1] | (1.3) | 5 |

| Chemical Structure | | Content (%) |
|---|---|---|
| [propyl-cyclohexyl-cyclohexyl-vinyl] | (2.2) | 45 |
| [propyl-phenyl-(F)phenyl-(F,F)phenyl(F)-CF₂O-(F,F,F)phenyl] | (45.2) | 5 |
| [ethyl-phenyl-(F)phenyl-phenyl-propyl] | (i-1-1.1) | 8 |
| [propyl-phenyl-(F)phenyl-phenyl-propyl] | (i-1-1.3) | 7 |
| [propyl-cyclohexyl-phenyl-(F,F)phenyl-(F)phenyl-OCF₃] | (ii-1.2) | 3 |
| [propyl-cyclohexyl-phenyl-(F)phenyl-(F)phenyl-OCF₃] | (ii-2.2) | 3 |
| [propyl-cyclohexyl-phenyl-phenyl-ethyl] | (15.1) | 5 |
| [methyl-phenyl-phenyl-butenyl] | (5.4) | 10 |

-continued
| Chemical Structure | | Content (%) |
|---|---|---|
| 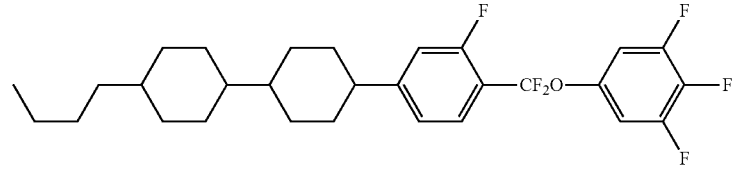 | (42.3) | 4 |
TABLE 10
| Tni (° C.) | 75.2 |
|---|---|
| Δn | 0.125 |
| Δε | 5.3 |
| η (mPa·s) | 15.4 |
Example 10
A composition shown below was prepared. Physical properties of the composition of Example 10 are shown in Table 11.
[Chem. 184]
| Chemical Structure | | Content (%) |
|---|---|---|
| 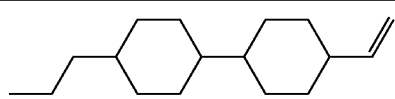 | (2.2) | 35 |
| 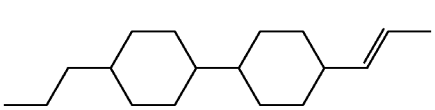 [SMILES: C/C=C/C1CCC(C2CCC(CCC)CC2)CC1] | (1.3) | 15 |
| 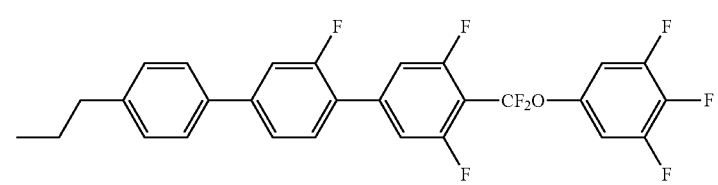 | (45.2) | 5 |
| 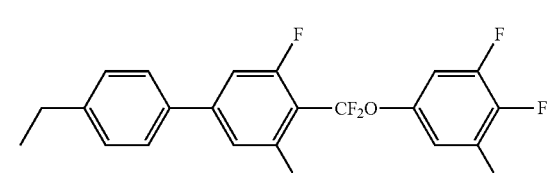 | (26.1) | 5 |
| 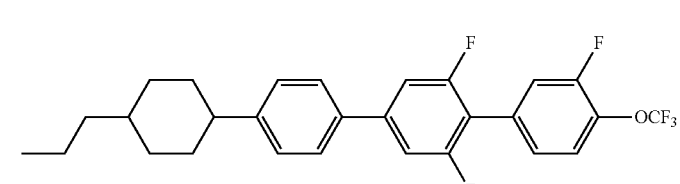 | (ii-1.2) | 5 |
| 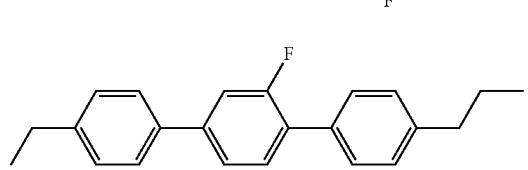 | (i-1-1.1) | 7 |
| 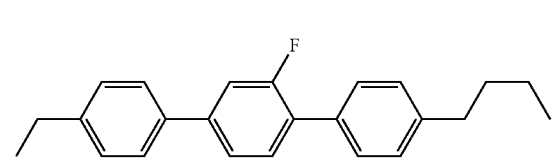 [SMILES: CCCCc1ccc(-c2ccc(-c3ccc(CC)cc3)cc2F)cc1] | (i-1-1.4) | 8 |

-continued
| Chemical Structure | | Content (%) |
|---|---|---|
| 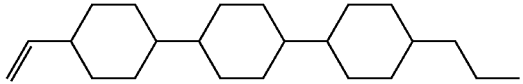 | (10.1) | 10 |
| 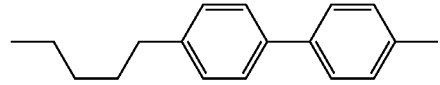 | (5.2) | 10 |
TABLE 11
| | |
|---|---|
| Tni (° C.) | 78.8 |
| Δn | 0.118 |
| Δε | 3.7 |
| η (mPa · s) | 10.4 |
Example 11
A composition shown below was prepared. Physical properties of the composition of Example 11 are shown in Table 12.
[Chem. 185]
| Chemical Structure | | Content (%) |
|---|---|---|
| 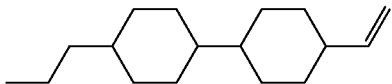 [SMILES: C=CC1CCC(C2CCC(CCC)CC2)CC1] | (2.2) | 35 |
| 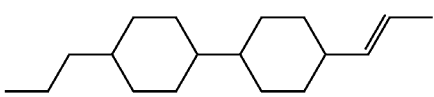 | (1.3) | 15 |
| 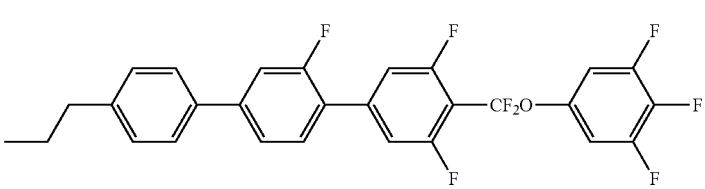 | (45.2) | 5 |
| 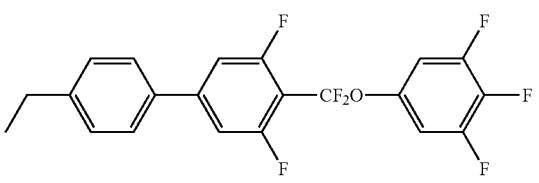 | (26.1) | 5 |
| 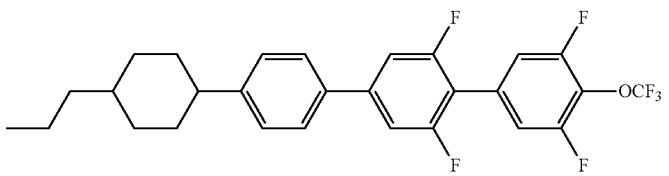 | (ii-3.2) | 5 |
| 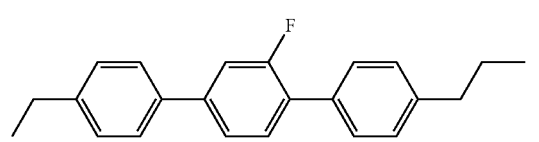 [SMILES: CCCc1ccc(-c2ccc(-c3ccc(CC)cc3)cc2F)cc1] | (i-1-1.1) | 7 |
| 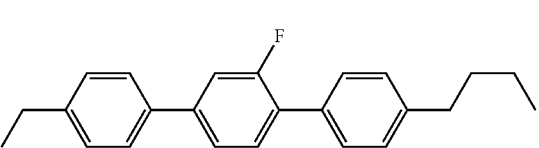 [SMILES: CCCCc1ccc(-c2ccc(-c3ccc(CC)cc3)cc2F)cc1] | (i-1-1.4) | 8 |

-continued

| Chemical Structure | | Content (%) |
|---|---|---|
| [structure: vinyl-cyclohexyl-cyclohexyl-cyclohexyl-propyl] | (10.1) | 10 |
| [structure: pentyl-biphenyl-methyl] | (5.2) | 10 |

TABLE 12

| | |
|---|---|
| Tni (° C.) | 80.1 |
| Δn | 0.120 |
| Δε | 3.5 |
| η (mPa·s) | 11.4 |

Example 12

A composition shown below was prepared. Physical properties of the composition of Example 12 are shown in Table 13.

[Chem. 186]

| Chemical Structure | | Content (%) |
|---|---|---|
| [propyl-cyclohexyl-cyclohexyl-vinyl] | (2.2) | 35 |
| [propyl-cyclohexyl-cyclohexyl-propenyl] | (1.3) | 15 |
| [propyl-phenyl-(F,F)phenyl-(F,F)phenyl-CF$_2$O-(F,F)phenyl-F] | (45.2) | 5 |
| [ethyl-phenyl-(F,F)phenyl-CF$_2$O-(F,F)phenyl-F] | (26.1) | 5 |
| [propyl-cyclohexyl-phenyl-(F,F)phenyl-(F)phenyl-OCF$_3$] | (ii-1.2) | 5 |
| [ethyl-phenyl-(F)phenyl-phenyl-propyl] | (i-1-1.1) | 7 |
| [propyl-phenyl-(F)phenyl-phenyl-propyl] | (i-1-1.3) | 8 |

-continued
| Chemical Structure | | Content (%) |
|---|---|---|
| 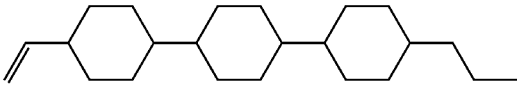 [SMILES: C=CC1CCC(C2CCC(C3CCC(CCC)CC3)CC2)CC1] | (10.1) | 10 |
| 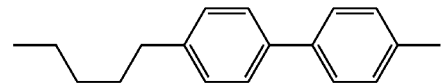 [SMILES: CCCCCc1ccc(-c2ccc(C)cc2)cc1] | (5.2) | 10 |
TABLE 13
| | |
|---|---|
| Tni (° C.) | 79.4 |
| Δn | 0.117 |
| Δε | 3.8 |
| η (mPa · s) | 9.9 |
Example 13
A composition shown below was prepared. Physical properties of the composition of Example 13 are shown in Table 14.
[Chem. 187]
| Chemical Structure | | Content (%) |
|---|---|---|
| 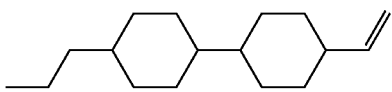 | (2.2) | 35 |
| 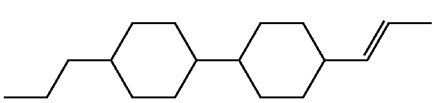 [SMILES: C/C=C/C1CCC(C2CCC(CCC)CC2)CC1] | (1.3) | 15 |
| 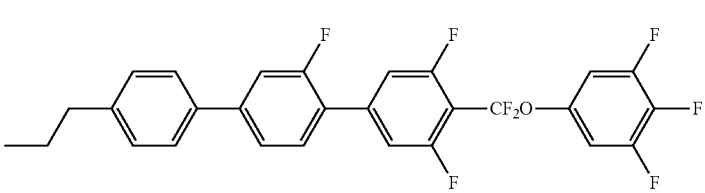 | (45.2) | 5 |
| 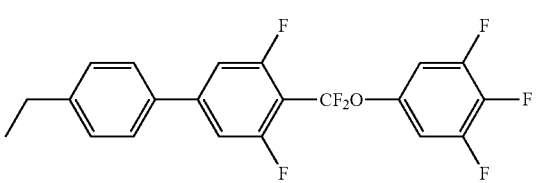 | (26.1) | 5 |
| 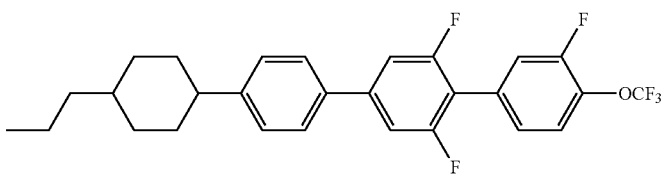 | (ii-1.2) | 5 |
| 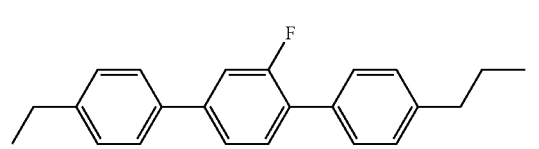 [SMILES: CCCc1ccc(-c2ccc(-c3ccc(CC)cc3)cc2F)cc1] | (i-1-1.1) | 7 |
| 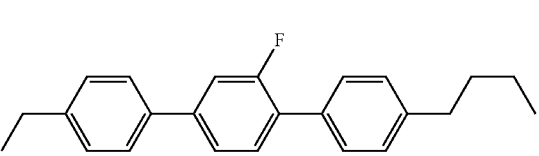 | (i-1-1.4) | 8 |

| Chemical Structure | | Content (%) |
|---|---|---|
| [structure] | (5.2) | 10 |
| [structure] | (11.1) | 10 |

TABLE 14

| | |
|---|---|
| Tni (° C.) | 72.6 |
| Δn | 0.123 |
| Δε | 3.7 |
| η (mPa · s) | 11.0 |

The structures and combinations thereof in the embodiments described above are merely exemplary and addition, omission, replacements, and other modifications on the structures and the like are possible without departing from the spirit of the present invention. The present invention is not limited by the embodiments but merely by the claims.

The initial VHR, VHR after heating (150° C., 1 hour), evaluation of ghosting, evaluation of volatility, evaluation of process compatibility, and evaluation of low-temperature solubility of the liquid crystal compositions described in the respective examples are shown in Tables 15 to 17.

TABLE 15

| | Example 2 | Example 3 | Example 4 | Example 5 |
|---|---|---|---|---|
| Initial VHR | 99.1 | 99.0 | 99.3 | 99.0 |
| VHR after heating | 98.3 | 98.4 | 98.2 | 98.2 |
| Ghosting | AA | AA | AA | AA |
| Volatility | AA | AA | AA | AA |
| Process compatibility | AA | A | AA | AA |
| Low-temperature solubility | AA | AA | A | AA |

TABLE 16

| | Example 6 | Example 7 | Example 8 | Example 9 |
|---|---|---|---|---|
| Initial VHR | 99.2 | 99.3 | 99.1 | 99.2 |
| VHR after heating | 98.3 | 98.1 | 98.2 | 98.2 |
| Ghosting | AA | AA | AA | AA |
| Volatility | AA | AA | AA | AA |
| Process compatibility | AA | AA | A | AA |
| Low-temperature solubility | AA | AA | AA | A |

TABLE 17

| | Example 10 | Example 11 | Example 12 | Example 13 |
|---|---|---|---|---|
| Initial VHR | 99.3 | 99.4 | 99.3 | 99.1 |
| VHR after heating | 98.4 | 98.1 | 98.2 | 98.1 |
| Ghosting | AA | AA | AA | AA |
| Volatility | AA | AA | AA | AA |
| Process compatibility | AA | A | AA | AA |
| Low-temperature solubility | AA | AA | AA | AA |

INDUSTRIAL APPLICABILITY

Provided is a liquid crystal composition having a positive Δε, low viscosity, good low-temperature solubility, high resistivity and voltage holding ratio, and stability for heat and light, showing a liquid crystal phase over a wide temperature range, being capable of suppressing display failures such as ghosting and drop marks, and enabling high-yield production of liquid crystal display elements having high display quality. Also provided is a liquid crystal display element that uses this liquid crystal composition.

REFERENCE SIGNS LIST

100 first substrate
102 TFT layer
103 pixel electrode
104 passivation film
105 first alignment film
200 second substrate
201 planarizing film (overcoat layer)
202 black matrix
203 color filter
204 transparent electrode
205 second alignment film
301 sealing material
302 projections (columnar spacer)
303 liquid crystal layer
304 projections (columnar spacer)
401 mask pattern
402 resin layer
L light

The invention claimed is:
1. A liquid crystal composition, comprising:
one or more compounds represented by general formula (i) below;
one or more compounds selected from compounds represented by general formulae (ii-1) to (ii-4) below;
compounds represented by general formula (XI-1), formula (2.2), and formula (1.3) below; and at least one compound selected from compounds represented by formula (10.1), formula (11.1), and formula (15.1) below, wherein a total content of the compounds represented by any of general formula (i) and said one or more compounds selected from compounds represented by general formulae (ii-1) to (ii-4) relative to a total amount of the composition is 13% by mass or more and 28% by mass or less:

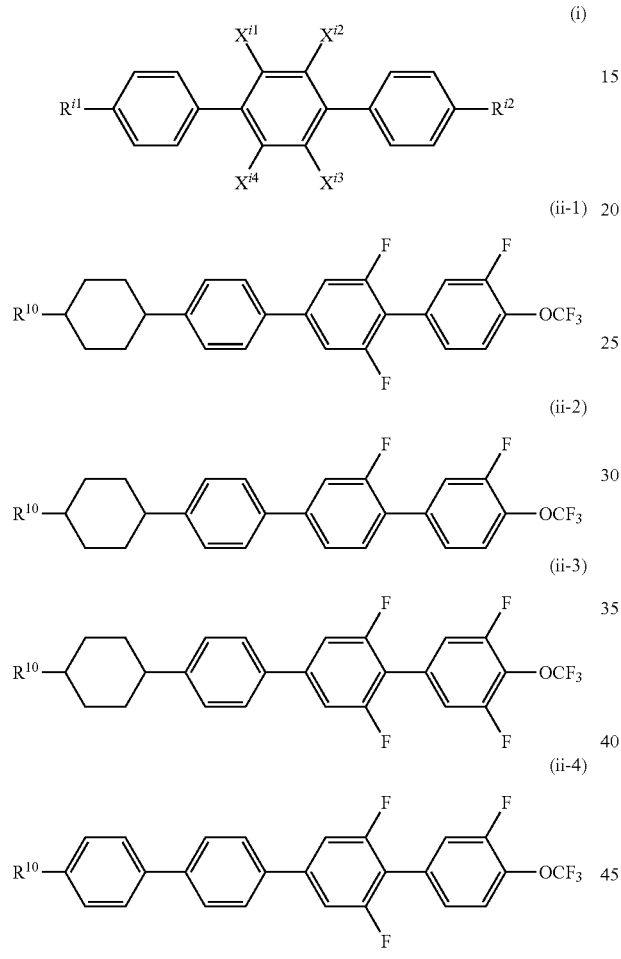

wherein in the formulae, $R^{i1}$, $R^{i2}$, and $R^{ii1}$ each independently represent an alkyl group having 1 to 8 carbon atoms where one —$CH_2$— or two or more nonadjacent —$CH_2$— in the alkyl group represented by $R^{ii1}$ may each be independently substituted with —CH=CH—, —C≡C—, —O—, —CO—, —COO—, or —OCO— and a hydrogen atom in the alkyl group represented by $R^{ii1}$ may be substituted with fluorine atom or a chlorine atom; $X^{i1}$, $X^{i2}$, $X^{i3}$, $X^{i4}$, $X^{ii1}$, and $X^{ii2}$ each independently represent a hydrogen atom or a fluorine atom; $A^{ii1}$, $A^{ii2}$, and $A^{ii3}$ each independently represent a trans-1,4-cyclohexylene group or a 1,4-phenylene group which may have a hydrogen atom substituted with a fluorine atom or a chlorine atom;

in formula (ii-1), $R^{10}$ represents an alkyl group having 1 to 5 carbon atoms, an alkenyl group having 2 to 5 carbon atoms, or an alkoxy group having 1 to 4 carbon atoms;

in formula (ii-2), $R^{10}$ represents an alkyl group having 1 to 5 carbon atoms, an alkenyl group having 2 to 5 carbon atoms, or an alkoxy group having 1 to 4 carbon atoms;

in formula (ii-3), $R^{10}$ represents an alkyl group having 1 to 5 carbon atoms, an alkenyl group having 2 to 5 carbon atoms, or an alkoxy group having 1 to 4 carbon atoms; and in formula (ii-4), $R^{10}$ represents an alkyl group having 1 to 5 carbon atoms, an alkenyl group having 2 to 5 carbon atoms, or an alkoxy group having 1 to 4 carbon atoms;

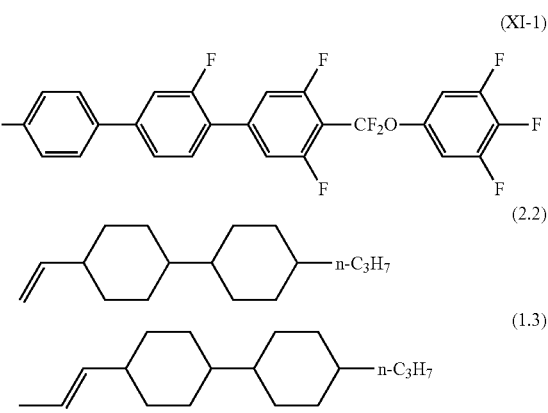

wherein the formula, $R^{11}$ represents an alkyl group having 1 to 5 carbon atoms, an alkenyl group having 2 to 5 carbon atoms, or an alkoxy group having 1 to 4 carbon atoms;

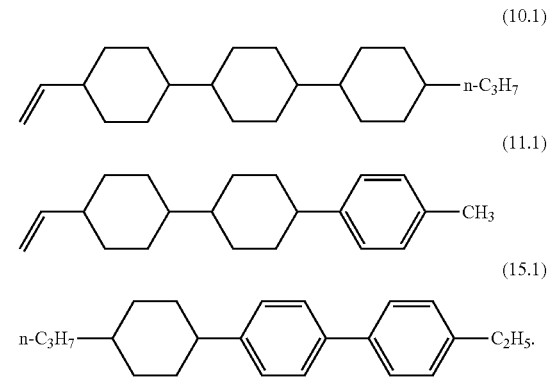

2. The liquid crystal composition according to claim 1, wherein $X^{i2}$ in general formula (i) represents a fluorine atom.

3. The liquid crystal composition according to claim 1, further comprising a compound represented by general formula (L) below:

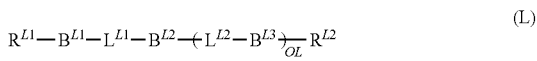

wherein the formula, $R^{L1}$ and $R^{L2}$ each independently represent an alkyl group having 1 to 8 carbon atoms where one —$CH_2$— or two or more nonadjacent —$CH_2$— in the alkyl group may each be independently substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of (a) a 1,4-cyclohexylene group (where one —CH$_2$— or two or more nonadjacent —CH$_2$— present in this group may be substituted with —O—) and (b) a 1,4-phenylene group (where one —CH= or two or more nonadjacent —CH= present in this group may be substituted with —N=), wherein one or more hydrogen atoms in the group (a) or (b) described above may each independently be substituted with a cyano group, a fluorine atom, or a chlorine atom, $L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, and when OL represents 2 or 3 and two or more $L^{L2}$ are present, they may be the same or different and when OL represents 2 or 3 and two or more $B^{L3}$ are present, they may be the same or different wherein compounds represented by general formula (i), (1.3), (2.2), (10.1), (11.1), and (15.1) are excluded from the general formula (L).

4. The liquid crystal composition according to claim 1, further comprising a compound represented by general formula (M) below:

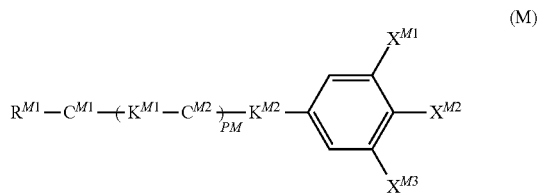

(M)

wherein the formula, $R^{M1}$ represents an alkyl group having 1 to 8 carbon atoms where one —CH$_2$— or two or more nonadjacent —CH$_2$— in the alkyl group may each be independently substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (where one —CH$_2$— or two or more nonadjacent —CH$_2$— present in this group may be substituted with —O— or —S—) and (e) a 1,4-phenylene group (where one —CH= or two or more nonadjacent —CH= present in this group may be substituted with —N=), wherein one or more hydrogen atoms in the group (d) or (e) described above may each independently be substituted with a cyano group, a fluorine atom, or a chlorine atom, $K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—, when PM represents 2, 3, or 4 and two or more $K^{M1}$ are present, they may be the same or different and when PM represents 2, 3, or 4 and two or more $C^{M2}$ are present, they may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group wherein a compound represented by general formula (ii) and general formula (XI-1) are excluded from the general formula (M).

5. A liquid crystal display element comprising the liquid crystal composition according to claim 1.

6. A liquid crystal display element of an IPS mode, OCB mode, ECB mode, VA mode, VA-IPS mode, or a FFS mode, comprising the liquid crystal composition according to claim 1.

7. A liquid crystal display comprising the liquid crystal display element according to claim 5.

* * * * *